(12) United States Patent
Gao et al.

(10) Patent No.: US 12,428,505 B2
(45) Date of Patent: Sep. 30, 2025

(54) METHOD FOR PREPARING OLEFIN-POLAR MONOMER COPOLYMER

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Rong Gao, Beijing (CN); Jingjing Lai, Beijing (CN); Zifang Guo, Beijing (CN); Qingqiang Gou, Beijing (CN); Junling Zhou, Beijing (CN); Wenbo Song, Beijing (CN); Xinyang Li, Beijing (CN); Xiaofan Zhang, Beijing (CN); Jie Lin, Beijing (CN); Dongbing Liu, Beijing (CN); Junhui Zhang, Beijing (CN); Hongtao Wang, Beijing (CN); Shijun Zhang, Beijing (CN); Yuanning Gu, Beijing (CN); Jingyan An, Beijing (CN); Hui Zhao, Beijing (CN); Tingjie Huang, Beijing (CN); Dong Ma, Beijing (CN); Ruen Wang, Beijing (CN); Shiyuan Xu, Beijing (CN); Jie Fu, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 743 days.

(21) Appl. No.: 17/755,542

(22) PCT Filed: Oct. 30, 2020

(86) PCT No.: PCT/CN2020/125433
§ 371 (c)(1),
(2) Date: Apr. 30, 2022

(87) PCT Pub. No.: WO2021/083358
PCT Pub. Date: May 6, 2021

(65) Prior Publication Data
US 2022/0396646 A1    Dec. 15, 2022

(30) Foreign Application Priority Data

Oct. 31, 2019  (CN) .......................... 201911049566.2
Oct. 31, 2019  (CN) .......................... 201911049567.7
(Continued)

(51) Int. Cl.
*C08F 4/80*   (2006.01)
*B01J 23/40*  (2006.01)
(Continued)

(52) U.S. Cl.
CPC .............. *C08F 4/7098* (2013.01); *C08F 4/80* (2013.01); *C08F 220/64* (2013.01); *B01J 23/40* (2013.01); *B01J 31/1805* (2013.01)

(58) Field of Classification Search
None
See application file for complete search history.

(56) References Cited

U.S. PATENT DOCUMENTS 6,544,919 B1    4/2003   Tagge et al.
2002/0156212 A1  10/2002  Johnson et al.
(Continued)

FOREIGN PATENT DOCUMENTS

CN    1107162 A    8/1995
CN    1137527 A    12/1996
(Continued)

OTHER PUBLICATIONS

Gao, R. et al. "One-step synthesis of hollow spherical polyethylene by dispersion polymerization". Journal of Catalysis 2020, 385, 103-106. (Year: 2020).*

(Continued)

*Primary Examiner* — Richard A. Huhn
(74) *Attorney, Agent, or Firm* — NKL Law; Allen Xue

(57) ABSTRACT

A method for preparing an olefin-olefinic alcohol copolymer and an olefin-olefinic alcohol copolymer prepared by the method are provided. The catalyst used in the method for preparing the olefin-olefinic alcohol copolymer has a diimine metal complex as shown in Formula I.

(Continued)

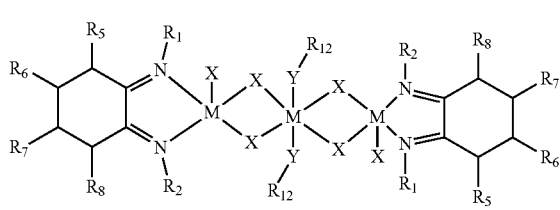

Formula I

30 Claims, 3 Drawing Sheets

(30) Foreign Application Priority Data

| Oct. 31, 2019 | (CN) | 201911049580.2 |
|---|---|---|
| Oct. 31, 2019 | (CN) | 201911049602.5 |
| Oct. 31, 2019 | (CN) | 201911049603.X |
| Oct. 31, 2019 | (CN) | 201911049604.4 |
| Oct. 31, 2019 | (CN) | 201911049741.8 |
| Oct. 31, 2019 | (CN) | 201911049900.4 |

(51) Int. Cl.
*C08F 4/70* (2006.01)
*C08F 220/64* (2006.01)
*B01J 31/18* (2006.01)

(56) References Cited

U.S. PATENT DOCUMENTS

| 2003/0045660 | A1 | 3/2003 | Kristen et al. |
| 2003/0119921 | A1 | 6/2003 | De Bur et al. |
| 2004/0116758 | A1 | 6/2004 | De Boer et al. |
| 2005/0014983 | A1 | 1/2005 | De Bur et al. |
| 2006/0004155 | A1 | 1/2006 | Hong et al. |
| 2010/0152029 | A1 | 6/2010 | Mashima et al. |
| 2011/0021345 | A1 | 1/2011 | Mashima et al. |
| 2018/0105478 | A1 | 4/2018 | Lief et al. |
| 2019/0169086 | A1 | 6/2019 | Kilgore et al. |
| 2020/0325315 | A1* | 10/2020 | Gao .......... C08F 2/06 |

FOREIGN PATENT DOCUMENTS

| CN | 1860142 | A | 11/2006 | |
| CN | 105481998 | A | 4/2016 | |
| CN | 106397259 | A | 2/2017 | |
| CN | 106397261 | A | 2/2017 | |
| CN | 106397262 | A | 2/2017 | |
| CN | 106397264 | A | 2/2017 | |
| CN | 109694432 | A | 4/2019 | |
| CN | 109694433 | A | 4/2019 | |
| CN | 109694434 | A | 4/2019 | |
| CN | 109694435 | A | 4/2019 | |
| CN | 109694436 | A | 4/2019 | |
| CN | 109694438 | A | 4/2019 | |
| DE | 19741989 | A1 | 3/1999 | |
| KR | 20040076965 | A | 9/2004 | |
| RU | 2292343 | C2 | 1/2007 | |
| RU | 2315658 | C2 | 1/2008 | |
| RU | 2346922 | C2 | 2/2009 | |
| WO | 9526968 | A1 | 10/1995 | |
| WO | 9920665 | A1 | 4/1999 | |
| WO | 0006620 | A2 | 2/2000 | |
| WO | 0006620 | A3 | 2/2000 | |
| WO | 0125298 | A1 | 4/2001 | |
| WO | 2004060901 | A1 | 7/2004 | |
| WO | 2004108775 | A | 12/2004 | |
| WO | 2005042150 | A | 5/2005 | |
| WO | 2013064235 | A1 | 5/2013 | |
| WO | 2019080877 | A1 | 5/2019 | |
| WO | WO-2019080876 | A1 * | 5/2019 | ........ C08F 2/06 |

OTHER PUBLICATIONS

Celanese. Innovative Uses of Ethylene Vinyl Acetate Polymers for Advancing Healthcare. 2014. Retrieved from www.celanese.com on Feb. 7, 2025. (Year: 2014).*

Zhou, M. et al., "Synthesis, crystal structures and electrochemical properties of Co(II) and Mn(II) complexes with asymmetric bulky BIAN ligands". Polyhedron 2018, 148, 88-99. (Year: 2018).*

Moret, M-E. et al., "Interaction of Organoplatinum(II) Complexes with Monovalent Coinage Metal Triflates". Journal of the American Chemical Society 2009, 131(15), 5675-5690. (Year: 2009).*

Gao, Rong et al., "One-step synthesis of hollow spherical polyethylene by dispersion polymerization", «Journal of Catalysis» , vol. 385, May 31, 2020; pp. 103-106.

* cited by examiner

METHOD FOR PREPARING OLEFIN-POLAR MONOMER COPOLYMER

TECHNICAL FIELD

The invention belongs to the field of macromolecular polymer preparation, and specifically relates to a method for preparing an olefin-polar monomer copolymer.

BACKGROUND ART

Polyolefin products are inexpensive and excellent in performance, and have a wide range of applications. Under the condition of retaining the original excellent physical and chemical properties of polyolefin, introducing a polar group into the polyolefin molecular chain through chemical synthesis can improve its chemical inertness, printability, wettability and compatibility with other materials, thereby imposing new characteristics that its raw materials do not possess on the polyolefin. At present, high-pressure free radical polymerization is mostly used in industry to promote the direct copolymerization of olefins and polar monomers, and ethylene-vinyl acetate copolymers, ethylene-methyl methacrylate copolymers, and ethylene-acrylic acid copolymers, for example, are produced by such processes. Although high-pressure free radical copolymerization can directly introduce copolymerizable polar monomers into the polyolefin chain, this method requires high temperature and high pressure conditions, high energy consumption, and expensive equipment.

Ethylene-vinyl alcohol (EVOH or EVAL) copolymer is a novel polymer material that integrates the processability of ethylene polymer and the gas barrier properties of vinyl alcohol polymer. It is currently one of the three major barrier resins industrially produced in the world, and it is widely used to package food, medical solutions and other products. Since vinyl alcohol cannot exist independently as a monomer, ethylene-vinyl alcohol copolymer is usually prepared by preparing an ethylene-vinyl acetate copolymer by free-radical polymerization and then alcoholyzing the ethylene-vinyl acetate copolymer. However, a large amount of solvents are needed in the alcoholysis process, and the final saponification product contains a large amount of impurities such as acetic acid and alkali metal salts, which have to be washed off with a large amount of water.

Coordination catalytic copolymerization, as a polymer preparation technology at normal temperature and pressure, has received widespread attention because of its significant role in reducing energy consumption and improving reaction efficiency. The catalyst's participation in the reaction process greatly reduces the activation energy of the copolymerization of olefin monomers and polar monomers, which is beneficial to obtain functional polymers with higher molecular weights at lower temperatures and pressures. At present, only a small amount of literature reports the use of transition metal complexes to catalyze the copolymerization of olefins with unsaturated alcohols or unsaturated carboxylic acids. However, in the prior art, no matter what method is used for polymerization, the polymer obtained is a viscous block solid, which is prone to fouling in the polymerization equipment, bringing difficulties to the transportation of the polymer, solvent removal, granulation, etc.

DISCLOSURES OF THE INVENTION

An object of the present invention is to overcome the shortcomings of the prior art and provide a method for preparing olefin-polar monomer copolymers. The method provided by the present invention does not require subsequent processing such as granulation, and can directly obtain spherical and/or spherical-like polymers with good morphology. Therefore, the method of the present invention has good industrial application prospects.

In a first aspect, the present invention provides a method for preparing an olefin-polar monomer copolymer, comprising copolymerizing an olefin and a polar monomer in the presence of a catalyst and optionally a chain transfer agent to produce the olefin-polar monomer copolymer, wherein, the catalyst comprises a main catalyst and optionally a cocatalyst, the main catalyst comprises a diimine-metal complex represented by Formula I:

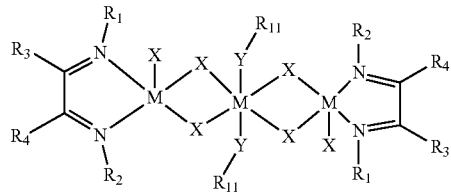

Formula I wherein, $R_1$ and $R_2$ are each independently a C1-C30 hydrocarbyl with or without a substituent Q; $R_3$ and $R_4$ are each independently selected from the group consisting of hydrogen, halogen, hydroxy, C1-C20 hydrocarbyl with or without a substituent Q, and adjacent $R_3$ and $R_4$ groups are optionally joined to form a ring or ring system; each $R_1$ is independently a C1-C20 hydrocarbyl with or without a substituent Q; each Y is independently a Group VIA non-metal atom; each M is independently a Group VIII metal; each X is independently selected from the group consisting of halogen, C1-C10 hydrocarbyl with or without a substituent Q and C1-C10 hydrocarbyloxy with or without a substituent Q, or an amino-imine metal complex represented by Formula I':

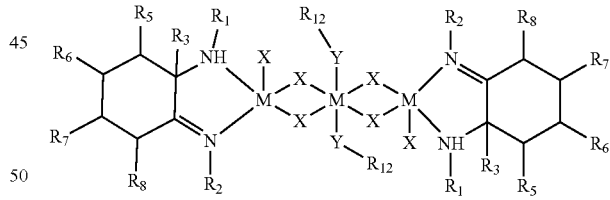

Formula I' wherein, $R_1$ and $R_2$ are each independently a C1-C30 hydrocarbyl with or without a substituent Q; each $R_3$ is independently selected from the group consisting of hydrogen and C1-C20 hydrocarbyl with or without a substituent Q; $R_5$ to $R_8$ are each independently selected from the group consisting of hydrogen, halogen, hydroxy, and C1-C20 hydrocarbyl with or without a substituent Q, and $R_5$ to $R_8$ groups are optionally joined to form a ring or ring system; each $R_{12}$ is independently a C1-C20 hydrocarbyl with or without a substituent Q; each Y is independently a Group VIA non-metal atom; each M is independently a Group VIII metal; each X is independently selected from the group consisting of halogen, C1-C10 hydrocarbyl with or without a substituent Q and C1-C10 hydrocarbyloxy with or without a substituent Q.

As used herein, the term "polar monomer" refers to a monomer carrying at least one polar group such as hydroxyl group, carboxyl group, acid anhydride group, and at least one coordination polymerizable unsaturated bond. The polar monomer has 2-20 carbon atoms, for example 2-16 carbon atoms, for example 2-12 carbon atoms, for example 2-10 carbon atoms. In some embodiments, the polar monomer is selected from the group consisting of olefin monomers carrying one or more hydroxy groups and/or one or more carboxy groups, preferably from the group consisting of α-olefinic monomers (also referred to as vinyl monomers) carrying one or more hydroxy groups and/or one or more carboxy groups.

In a subaspect of the inventive method, the polar monomer is selected from the group consisting of olefinic monomers carrying one or more hydroxy groups, or the polar monomer is selected from the group consisting of olefinic monomers carrying one or more carboxyl groups, and the main catalyst comprises a diimine metal complex represented by Formula Ib:

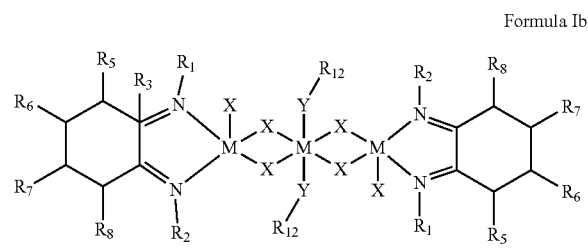

Formula Ib wherein, $R_1$ and $R_2$ are each independently a C1-C30 hydrocarbyl with or without a substituent Q; $R_5$-$R_8$ are each independently selected from the group consisting of hydrogen, halogen, hydroxy, C1-C20 hydrocarbyl with or without a substituent Q, and $R_5$-$R_8$ are optionally joined to form a ring or ring system; each $R_{12}$ is independently a C1-C20 hydrocarbyl with or without a substituent Q; each Y is independently a Group VIA nonmetal atom; each M is independently a Group VIII metal; each X is independently selected from the group consisting of halogen, C1-C10 hydrocarbyl with or without a substituent Q and C1-C10 hydrocarbyloxy with or without a substituent Q.

In some embodiments of this subaspect, in the diimine metal complex, $R_1$ and $R_2$ are independently selected from the group consisting of C1-C20 alkyl with or without a substituent Q and C6-C20 aryl with or without a substituent Q. Preferably, $R_1$ and/or $R_2$ are/is a group represented by Formula A:

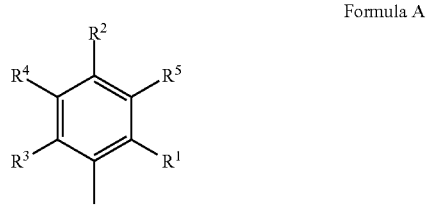

Formula A wherein $R^1$-$R^5$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkoxy with or without a substituent Q, C7-C20 alkaryl with or without a substituent Q and C7-C20 alkaryloxy with or without a substituent Q, and $R^1$-$R^5$ are optionally joined to form a ring or ring system. Preferably, $R^1$-$R^5$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C1-C10 alkoxy with or without a substituent Q, C2-C10 alkenoxy with or without a substituent Q, C2-C10 alkynoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q.

In some embodiments of this subaspect, in the diimine metal complex, each M is independently selected from the group consisting of nickel and palladium.

In some embodiments of this subaspect, in the diimine metal complex, each Y is independently selected from the group consisting of O and S.

In some embodiments of this subaspect, in the diimine metal complex, each X is independently selected from the group consisting of halogen, C1-C10 alkyl with or without a substituent Q and C1-C10 alkoxy with or without a substituent Q, preferably from the group consisting of halogen, C1-C6 alkyl with or without a substituent Q and C1-C6 alkoxy with or without a substituent Q.

In some embodiments of this subaspect, in the diimine metal complex, each $R_{12}$ is independently a C1-C20 alkyl with or without a substituent Q, preferably a C1-C10 alkyl with or without a substituent Q, and more preferably a C1-C6 alkyl with or without a substituent Q.

In some embodiments of this subaspect, in the diimine metal complex, the substituent Q is selected from the group consisting of halogen, hydroxy, C1-C10 alkyl, halogenated C1-C10 alkyl, C1-C10 alkoxy and halogenated C1-C10 alkoxy, preferably from the group consisting of halogen, hydroxy, C1-C6 alkyl, halogenated C1-C6 alkyl, C1-C6 alkoxy and halogenated C1-C6 alkoxy. Preferably, the C1-C6 alkyl is selected from the group consisting of methyl, ethyl, n-propyl, isopropyl, n-butyl, isobutyl, n-pentyl, iso-pentyl, n-hexyl, isohexyl and 3,3-dimethylbutyl. Preferably, the C1-C6 alkoxy is selected from the group consisting of methoxy, ethoxy, n-propoxy, iso-propoxy, n-butoxy, iso-butoxy, n-pentoxy, iso-pentoxy, n-hexoxy, iso-hexoxy and 3,3-dimethylbutoxy.

As used herein, the term "halogen" refers to fluorine, chlorine, bromine or iodine.

In some embodiments of this subaspect, the diimine metal complex is represented by Formula IIIb:

Formula IIIb

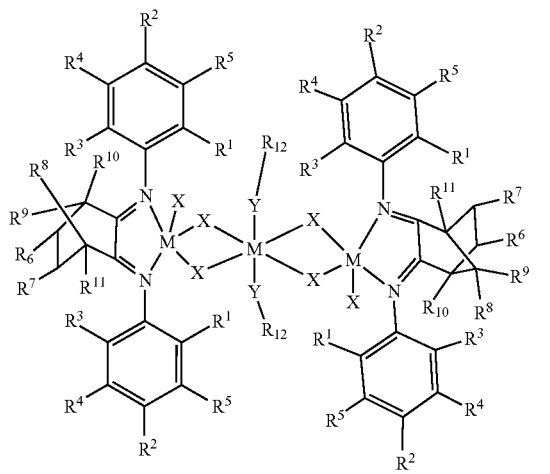

wherein, $R^1$-$R^{11}$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkoxy with or without a substituent Q, C7-C20 alkaryl with or without a substituent Q and C7-C20 alkaryloxy with or without a substituent Q, and M, X, Y and $R_{12}$ are as defined above for Formula Ib.

In some preferred embodiments, in the diimine metal complex of Formula IIIb, $R^1$-$R^{11}$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C1-C10 alkoxy with or without a substituent Q, C2-C10 alkenoxy with or without a substituent Q, C2-C10 alkynoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q. Preferably, $R^1$-$R^{11}$ are each independently selected from the group consisting of hydrogen, C1-C10 alkyl, halogenated C1-C10 alkyl, C1-C10 alkoxy, halogenated C1-C10 alkoxy and halogen, more preferably from the group consisting of hydrogen, C1-C6 alkyl, halogenated C1-C6 alkyl, C1-C6 alkoxy, halogenated C1-C6 alkoxy and halogen.

In some embodiments of this subaspect, the diimine metal complex is selected from the group consisting of:

1) the diimine metal complex represented by Formula IIIb, wherein $R^1$=$R^3$=methyl, $R^2$=$R^4$-$R^7$=$R^{10}$=H, $R^8$=$R^9$=$R^{11}$=methyl, $R_{12}$=ethyl, M=Ni, Y=O, X=Br;
2) the diimine metal complex represented by Formula IIIb, wherein $R^1$=$R^3$=ethyl, $R^2$=$R^4$-$R^7$=$R^{10}$=H, $R^8$=$R^9$=$R^{11}$=methyl, $R_{12}$=ethyl, M=Ni, Y=O, X=Br;
3) the diimine metal complex represented by Formula IIIb, wherein $R^1$=$R^3$=isopropyl, $R^2$=$R^4$-$R^7$=$R^{10}$=H, $R^8$=$R^9$=$R^{11}$=methyl, $R_{12}$=ethyl, M=Ni, Y=O, X=Br;
4) the diimine metal complex represented by Formula IIIb, wherein $R^1$-$R^3$=methyl, $R^4$-$R^7$=$R^{10}$=H, $R^8$=$R^9$=$R^{11}$=methyl, $R_{12}$=ethyl, M=Ni, Y=O, X=Br;
5) the diimine metal complex represented by Formula IIIb, wherein $R^1$=$R^3$=methyl, $R^2$=Br, $R^4$-$R^7$=$R^{10}$=H, $R^8$=$R^9$=$R^{11}$=methyl, $R_{12}$=ethyl, M=Ni, Y=O, X=Br;
6) the diimine metal complex represented by Formula IIIb, wherein $R^1$=$R^3$=F, $R^2$=$R^4$-$R^7$=$R^{10}$=H, $R^8$=$R^9$=$R^{11}$=methyl, $R_{12}$=ethyl, M=Ni, Y=O, X=Br;
7) the diimine metal complex represented by Formula IIIb, wherein $R^1$=$R^3$=Cl, $R^2$=$R^4$-$R^7$=$R^{10}$=H, $R^8$=$R^9$=$R^{11}$=methyl, $R_{12}$=ethyl, M=Ni, Y=O, X=Br;
8) the diimine metal complex represented by Formula IIIb, wherein $R^1$=$R^3$=Br, $R^2$=$R^4$-$R^7$=$R^{10}$=H, $R^8$=$R^9$=$R^{11}$=methyl, $R_{12}$=ethyl, M=Ni, Y=O, X=Br;
9) the diimine metal complex represented by Formula IIIb, wherein $R^1$=$R^3$=methyl, $R^2$=$R^4$-$R^7$=$R^{10}$=H, $R^8$=$R^9$=$R^{11}$=methyl, $R_{12}$=isobutyl, M=Ni, Y=O, X=Br;
10) the diimine metal complex represented by Formula IIIb, wherein $R^1$=$R^3$=ethyl, $R^2$=$R^4$-$R^7$=$R^{10}$=H, $R^8$=$R^9$=$R^{11}$=methyl, $R_{12}$=isobutyl, M=Ni, Y=O, X=Br;
11) the diimine metal complex represented by Formula IIIb, wherein $R^1$=$R^3$=isopropyl, $R^2$=$R^4$-$R^7$=$R^{10}$=H, $R^8$=$R^9$=$R^{11}$=methyl, $R_{12}$=isobutyl, M=Ni, Y=O, X=Br;
12) the diimine metal complex represented by Formula IIIb, wherein $R^1$-$R^3$=methyl, $R^4$-$R^7$=$R^{10}$=H, $R^8$=$R^9$=$R^{11}$=methyl, $R_{12}$=isobutyl, M=Ni, Y=O, X=Br;
13) the diimine metal complex represented by Formula IIIb, wherein $R^1$=$R^3$=methyl, $R^2$=Br, $R^4$-$R^7$=$R^{10}$=H, $R^8$=$R^9$=$R^{11}$=methyl, $R_{12}$=isobutyl, M=Ni, Y=O, X=Br;
14) the diimine metal complex represented by Formula IIIb, wherein $R^1$=$R^3$=F, $R^2$=$R^4$-$R^7$=$R^{10}$=H, $R^8$=$R^9$=$R^{11}$=methyl, $R_{12}$=isobutyl, M=Ni, Y=O, X=Br;
15) the diimine metal complex represented by Formula IIIb, wherein $R^1$=$R^3$=Cl, $R^2$=$R^4$-$R^7$=$R^{10}$=H, $R^8$=$R^9$=$R^{11}$=methyl, $R_{12}$=isobutyl, M=Ni, Y=O, X=Br;
16) the diimine metal complex represented by Formula IIIb, wherein $R^1$=$R^3$=Br, $R^2$=$R^4$-$R^7$=$R^{10}$=H, $R^8$=$R^9$=$R^{11}$=methyl, $R_{12}$=isobutyl, M=Ni, Y=O, X=Br;
17) the diimine metal complex represented by Formula IIIb, wherein $R^1$=$R^3$=methyl, $R^2$=$R^4$-$R^7$=$R^{10}$=H, $R^8$=$R^9$=methyl, $R^{11}$=bromomethyl, $R_{12}$=ethyl, M=Ni, Y=O, X=Br;
18) the diimine metal complex represented by Formula IIIb, wherein $R^1$=$R^3$=ethyl, $R^2$=$R^4$-$R^7$=$R^{10}$=H, $R^8$=$R^9$=methyl, $R^{11}$=bromomethyl, $R_{12}$=ethyl, M=Ni, Y=O, X=Br;
19) the diimine metal complex represented by Formula IIIb, wherein $R^1$=$R^3$=isopropyl, $R^2$=$R^4$-$R^7$=$R^{10}$=H, $R^8$=$R^9$=methyl, $R^{11}$=bromomethyl, $R_{12}$=ethyl, M=Ni, Y=O, X=Br;
20) the diimine metal complex represented by Formula IIIb, wherein $R^1$-$R^3$=methyl, $R^4$-$R^7$=$R^{10}$=H, $R^8$=$R^9$=methyl, $R^{11}$=bromomethyl, $R_{12}$=ethyl, M=Ni, Y=O, X=Br;
21) the diimine metal complex represented by Formula IIIb, wherein $R^1$=$R^3$=methyl, $R^2$=Br, $R^4$-$R^7$=$R^{10}$=H, $R^8$=$R^9$=methyl, $R^{11}$=bromomethyl, $R_{12}$=ethyl, M=Ni, Y=O, X=Br;

22) the diimine metal complex represented by Formula IIIb, wherein $R^1=R^3=F$, $R^2=R^4=R^7=R^{10}=H$, $R^8=R^9=$methyl, $R^{11}=$bromomethyl, $R_{12}=$ethyl, M=Ni, Y=O, X=Br;

23) the diimine metal complex represented by Formula IIIb, wherein $R^1=R^3=Cl$, $R^2=R^4=R^7=R^{10}=H$, $R^8=R^9=$methyl, $R^{11}=$bromomethyl, $R_{12}=$ethyl, M=Ni, Y=O, X=Br;

24) the diimine metal complex represented by Formula IIIb, wherein $R^1=R^3=Br$, $R^2=R^4=R^7=R^{10}=H$, $R^8=R^9=$methyl, $R^{11}=$bromomethyl, $R_{12}=$ethyl, M=Ni, Y=O, X=Br.

In another subaspect of the inventive method, the polar monomer is selected from the group consisting of olefinic monomers carrying one or more hydroxy groups, or the polar monomer is selected from the group consisting of olefinic monomers carrying one or more carboxyl groups, and the main catalyst comprises a diimine metal complex represented by Formula Ic:

Formula Ic

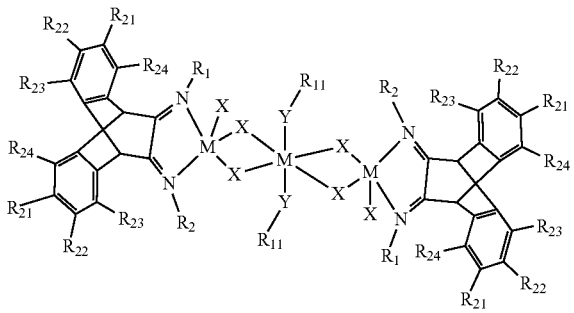

wherein, $R_{21}$-$R_{24}$ are each independently selected from the group consisting of hydrogen, halogen, hydroxy, C1-C20 hydrocarbyl with or without a substituent Q and C1-C20 hydrocarbyloxy with or without a substituent Q, and $R_{21}$-$R_{24}$ are optionally joined to form a ring or ring system; $R_1$, $R_2$, $R_{11}$, Y, M and X are as defined above for Formula I.

In some embodiments of this subaspect, in the diimine metal complex represented by Formula Ic, $R_1$ and $R_2$ are independently selected from the group consisting of C1-C20 alkyl with or without a substituent Q and C6-C20 aryl with or without a substituent Q. Preferably, $R_1$ and/or $R_2$ are/is a group represented by Formula A:

Formula A

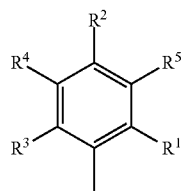

wherein, $R^1$-$R^5$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkoxy with or without a substituent Q, C7-C20 alkaryl with or without a substituent Q and C7-C20 alkaryloxy with or without a substituent Q, and $R^1$-$R^5$ are optionally joined to form a ring or ring system. Preferably, $R^1$-$R^5$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C1-C10 alkoxy with or without a substituent Q, C2-C10 alkenoxy with or without a substituent Q, C2-C10 alkynoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q.

In some embodiments of this subaspect, in the diimine metal complex represented by Formula Ic, each M is independently selected from the group consisting of nickel and palladium.

In some embodiments of this subaspect, in the diimine metal complex represented by Formula Ic, each Y is independently selected from the group consisting of O and S.

In some embodiments of this subaspect, in the diimine metal complex represented by Formula Ic, each X is independently selected from the group consisting of halogen, C1-C10 alkyl with or without a substituent Q and C1-C10 alkoxy with or without a substituent Q, preferably from the group consisting of halogen, C1-C6 alkyl with or without a substituent Q and C1-C6 alkoxy with or without a substituent Q.

In some embodiments of this subaspect, in the diimine metal complex represented by Formula Ic, each Rn is independently a C1-C20 alkyl with or without a substituent Q, preferably a C1-C10 alkyl with or without a substituent Q, and more preferably a C1-C6 alkyl with or without a substituent Q.

In some embodiments of this subaspect, in the diimine metal complex represented by Formula Ic, the substituent Q is selected from the group consisting of halogen, hydroxy, C1-C10 alkyl, halogenated C1-C10 alkyl, C1-C10 alkoxy and halogenated C1-C10 alkoxy, preferably from the group consisting of halogen, hydroxy, C1-C6 alkyl, halogenated C1-C6 alkyl, C1-C6 alkoxy and halogenated C1-C6 alkoxy. Preferably, the C1-C6 alkyl is selected from the group consisting of methyl, ethyl, n-propyl, isopropyl, n-butyl, isobutyl, n-pentyl, isopentyl, n-hexyl, isohexyl and 3,3-dimethylbutyl. Preferably, the C1-C6 alkoxy is selected from the group consisting of methoxy, ethoxy, n-propoxy, iso-propoxy, n-butoxy, iso-butoxy, n-pentoxy, iso-pentoxy, n-hexoxy, iso-hexoxy and 3,3-dimethylbutoxy.

In some embodiments of this subaspect, the diimine metal complex has a structure represented by Formula IIIc:

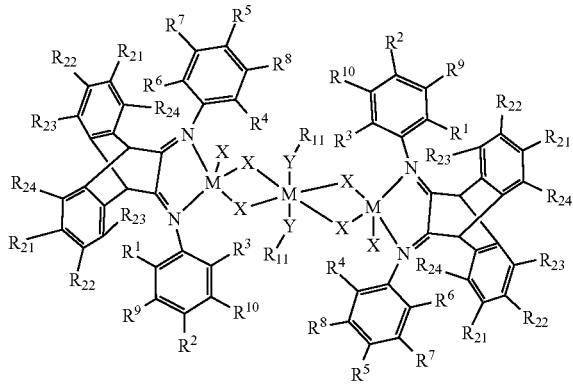

Formula IIIc wherein, $R^1$-$R^{10}$, $R_{21}$-$R_{24}$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkoxy with or without a substituent Q, C7-C20 alkaryl with or without a substituent Q and C7-C20 alkaryloxy with or without a substituent Q, and $R^1$-$R^{10}$ are optionally joined to form a ring or ring system, $R_{21}$-$R_{24}$ are optionally joined to form a ring or ring system; Rn, Y, M and X are as defined above for Formula Ic.

In some embodiments of this subaspect, in the diimine metal complex represented by Formula IIIc, $R^1$-$R^{10}$, $R_{21}$-$R_{24}$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C1-C10 alkoxy with or without a substituent Q, C2-C10 alkenoxy with or without a substituent Q, C2-C10 alkynoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q. Preferably, $R^1$-$R^{10}$, $R_{21}$-$R_{24}$ are each independently selected from the group consisting of hydrogen, C1-C10 alkyl, halogenated C1-C10 alkyl, C1-C10 alkoxy, halogenated C1-C10 alkoxy and halogen, more preferably from the group consisting of hydrogen, C1-C6 alkyl, halogenated C1-C6 alkyl, C1-C6 alkoxy, halogenated C1-C6 alkoxy and halogen.

In some embodiments of this subaspect, the diimine metal complex has a structure represented by Formula IIc:

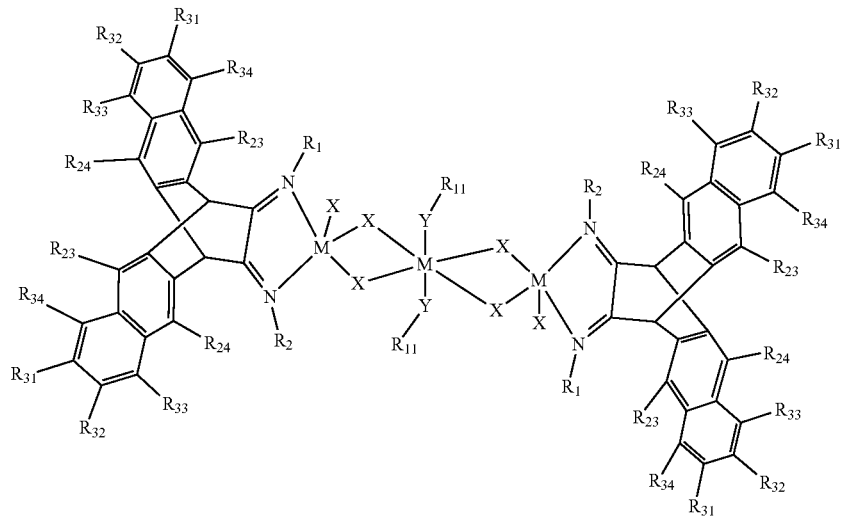

Formula IIc wherein, $R_{31}$-$R_{34}$ have the same meanings as $R_{21}$-$R_{24}$ in Formula Ic, preferably $R_{33}$ and $R_{34}$ are hydrogen; and $R_{11}$, Y, M and X are as defined above for Formula Ic.

In some embodiments, $R_{31}$-$R_{34}$ are each independently selected from the group consisting of hydrogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkoxy with or without a substituent Q, C7-C20 alkaryl with or without a substituent Q, C7-C20 alkaryloxy with or without a substituent Q and halogen. Preferably, $R_{31}$-$R_{34}$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C1-C10 alkoxy with or without a substituent Q, C2-C10 alkenoxy with or without a substituent Q, C2-C10 alkynoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q. More preferably, $R_{31}$-$R_{34}$ are each independently selected from the group consisting of hydrogen, C1-C10 alkyl, halogenated C1-C10 alkyl, C1-C10 alkoxy, halogenated C1-C10 alkoxy and halogen, more preferably from the group consisting of hydrogen, C1-C6 alkyl, halogenated C1-C6 alkyl, C1-C6 alkoxy, halogenated C1-C6 alkoxy and halogen.

In some embodiments of this subaspect, the diimine metal complex is selected from the group consisting of:

1) the complex represented by Formula IIIc, wherein $R^1=R^3=R^4=R^6$=isopropyl, $R^2=R^5=R^7$-$R^{10}=R_{21}=R_{22}=R_{23}=R_{24}$=H, $R_{11}$=ethyl, M=Ni, Y=O, X=Br;
2) the complex represented by Formula IIIc, wherein $R^1=R^3=R^4=R^6$=ethyl, $R^2=R^5=R^7$-$R^{10}=R_{21}=R_{22}=R_{23}=R_{24}$=H, $R_{11}$=ethyl, M=Ni, Y=O, X=Br;
3) the complex represented by Formula IIIc, wherein $R^1=R^3=R^4=R^6$=methyl, $R^2=R^5=R^7$-$R^{10}=R_{21}=R_{22}=R_{23}=R_{24}$=H, $R_{11}$=ethyl, M=Ni, Y=O, X=Br;
4) the complex represented by Formula IIIc, wherein $R^1$-$R^6$=methyl, $R^7$-$R^{10}=R_{21}=R_{22}=R_{23}=R_{24}$=H, $R_{11}$=ethyl, M=Ni, Y=O, X=Br;
5) the complex represented by Formula IIIc, wherein $R^1=R^3=R^4=R^6$=Br, $R^2=R^5=R^7$-$R^{10}=R_{21}=R_{22}=R_{23}=R_{24}$=H, $R_{11}$=ethyl, M=Ni, Y=O, X=Br;
6) the complex represented by Formula IIIc, wherein $R^1=R^3=R^4=R^6$=Cl, $R^2=R^5=R^7$-$R^{10}=R_{21}=R_{22}=R_{23}=R_{24}$=H, $R_{11}$=ethyl, M=Ni, Y=O, X=Br;
7) the complex represented by Formula IIIc, wherein $R^1=R^3=R^4=R^6$=F, $R^2=R^5=R^7$-$R^{10}=R_{21}=R_{22}=R_{23}=R_{24}$=H, $R_{11}$=ethyl, M=Ni, Y=O, X=Br;
8) the complex represented by Formula IIIc, wherein $R^1=R^3=R^4=R^6$=isopropyl, $R^2=R^5=R^7$-$R^{10}=R_{21}=R_{22}=R_{23}=R_{24}$=H, $R_{11}$=isobutyl, M=Ni, Y=O, X=Br;
9) the complex represented by Formula IIIc, wherein $R^1=R^3=R^4=R^6$=ethyl, $R^2=R^5=R^7$-$R^{10}=R_{21}=R_{22}=R_{23}=R_{24}$=H, $R_{11}$=isobutyl, M=Ni, Y=O, X=Br;
10) the complex represented by Formula IIIc, wherein $R^1=R^3=R^4=R^6$=methyl, $R^2=R^5=R^7$-$R^{10}=R_{21}=R_{22}=R_{23}=R_{24}$=H, $R_{11}$=isobutyl, M=Ni, Y=O, X=Br;
11) the complex represented by Formula IIIc, wherein $R^1$-$R^6$=methyl, $R^7$-$R^{10}=R_{21}=R_{22}=R_{23}=R_{24}$=H, $R_{11}$=isobutyl, M=Ni, Y=O, X=Br;
12) the complex represented by Formula IIIc, wherein $R^1=R^3=R^4=R^6$=Br, $R^2=R^5=R^7$-$R^{10}=R_{21}=R_{22}=R_{23}=R_{24}$=H, $R_{11}$=isobutyl, M=Ni, Y=O, X=Br;
13) the complex represented by Formula IIIc, wherein $R^1=R^3=R^4=R^6$=Cl, $R^2=R^5=R^7$-$R^{10}=R_{21}=R_{22}=R_{23}=R_{24}$=H, $R_{11}$=isobutyl, M=Ni, Y=O, X=Br;
14) the complex represented by Formula IIIc, wherein $R^1=R^3=R^4=R^6$=F, $R^2=R^5=R^7$-$R^{10}=R_{21}=R_{22}=R_{23}=R_{24}$=H, $R_{11}$=isobutyl, M=Ni, Y=O, X=Br;
15) the complex represented by Formula IIIc, wherein $R^1=R^3=R^4=R^6$=isopropyl, $R^2=R^5=R^7$-$R^{10}=R_{22}$=H, $R_{21}$=t-butyl, $R_{23}=R_{24}$=H, $R_{11}$=ethyl, M=Ni, Y=O, X=Br;
16) the complex represented by Formula IIIc, wherein $R^1=R^3=R^4=R^6$=ethyl, $R^2=R^5=R^7$-$R^{10}=R_{22}$=H, $R_{21}$=t-butyl, $R_{23}=R_{24}$=H, $R_{11}$=ethyl, M=Ni, Y=O, X=Br;
17) the complex represented by Formula IIIc, wherein $R^1=R^3=R^4=R^6$=methyl, $R^2=R^5=R^7$-$R^{10}=R_{22}$=H, $R_{21}$=t-butyl, $R_{23}=R_{24}$=H, $R_{11}$=ethyl, M=Ni, Y=O, X=Br;
18) the complex represented by Formula IIIc, wherein $R^1$-$R^6$=methyl, $R^7$-$R^{10}=R_{22}$=H, $R_{21}$=t-butyl, $R_{23}=R_{24}$=H, $R_{11}$=ethyl, M=Ni, Y=O, X=Br;
19) the complex represented by Formula IIIc, wherein $R^1=R^3=R^4=R^6$=Br, $R^2=R^5=R^7$-$R^{10}=R_{22}$=H, $R_{21}$=t-butyl, $R_{23}=R_{24}$=H, $R_{11}$=ethyl, M=Ni, Y=O, X=Br;
20) the complex represented by Formula IIIc, wherein $R^1=R^3=R^4=R^6$=Cl, $R^2=R^5=R^7$-$R^{10}=R_{22}$=H, $R_{21}$=t-butyl, $R_{23}=R_{24}$=H, $R_{11}$=ethyl, M=Ni, Y=O, X=Br;
21) the complex represented by Formula IIIc, wherein $R^1=R^3=R^4=R^6$=F, $R^2=R^5=R^7$-$R^{10}=R_{22}$=H, $R_{21}$=t-butyl, $R_{23}=R_{24}$=H, $R_{11}$=ethyl, M=Ni, Y=O, X=Br;
22) the complex represented by Formula IIIc, wherein $R^1=R^3=R^4=R^6$=isopropyl, $R^2=R^5=R^7$-$R^{10}=R_{22}$=H, $R_{21}$=t-butyl, $R_{23}=R_{24}$=H, $R_{11}$=isobutyl, M=Ni, Y=O, X=Br;
23) the complex represented by Formula IIIc, wherein $R^1=R^3=R^4=R^6$=ethyl, $R^2=R^5=R^7$-$R^{10}=R_{22}$=H, $R_{21}$=t-butyl, $R_{23}=R_{24}$=H, $R_{11}$=isobutyl, M=Ni, Y=O, X=Br;
24) the complex represented by Formula IIIc, wherein $R^1=R^3=R^4=R^6$=methyl, $R^2=R^5=R^7$-$R^{10}=R_{22}$=H, $R_{21}$=t-butyl, $R_{23}=R_{24}$=H, $R_{11}$=isobutyl, M=Ni, Y=O, X=Br;
25) the complex represented by Formula IIIc, wherein $R^1$-$R^6$=methyl, $R^7$-$R^{10}=R_{22}$=H, $R_{21}$=t-butyl, $R_{23}=R_{24}$=H, $R_{11}$=isobutyl, M=Ni, Y=O, X=Br;
26) the complex represented by Formula IIIc, wherein $R^1=R^3=R^4=R^6$=Br, $R^2=R^5=R^7$-$R^{10}=R_{22}$=H, $R_{21}$=t-butyl, $R_{23}=R_{24}$=H, $R_{11}$=isobutyl, M=Ni, Y=O, X=Br;
27) the complex represented by Formula IIIc, wherein $R^1=R^3=R^4=R^6$=Cl, $R^2=R^5=R^7$-$R^{10}=R_{22}$=H, $R_{21}$=t-butyl, $R_{23}=R_{24}$=H, $R_{11}$=isobutyl, M=Ni, Y=O, X=Br;
28) the complex represented by Formula IIIc, wherein $R^1=R^3=R^4=R^6$=F, $R^2=R^5=R^7$-$R^{10}=R_{22}$=H, $R_{21}$=t-butyl, $R_{23}=R_{24}$=H, $R_{11}$=isobutyl, M=Ni, Y=O, X=Br;

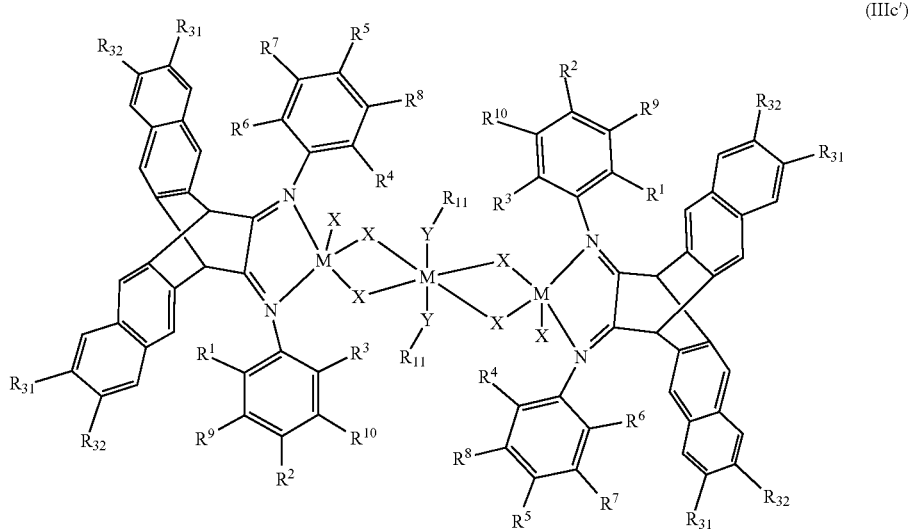

(IIIc')

29) the complex represented by Formula (IIIc'), wherein $R^1=R^3=R^4=R^6$=isopropyl, $R^2=R^5=R^7$-$R^{10}=R_{31}=R_{32}$=H, $R_{11}$=ethyl, M=Ni, Y=O, X=Br;
30) the complex represented by Formula (IIIc'), wherein $R^1=R^3=R^4=R^6$=ethyl, $R^2=R^5=R^7$-$R^{10}=R_{31}=R_{32}$=H, $R_{11}$=ethyl, M=Ni, Y=O, X=Br;
31) the complex represented by Formula (IIIc'), wherein $R^1=R^3=R^4=R^6$=methyl, $R^2=R^5=R^7$-$R^{10}=R_{31}=R_{32}$=H, $R_{11}$=ethyl, M=Ni, Y=O, X=Br;
32) the complex represented by Formula (IIIc'), wherein $R^1$-$R^6$=methyl, $R^7$-$R^{10}=R_{31}=R_{32}$=H, $R_{11}$=ethyl, M=Ni, Y=O, X=Br;
33) the complex represented by Formula (IIIc'), wherein $R^1=R^3=R^4=R^6$=Br, $R^2=R^5=R^7$-$R^{10}=R_{31}=R_{32}$=H, $R_{11}$=ethyl, M=Ni, Y=O, X=Br;
34) the complex represented by Formula (IIIc'), wherein $R^1=R^3=R^4=R^6$=Cl, $R^2=R^5=R^7$-$R^{10}=R_{31}=R_{32}$=H, $R_{11}$=ethyl, M=Ni, Y=O, X=Br;
35) The complex represented by Formula (IIIc'), wherein $R^1=R^3=R^4=R^6$=F, $R^2=R^5=R^7$-$R^{10}=R_{31}=R_{32}$=H, $R_{11}$=ethyl, M=Ni, Y=O, X=Br;
36) the complex represented by Formula (IIIc'), wherein $R^1=R^3=R^4=R^6$=isopropyl, $R^2=R^5=R^7$-$R^{10}=R_{31}=R_{32}$=H, $R_{11}$=isobutyl, M=Ni, Y=O, X=Br;
37) the complex represented by Formula (IIIc'), wherein $R^1=R^3=R^4=R^6$=ethyl, $R^2=R^5=R^7$-$R^{10}=R_{31}=R_{32}$=H, $R_{11}$=isobutyl, M=Ni, Y=O, X=Br;
38) the complex represented by Formula (IIIc'), wherein $R^1=R^3=R^4=R^6$=methyl, $R^2=R^5=R^7$-$R^{10}=R_{31}=R_{32}$=H, $R_{11}$=isobutyl, M=Ni, Y=O, X=Br;
39) the complex represented by Formula (IIIc'), wherein $R^1$-$R^6$=methyl, $R^7$-$R^{10}=R_{31}=R_{32}$=H, $R_{11}$=isobutyl, M=Ni, Y=O, X=Br;
40) the complex represented by Formula (IIIc'), wherein $R^1=R^3=R^4=R^6$=Br, $R^2=R^5=R^7$-$R^{10}=R_{31}=R_{32}$=H, $R_{11}$=isobutyl, M=Ni, Y=O, X=Br;
41) the complex represented by Formula (IIIc'), wherein $R^1=R^3=R^4=R^6$=Cl, $R^2=R^5=R^7$-$R^{10}=R_{31}=R_{32}$=H, $R_{11}$=isobutyl, M=Ni, Y=O, X=Br;
42) The complex represented by Formula (IIIc'), wherein $R^1=R^3=R^4=R^6$=F, $R^2=R^5=R^7$-$R^{10}=R_{31}=R_{32}$=H, $R_{11}$=isobutyl, M=Ni, Y=O, X=Br;
43) the complex represented by Formula (IIIc'), wherein $R^1=R^3=R^4=R^6$=isopropyl, $R^2=R^5=R^7$-$R^{10}$=H, $R_{31}=R_{32}=R_{11}$=ethyl, M=Ni, Y=O, X=Br;
44) the complex represented by Formula (IIIc'), wherein $R^1=R^3=R^4=R^6$=ethyl, $R^2=R^5=R^7$-$R^{10}$=H, $R_{31}=R_{32}=R_{11}$=ethyl, M=Ni, Y=O, X=Br;
45) the complex represented by Formula (IIIc'), wherein $R^1=R^3=R^4=R^6$=methyl, $R^2=R^5=R^7$-$R^{10}$=H, $R_{31}=R_{32}=R_{11}$=ethyl, M=Ni, Y=O, X=Br;
46) the complex represented by Formula (IIIc'), wherein $R^1$-$R^6$=methyl, $R^7$-$R^{10}$=H, $R_{31}=R_{32}=R_{11}$=ethyl, M=Ni, Y=O, X=Br;
47) the complex represented by Formula (IIIc'), wherein $R^1=R^3=R^4=R^6$=Br, $R^2=R^5=R^7$-$R^{10}$=H, $R_{31}=R_{32}=R_{11}$=ethyl, M=Ni, Y=O, X=Br;
48) the complex represented by Formula (IIIc'), wherein $R^1=R^3=R^4=R^6$=Cl, $R^2=R^5=R^7$-$R^{10}$=H, $R_{31}=R_{32}=R_{11}$=ethyl, M=Ni, Y=O, X=Br;
49) The complex represented by Formula (IIIc'), wherein $R^1=R^3=R^4=R^6$=F, $R^2=R^5=R^7$-$R^{10}$=H, $R_{31}=R_{32}=R_{11}$=ethyl, M=Ni, Y=O, X=Br;
50) the complex represented by Formula (IIIc'), wherein $R^1=R^3=R^4=R^6$=isopropyl, $R^2=R^5=R^7$-$R^{10}$=H, $R_{31}=R_{32}=R_{11}$=ethyl, M=Ni, Y=O, X=Br;
51) the complex represented by Formula (IIIc'), wherein $R^1=R^3=R^4=R^6$=ethyl, $R^2=R^5=R^7$-$R^{10}$=H, $R_{31}=R_{32}$=ethyl, $R_{11}$=isobutyl, M=Ni, Y=O, X=Br;
52) the complex represented by Formula (IIIc'), wherein $R^1=R^3=R^4=R^6$=methyl, $R^2=R^5=R^7$-$R^{10}$=H, $R_{31}=R_{32}$=ethyl, $R_{11}$=isobutyl, M=Ni, Y=O, X=Br;
53) the complex represented by Formula (IIIc'), wherein $R^1$-$R^6$=methyl, $R^7$-$R^{10}$=H, $R_{31}=R_{32}$=ethyl, $R_{11}$=isobutyl, M=Ni, Y=O, X=Br;
54) the complex represented by Formula (IIIc'), wherein $R^1=R^3=R^4=R^6$=Br, $R^2=R^5=R^7$-$R^{10}$=H, $R_{31}=R_{32}$=ethyl, $R_{11}$=isobutyl, M=Ni, Y=O, X=Br;
55) the complex represented by Formula (IIIc'), wherein $R^1=R^3=R^4=R^6$=Cl, $R^2=R^5=R^7$-$R^{10}$=H, $R_{31}=R_{32}$=ethyl, $R_{11}$=isobutyl, M=Ni, Y=O, X=Br;
56) The complex represented by Formula (IIIc'), wherein $R^1=R^3=R^4=R^6$=F, $R^2=R^5=R^7$-$R^{10}$=H, $R_{31}=R_{32}$=ethyl, $R_{11}$=isobutyl, M=Ni, Y=O, X=Br.

In another subaspect of the inventive method, the polar monomer is selected from the group consisting of olefinic monomers carrying one or more hydroxy groups, or the polar monomer is selected from the group consisting of olefinic monomers carrying one or more carboxy groups, and the main catalyst comprises the amino-imine metal complex represented by Formula I'.

In some embodiments of this subaspect, in the amino-imine metal complex, $R_1$ and $R_2$ are independently selected from the group consisting of C1-C20 alkyl with or without a substituent Q and C6-C20 aryl with or without a substituent Q. Preferably, $R_1$ and/or $R_2$ are/is a group represented by Formula A:

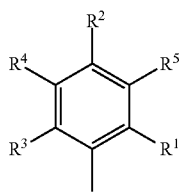

Formula A wherein, $R^1$-$R^5$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkyloxy with or without a substituent Q, C7-C20 alkaryl with or without a substituent Q and C7-C20 alkaryloxy with or without a substituent Q, and $R^1$-$R^5$ are optionally joined to form a ring or ring system. Preferably, $R^1$-$R^5$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C1-C10 alkoxy with or without a substituent Q, C2-C10 alkenoxy with or without a substituent Q, C2-C10 alkynoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q.

In some embodiments of this subaspect, in the amino-imine metal complex, each M is independently selected from the group consisting of nickel and palladium.

In some embodiments of this subaspect, in the amino-imine metal complex, each Y is independently selected from the group consisting of O and S.

In some embodiments of this subaspect, in the amino-imine metal complex, each X is independently selected from the group consisting of halogen, C1-C10 alkyl with or without a substituent Q and C1-C10 alkoxy with or without a substituent Q, preferably from the group consisting of halogen, C1-C6 alkyl with or without a substituent Q and C1-C6 alkoxy with or without a substituent Q.

In some embodiments of this subaspect, in the amino-imine metal complex, each $R_{12}$ is independently a C1-C20 alkyl with or without a substituent Q, preferably a C1-C10 alkyl with or without a substituent Q, and more preferably a C1-C6 alkyl with or without a substituent Q.

In some embodiments of this subaspect, in the amino-imine metal complex, each $R_3$ is independently selected from the group consisting of C1-C20 alkyl with or without a substituent Q, C6-C20 aryl with or without a substituent Q, C7-C20 aralkyl with or without a substituent Q and C7-C20 alkaryl with or without a substituent Q. Preferably, each $R_3$ is independently selected from the group consisting of C1-C10 alkyl with or without a substituent Q, C6-C10 aryl with or without a substituent Q, C7-C15 aralkyl with or without a substituent Q and C7-C15 alkaryl with or without a substituent Q. More preferably, each $R_3$ is independently a C1-C6 alkyl with or without a substituent Q.

In some embodiments of this subaspect, in the amino-imine metal complex, the substituent Q is selected from halogen, hydroxy, C1-C10 alkyl, halogenated C1-C10 alkyl, C1-C10 alkoxy and halogenated C1-C10 alkoxy, preferably from halogen, hydroxy, C1-C6 alkyl, halogenated C1-C6 alkyl, C1-C6 alkoxy and halogenated C1-C6 alkoxy. Preferably, the C1-C6 alkyl is selected from methyl, ethyl, n-propyl, isopropyl, n-butyl, isobutyl, n-pentyl, isopentyl, n-hexyl, isohexyl and 3,3-dimethylbutyl. Preferably, the C1-C6 alkoxy is selected from methoxy, ethoxy, n-propoxy, isopropoxy, n-butoxy, isobutoxy, n-pentoxy, isopentoxy, n-hexyloxy, isohexyloxy and 3,3-dimethylbutoxy.

In some embodiments of this subaspect, the amino-imine metal complex is represented by Formula III'

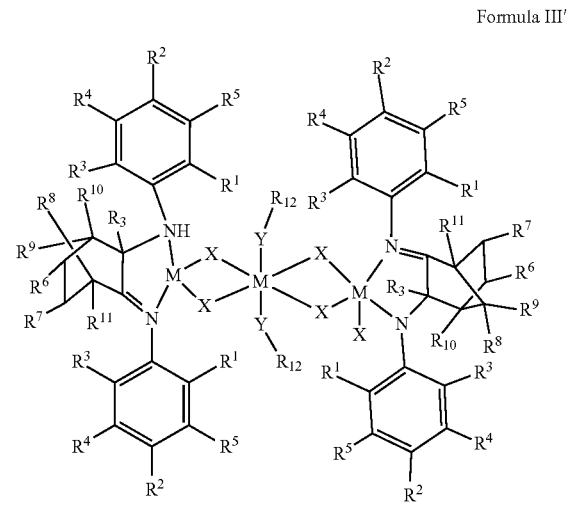

Formula III' wherein, $R^1$-$R^{11}$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkyloxy with or without a substituent Q, C7-C20 alkaryl with or without a substituent Q and C7-C20 alkaryloxy with or without a substituent Q; $R_3$, $R_{12}$, Y, M and X are as defined above for Formula I'.

In some embodiments of this subaspect, in the amino-imine metal complex of Formula III', $R^1$-$R^{11}$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C1-C10 alkoxy with or without a substituent Q, C2-C10 alkenoxy with or without a substituent Q, C2-C10 alkynoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q. Preferably, $R^1$-$R^{11}$ are each independently selected from the group consisting of hydrogen, C1-C10 alkyl, halogenated C1-C10 alkyl, C1-C10 alkoxy, halogenated C1-C10 alkoxy and halogen, more preferably from the group consisting of hydrogen, C1-C6 alkyl, halogenated C1-C6 alkyl, C1-C6 alkoxy, halogenated C1-C6 alkoxy and halogen.

In some embodiments of this subaspect, the amino-imine metal complex is selected from the group consisting of:

the complex represented by Formula III', wherein $R^1=R^3=$isopropyl, $R^2=R^4=R^5=R^6=R^7=R^{10}=H$, $R^8=R^9=R^{11}=CH_3$, $R_3=CH_3$, $R_{12}=$methyl, M=Ni, Y=O, X=Br;

the complex represented by Formula III', wherein $R^1=R^3=$isopropyl, $R^2=R^4=R^5=R^6=R^7=R^{10}=H$, $R^8=R^9=R^{11}=CH_3$, $R_3=$ethyl, $R_{12}=$methyl, M=Ni, Y=O, X=Br;

the complex represented by Formula III', wherein $R^1=R^3=$ethyl, $R^2=R^4=R^5=R^6=R^7=R^{10}=H$, $R^8=R^9=R^{11}=CH_3$, $R_3=CH_3$, $R_{12}=$methyl, M=Ni, Y=O, X=Br;

the complex represented by Formula III', wherein $R^1=R^3=$ethyl, $R^2=R^4=R^5=R^6=R^7=R^{10}=H$, $R^8=R^9=R^{11}=CH_3$, $R_3=$ethyl, $R_{12}=$methyl, M=Ni, Y=O, X=Br;

the complex represented by Formula III', wherein $R^1=R^3=$methyl, $R^2=R^4=R^5=R^6=R^7=R^{10}=H$, $R^8=R^9=R^{11}=CH_3$, $R_3=CH_3$, $R_{12}=$methyl, M=Ni, Y=O, X=Br;

the complex represented by Formula III', wherein $R^1=R^3=$methyl, $R^2=R^4=R^5=R^6=R^7=R^{10}=H$, $R^8=R^9=R^{11}=CH_3$, $R_3=$ethyl, $R_{12}=$methyl, M=Ni, Y=O, X=Br;

the complex represented by Formula III', wherein $R^1=R^3=$isopropyl, $R^2=R^4=R^5=R^6=R^7=R^{10}=H$, $R^8=R^9=R^{11}=CH_3$, $R_3=CH_3$, $R_{12}=$ethyl, M=Ni, Y=O, X=Br;

the complex represented by Formula III', wherein $R^1=R^3=$isopropyl, $R^2=R^4=R^5=R^6=R^7=R^{10}=H$, $R^8=R^9=R^{11}=CH_3$, $R_3=$ethyl, $R_{12}=$ethyl, M=Ni, Y=O, X=Br;

the complex represented by Formula III', wherein $R^1=R^3=$ethyl, $R^2=R^4=R^5=R^6=R^7=R^{10}=H$, $R^8=R^9=R^{11}=CH_3$, $R_3=CH_3$, $R_{12}=$ethyl, M=Ni, Y=O, X=Br;

the complex represented by Formula III', wherein $R^1=R^3=$ethyl, $R^2=R^4=R^5=R^6=R^7=R^{10}=H$, $R^8=R^9=R^{11}=CH_3$, $R_3=$ethyl, $R_{12}=$ethyl, M=Ni, Y=O, X=Br;

the complex represented by Formula III', wherein $R^1=R^3=$methyl, $R^2=R^4=R^5=R^6=R^7=R^{10}=H$, $R^8=R^9=R^{11}=CH_3$, $R_3=CH_3$, $R_{12}=$ethyl, M=Ni, Y=O, X=Br;

the complex represented by Formula III', wherein $R^1=R^3=$methyl, $R^2=R^4=R^5=R^6=R^7=R^{10}=H$, $R^8=R^9=R^{11}=CH_3$, $R_3=$ethyl, $R_{12}=$ethyl, M=Ni, Y=O, X=Br;

the complex represented by Formula III', wherein $R^1=R^3=$methyl, $R^2=R^4=R^5=R^6=R^7=R^{10}=H$, $R^8=R^9=R^{11}=CH_3$, $R_3=CH_3$, $R_{12}=$i-Pr, M=Ni, Y=O, X=Br;

the complex represented by Formula III', wherein $R^1$-$R^3=$methyl, $R^4$-$R^7=R^{10}=H$, $R^8=R^9=R^{11}=CH_3$, $R_3=$ethyl, $R_{12}=$ethyl, M=Ni, Y=O, X=Br;

the complex represented by Formula III', wherein $R^1$-$R^3=$methyl, $R^4$-$R^7=R^{10}=H$, $R^8=R^9=R^{11}=CH_3$, $R_3=CH_3$, $R_{12}=$ethyl, M=Ni, Y=O, X=Br;

the complex represented by Formula III', wherein $R^1=R^3=$methyl, $R^2=$Br, $R^4$-$R^7=R^{10}=H$, $R^8=R^9=R^{11}=R_3=CH_3$, $R_{12}=$ethyl, M=Ni, Y=O, X=Br;

the complex represented by Formula III', wherein $R^1=R^3=$methyl, $R^2=$Br, $R^4$-$R^7=R^{10}=H$, $R^8=R^9=R^{11}=CH_3$, $R_3=$ethyl, $R_{12}=$ethyl, M=Ni, Y=O, X=Br;

the complex represented by Formula III', wherein $R^1=R^3=$F, $R^2=R^4$-$R^7=R^{10}=H$, $R^8=R^9=R^{11}=CH_3$, $R_3=$ethyl, $R_{12}=$ethyl, M=Ni, Y=O, X=Br;

the complex represented by Formula III', wherein $R^1=R^3=$Cl, $R^2=R^4$-$R^7=R^{10}=H$, $R^8=R^9=R^{11}=CH_3$, $R_3=$ethyl, $R_{12}=$ethyl, M=Ni, Y=O, X=Br;

the complex represented by Formula III', wherein $R^1=R^3=$Br, $R^2=R^4$-$R^7=R^{10}=H$, $R^8=R^9=R^{11}=CH_3$, $R_3=$ethyl, $R_{12}=$ethyl, M=Ni, Y=O, X=Br;

the complex represented by Formula III', wherein $R^1=R^3=$methyl, $R^2=R^4$-$R^7=R^{10}=H$, $R^8=R^9=R^{11}=CH_3$, $R_3=$ethyl, $R_{12}=$isobutyl, M=Ni, Y=O, X=Br;

the complex represented by Formula III', wherein $R^1=R^3=$ethyl, $R^2=R^4$-$R^7=R^{10}=H$, $R^8=R^9=R^{11}=CH_3$, $R_3=CH_3$, $R_{12}=$isobutyl, M=Ni, Y=O, X=Br;

the complex represented by Formula III', wherein $R^1=R^3=$isopropyl, $R^2=R^4$-$R^7=R^{10}=H$, $R^8=R^9=R^{11}=CH_3$, $R_3=CH_3$, $R_{12}=$isobutyl, M=Ni, Y=O, X=Br;

the complex represented by Formula III', wherein $R^1$-$R^3=$methyl, $R^4$-$R^7=R^{10}=H$, $R^8=R^9=R^{11}=CH_3$, $R_3=CH_3$, $R_{12}=$isobutyl, M=Ni, Y=O, X=Br;

the complex represented by Formula III', wherein $R^1=R^3=$methyl, $R^2=$Br, $R^4$-$R^7=R^{10}=H$, $R^8=R^9=R^{11}=$methyl, $R_3=$isopropyl, $R_{12}=$isobutyl, M=Ni, Y=O, X=Br; the complex represented by Formula III', wherein $R^1=R^3=$F, $R^2=R^4$-$R^7=R^{10}=H$, $R^8=R^9=R^{11}=CH_3$, $R_3=$isopropyl, $R_{12}=$isobutyl, M=Ni, Y=O, X=Br;

the complex represented by Formula III', wherein $R^1=R^3=$Cl, $R^2=R^4$-$R^7=R^{10}=H$, $R^8=R^9=R^{11}=CH_3$, $R_3=$isopropyl, $R_{12}=$isobutyl, M=Ni, Y=O, X=Br;

the complex represented by Formula III', wherein $R^1=R^3=$Br, $R^2=R^4$-$R^7=R^{10}=H$, $R^8=R^9=R^{11}=CH_3$, $R_3=$isopropyl, $R_{12}=$isobutyl, M=Ni, Y=O, X=Br;

the complex represented by Formula III', wherein $R^1=R^3=$methyl, $R^2=R^4$-$R^7=R^{10}=H$, $R^8=R^9=CH_3$, $R^{11}=$bromomethyl, $R_3=$isopropyl, $R_{12}=$ethyl, M=Ni, Y=O, X=Br; the complex represented by Formula III', wherein $R^1=R^3=$ethyl, $R^2=R^4$-$R^7=R^{10}=H$, $R^8=R^9=CH_3$, $R^{11}=CH_2Br$, $R_3=$isopropyl, $R_{12}=$ethyl, M=Ni, Y=O, X=Br;

the complex represented by Formula III', wherein $R^1=R^3=$isopropyl, $R^2=R^4$-$R^7=R^{10}=H$, $R^8=R^9=CH_3$, $R^{11}=CH_2Br$, $R_3=$ethyl, $R_{12}=$ethyl, M=Ni, Y=O, X=Br;

the complex represented by Formula III', wherein $R^1$-$R^3=$methyl, $R^4$-$R^7=R^{10}=H$, $R^8=R^9=CH_3$, $R^{11}=CH_2Br$, $R_{12}=$ethyl, M=Ni, Y=O, X=Br;

the complex represented by Formula III', wherein $R^1=R^3=$methyl, $R^2=$Br, $R^4$-$R^7=R^{10}=H$, $R^8=R^9=$methyl, R$_3$=ethyl, R$^{11}$=CH$_2$Br, R$_{12}$=ethyl, M=Ni, Y=O, X=Br;

the complex represented by Formula III', wherein R$^1$=R$^3$=F, R$^2$=R$^4$-R$^7$=R$^{10}$=H, R$^8$=R$^9$=methyl, R$^{11}$=CH$_2$Br, R$_3$=isobutyl, R$_{12}$=ethyl, M=Ni, Y=O, X=Br;

the complex represented by Formula III', wherein R$^1$=R$^3$=Cl, R$^2$=R$^4$-R$^7$=R$^{10}$=H, R$^8$=R$^9$=methyl, R$^{11}$=CH$_2$Br, R$_3$=isobutyl, R$_{12}$=ethyl, M=Ni, Y=O, X=Br;

the complex represented by Formula III', wherein R$^1$=R$^3$=Br, R$^2$=R$^4$-R$^7$=R$^{10}$=H, R$^8$=R$^9$=methyl, R$^{11}$=CH$_2$Br, R$_3$=isobutyl, R$_{12}$=ethyl, M=Ni, Y=O, X=Br.

In some embodiments of this subaspect, the amino-imine metal complex has a structure as shown by Formula IV'

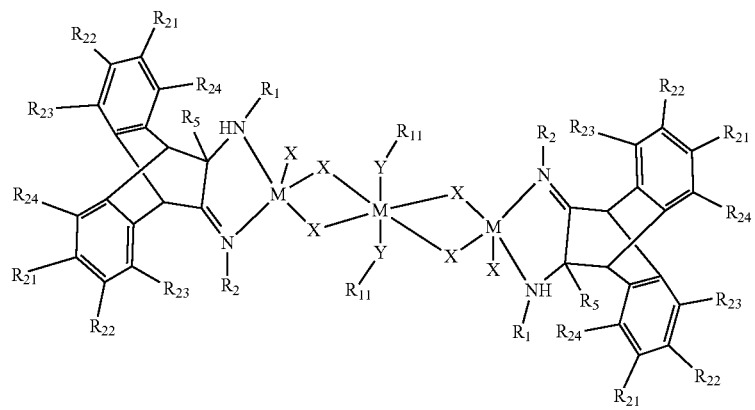

Formula IV' wherein, R$_1$ and R$_2$ are each independently a C1-C30 hydrocarbyl with or without a substituent Q; R$_{21}$-R$_{24}$ are each independently selected from the group consisting of hydrogen, halogen, hydroxy, C1-C20 hydrocarbyl with or without a substituent Q and C1-C20 hydrocarbyloxy with or without a substituent Q, and R$_{21}$-R$_{24}$ are optionally joined to form a ring or ring system, preferably a substituted or unsubstituted benzene ring; each R$_5$ is independently selected from the group consisting of hydrogen and C1-C20 hydrocarbyl with or without a substituent Q; each R$_1$ is independently a C1-C20 hydrocarbyl with or without a substituent Q; each Y is independently a Group VIA nonmetal atom; each M is independently a Group VIII metal; each X is independently selected from the group consisting of halogen, C1-C10 hydrocarbyl with or without a substituent Q and C1-C10 hydrocarbyloxy with or without a substituent Q.

The term "substituted" as used herein refers to substitution by a substituent Q, for example.

In some embodiments of this subaspect, in the amino-imine metal complex of Formula IV', R$_1$ and R$_2$ are independently selected from the group consisting of C1-C20 alkyl with or without a substituent Q and C6-C20 aryl with or without a substituent Q. Preferably, R$_1$ and/or R$_2$ are/is a group represented by Formula A:

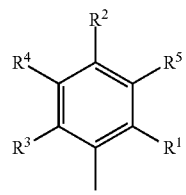

Formula A wherein, R$^1$-R$^5$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkyloxy with or without a substituent Q, C7-C20 alkaryl with or without a substituent Q and C7-C20 alkaryloxy with or without a substituent Q, and R$^1$-R$^5$ are optionally joined to form a ring or ring system. Preferably, R$^1$-R$^5$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C1-C10 alkoxy with or without a substituent Q, C2-C10 alkenoxy with or without a substituent Q, C2-C10 alkynoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q. More preferably, R$^1$-R$^5$ are each independently selected from the group consisting of hydrogen, halogen, hydroxy, C1-C6 alkyl with or without a substituent Q, C2-C6 alkenyl with or without a substituent Q, C2-C6 alkynyl with or without a substituent Q, C1-C6 alkoxy with or without a substituent Q, C2-C6 alkenyloxy with or without a substituent Q, C2-C6 alkynyloxy with or without a substituent Q, C6-C10 aryl with or without a substituent Q, C7-C10 aralkyl group with or without a substituent Q, C7-C10 alkaryl with or without a substituent Q, C6-C10 aryloxy with or without a substituent Q, C7-C10 aralkyloxy with or without a substituent Q, and C7-C10 alkaryloxy with or without a substituent Q.

In some embodiments of this subaspect, in the amino-imine metal complex of Formula IV', each M is independently selected from the group consisting of nickel and palladium.

In some embodiments of this subaspect, in the amino-imine metal complex of Formula IV', each Y is independently selected from the group consisting of O and S.

In some embodiments of this subaspect, in the amino-imine metal complex of Formula IV', each X is independently selected from the group consisting of halogen, C1-C10 alkyl with or without a substituent Q and C1-C10 alkoxy with or without a substituent Q, preferably from the group consisting of halogen, C1-C6 alkyl with or without a substituent Q and C1-C6 alkoxy with or without a substituent Q.

In some embodiments of this subaspect, in the amino-imine metal complex of Formula IV', each Rn is independently a C1-C20 alkyl with or without a substituent Q, preferably a C1-C10 alkyl with or without a substituent Q, and more preferably a C1-C6 alkyl with or without a substituent Q.

In some embodiments of this subaspect, in the amino-imine metal complex of Formula IV', each $R_5$ is independently selected from the group consisting of C1-C20 alkyl with or without a substituent Q, C6-C20 aryl with or without a substituent Q, C7-C20 aralkyl with or without a substituent Q and C7-C20 alkaryl with or without a substituent Q. Preferably, each $R_5$ is independently selected from the group consisting of C1-C10 alkyl with or without a substituent Q, C6-C10 aryl with or without a substituent Q, C7-C15 aralkyl with or without a substituent Q and C7-C15 alkaryl with or without a substituent Q. More preferably, each $R_5$ is independently selected from the group consisting of C1-C6 alkyl with or without a substituent Q.

In some embodiments of this subaspect, in the amino-imine metal complex of Formula IV', the substituent Q is selected from halogen, hydroxy, C1-C10 alkyl, halogenated C1-C10 alkyl, C1-C10 alkoxy and halogenated C1-C10 alkoxy, preferably from halogen, hydroxy, C1-C6 alkyl, halogenated C1-C6 alkyl, C1-C6 alkoxy and halogenated C1-C6 alkoxy. Preferably, the C1-C6 alkyl is selected from methyl, ethyl, n-propyl, isopropyl, n-butyl, isobutyl, n-pentyl, isopentyl, n-hexyl, isohexyl and 3,3-dimethylbutyl. Preferably, the C1-C6 alkoxy is selected from methoxy, ethoxy, n-propoxy, isopropoxy, n-butoxy, isobutoxy, n-pentoxy, isopentoxy, n-hexyloxy, isohexyloxy and 3,3-dimethylbutoxy.

In some embodiments of this subaspect, in the amino-imine metal complex of Formula IV', $R_{21}$-$R_{24}$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C7-C20 aralkyl with or without a substituent Q, C7-C20 alkaryl with or without a substituent Q, C6-C20 aryloxy with or without a substituent Q, C7-C20 aralkyloxy with or without a substituent Q and C7-C20 alkaryloxy with or without a substituent Q, and $R_{21}$-$R_{24}$ are optionally joined to form a ring or ring system. Preferably, $R_{21}$-$R_{24}$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C1-C10 alkoxy with or without a substituent Q, C2-C10 alkenoxy with or without a substituent Q, C2-C10 alkynoxy with or without a substituent Q, C6-C15 aryl with or without a substituent Q, C7-C15 aralkyl with or without a substituent Q, C7-C15 alkaryl with or without a substituent Q, C6-C15 aryloxy with or without a substituent Q, C7-C15 aralkoxy with or without a substituent Q and C7-C15 alkaryloxy with or without a substituent Q. More preferably, $R_{21}$-$R_{24}$ are each independently selected from the group consisting of hydrogen, C1-C10 alkyl, halogenated C1-C10 alkyl, C1-C10 alkoxy, halogenated C1-C10 alkoxy and halogen, more preferably from the group consisting of hydrogen, C1-C6 alkyl, halogenated C1-C6 alkyl, C1-C6 alkoxy, halogenated C1-C6 alkoxy and halogen.

In some embodiments of this subaspect, the amino-imine metal complex has a structure as shown by Formula IV' a:

Formula IV' a

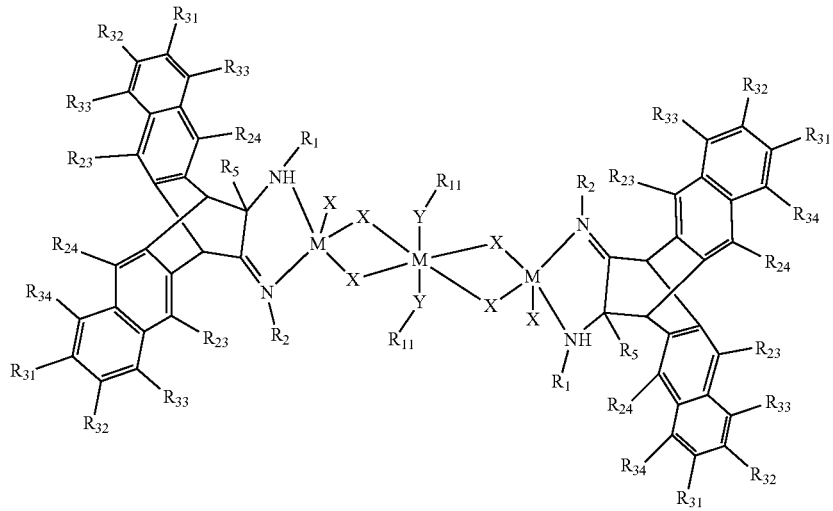

wherein $R_{31}$-$R_{34}$ have the same meanings as $R_{21}$-$R_{24}$ in Formula IV', preferably $R_{33}$ and $R_{34}$ are hydrogen, and $R_1$, $R_2$, $R_5$, $R_{11}$, Y, M and X are as defined above for Formula IV'.

In some embodiments of this subaspect, the amino-imine metal complex is represented by the following Formula V or V'

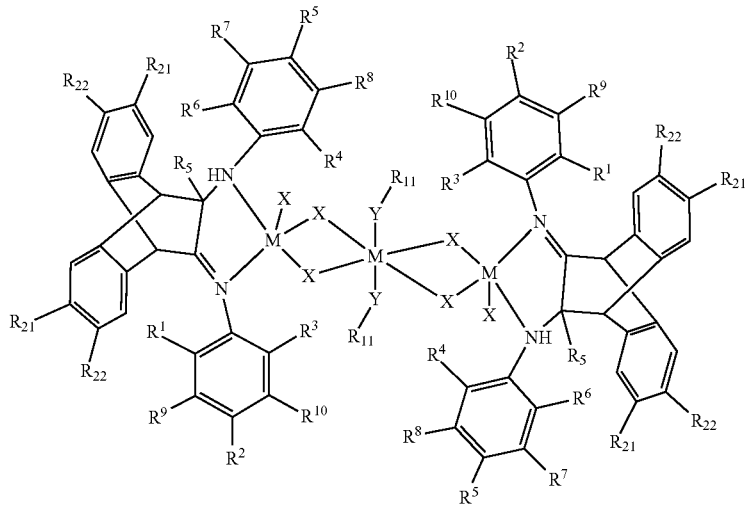

Formula V

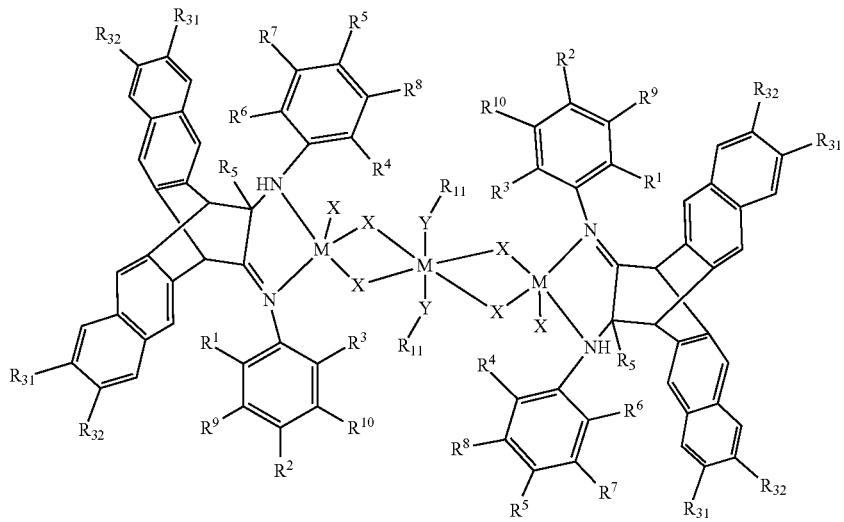

Formula V' wherein the individual symbols are as defined above. Preferably, the amino-imine metal complex is selected from the group consisting of:

1) the complex represented by Formula V, wherein $R^1=R^3=R^4=R^6$=isopropyl, $R^2=R^5=R^7$-$R^{10}=R_{21}=R_{22}$=H, $R_5$=CH$_3$, $R_{11}$=ethyl, M=Ni, Y=O, X=Br;
2) the complex represented by Formula V, wherein $R^1=R^3=R^4=R^6$=ethyl, $R^2=R^5=R^7$-$R^{10}=R_{21}=R_{22}$=H, $R_5$=CH$_3$, $R_{11}$=ethyl, M=Ni, Y=O, X=Br;
3) the complex represented by Formula V, wherein $R^1=R^3=R^4=R^6$=methyl, $R^2=R^5=R^7$-$R^{10}=R_{21}=R_{22}$=H, $R_5$=CH$_3$, $R_{11}$=ethyl, M=Ni, Y=O, X=Br;
4) the complex represented by Formula V, wherein $R^1$-$R^6$=methyl, $R^7$-$R^{10}=R_{21}=R_{22}$=H, $R_5$=CH$_3$, $R_{11}$=ethyl, M=Ni, Y=O, X=Br;
5) the complex represented by Formula V, wherein $R^1=R^3=R^4=R^6$=Br, $R^2=R^5=R^7$-$R^{10}=R_{21}=R_{22}$=H, $R_5$=CH$_3$, $R_{11}$=ethyl, M=Ni, Y=O, X=Br;
6) the complex represented by Formula V, wherein $R^1=R^3=R^4=R^6$=Cl, $R^2=R^5=R^7$-$R^{10}=R_{21}=R_{22}$=H, $R_5$=CH$_3$, $R_{11}$=ethyl, M=Ni, Y=O, X=Br;
7) the complex represented by Formula V, wherein $R^1=R^3=R^4=R^6$=F, $R^2=R^5=R^7$-$R^{10}=R_{21}=R_{22}$=H, $R_5$=CH$_3$, $R_{11}$=ethyl, M=Ni, Y=O, X=Br;
8) the complex represented by Formula V, wherein $R^1=R^3=R^4=R^6$=isopropyl, $R^2=R^5=R^7$-$R^{10}=R_{21}=R_{22}$=H, $R_5=R_{11}$=ethyl, M=Ni, Y=O, X=Br;
9) the complex represented by Formula V, wherein $R^1=R^3=R^4=R^6$=ethyl, $R^2=R^5=R^7$-$R^{10}=R_{21}=R_{22}$=H, $R_5=R_{11}$=ethyl, M=Ni, Y=O, X=Br;
10) the complex represented by Formula V, wherein $R^1=R^3=R^4=R^6$=methyl, $R^2=R^5=R^7$-$R^{10}=R_{21}=R_{22}$=H, $R_5=R_{11}$=ethyl, M=Ni, Y=O, X=Br;
11) the complex represented by Formula V, wherein $R^1$-$R^6$=methyl, $R^7$-$R^{10}=R_{21}=R_{22}$=H, $R_5=R_{11}$=ethyl, M=Ni, Y=O, X=Br;

12) the complex represented by Formula V, wherein $R^1=R^3=R^4=R^6=Br$, $R^2=R^5=R^7$-$R^{10}=R_{21}=R_{22}=H$, $R_5=R_{11}=$ethyl, M=Ni, Y=O, X=Br;
13) the complex represented by Formula V, wherein $R^1=R^3=R^4=R^6=Cl$, $R^2=R^5=R^7$-$R^{10}=R_{21}=R_{22}=H$, $R_5=R_{11}=$ethyl, M=Ni, Y=O, X=Br;
14) the complex represented by Formula V, wherein $R^1=R^3=R^4=R^6=F$, $R^2=R^5=R^7$-$R^{10}=R_{21}=R_{22}=H$, $R_5=R_{11}=$ethyl, M=Ni, Y=O, X=Br;
15) the complex represented by Formula V, wherein $R^1=R^3=R^4=R^6=$isopropyl, $R^2=R^5=R^7$-$R^{10}=R_{21}=R_{22}=H$, $R_5=CH_3$, $R_{11}=$isobutyl, M=Ni, Y=O, X=Br;
16) the complex represented by Formula V, wherein $R^1=R^3=R^4=R^6=$ethyl, $R^2=R^5=R^7$-$R^{10}=R_{21}=R_{22}=H$, $R_5=CH_3$, $R_{11}=$isobutyl, M=Ni, Y=O, X=Br;
17) the complex represented by Formula V, wherein $R^1=R^3=R^4=R^6=$methyl, $R^2=R^5=R^7$-$R^{10}=R_{21}=R_{22}=H$, $R_5=CH_3$, $R_{11}=$isobutyl, M=Ni, Y=O, X=Br;
18) the complex represented by Formula V, wherein $R^1$-$R^6=$methyl, $R^7$-$R^{10}=R_{21}=R_{22}=H$, $R_5=CH_3$, $R_1=$isobutyl, M=Ni, Y=O, X=Br;
19) the complex represented by Formula V, wherein $R^1=R^3=R^4=R^6=Br$, $R^2=R^5=R^7$-$R^{10}=R_{21}=R_{22}=H$, $R_5=CH_3$, $R_{11}=$isobutyl, M=Ni, Y=O, X=Br;
20) the complex represented by Formula V, wherein $R^1=R^3=R^4=R^6=Cl$, $R^2=R^5=R^7$-$R^{10}=R_{21}=R_{22}=H$, $R_5=CH_3$, $R_{11}=$isobutyl, M=Ni, Y=O, X=Br;
21) the complex represented by Formula V, wherein $R^1=R^3=R^4=R^6=F$, $R^2=R^5=R^7$-$R^{10}=R_{21}=R_{22}=H$, $R_5=CH_3$, $R_{11}=$isobutyl, M=Ni, Y=O, X=Br;
22) the complex represented by Formula V, wherein $R^1=R^3=R^4=R^6=$isopropyl, $R^2=R^5=R^7$-$R^{10}=R_{22}=H$, $R_{21}=$t-butyl, $R_5=CH_3$, $R_1=$ethyl, M=Ni, Y=O, X=Br;
23) the complex represented by Formula V, wherein $R^1=R^3=R^4=R^6=$ethyl, $R^2=R^5=R^7$-$R^{10}=R_{22}=H$, $R_{21}=$t-butyl, $R_5=CH_3$, $R_1=$ethyl, M=Ni, Y=O, X=Br;
24) the complex represented by Formula V, wherein $R^1=R^3=R^4=R^6=$methyl, $R^2=R^5=R^7$-$R^{10}=R_{22}=H$, $R_{21}=$t-butyl, $R_5=CH_3$, $R_1=$ethyl, M=Ni, Y=O, X=Br;
25) the complex represented by Formula V, wherein $R^1$-$R^6=$methyl, $R^7$-$R^{10}=R_{22}=H$, $R_{21}=$t-butyl, $R_5=CH_3$, $R_1=$ethyl, M=Ni, Y=O, X=Br;
26) the complex represented by Formula V, wherein $R^1=R^3=R^4=R^6=Br$, $R^2=R^5=R^7$-$R^{10}=R_{22}=H$, $R_{21}=$t-butyl, $R_5=CH_3$, $R_{11}=$ethyl, M=Ni, Y=O, X=Br;
27) the complex represented by Formula V, wherein $R^1=R^3=R^4=R^6=Cl$, $R^2=R^5=R^7$-$R^{10}=R_{22}=H$, $R_{21}=$t-butyl, $R_5=CH_3$, $R_{11}=$ethyl, M=Ni, Y=O, X=Br;
28) the complex represented by Formula V, wherein $R^1=R^3=R^4=R^6=F$, $R^2=R^5=R^7$-$R^{10}=R_{22}=H$, $R_{21}=$t-butyl, $R_5=CH_3$, $R_{11}=$ethyl, M=Ni, Y=O, X=Br;
29) the complex represented by Formula V, wherein $R^1=R^3=R^4=R^6=$isopropyl, $R^2=R^5=R^7$-$R^{10}=R_{22}=H$, $R_{21}=$t-butyl, $R_5=CH_3$, $R_{11}=$isobutyl, M=Ni, Y=O, X=Br;
30) the complex represented by Formula V, wherein $R^1=R^3=R^4=R^6=$ethyl, $R^2=R^5=R^7$-$R^{10}=R_{22}=H$, $R_{21}=$t-butyl, $R_5=CH_3$, $R_{11}=$isobutyl, M=Ni, Y=O, X=Br;
31) the complex represented by Formula V, wherein $R^1=R^3=R^4=R^6=$methyl, $R^2=R^5=R^7$-$R^{10}=R_{22}=H$, $R_{21}=$t-butyl, $R_5=CH_3$, $R_{11}=$isobutyl, M=Ni, Y=O, X=Br;
32) the complex represented by Formula V, wherein $R^1$-$R^6=$methyl, $R^7$-$R^{10}=R_{22}=H$, $R_{21}=$t-butyl, $R_5=CH_3$, $R_1=$isobutyl, M=Ni, Y=O, X=Br;
33) the complex represented by Formula V, wherein $R^1=R^3=R^4=R^6=Br$, $R^2=R^5=R^7$-$R^{10}=R_{22}=H$, $R_{21}=$t-butyl, $R_5=CH_3$, $R_{11}=$isobutyl, M=Ni, Y=O, X=Br;
34) the complex represented by Formula V, wherein $R^1=R^3=R^4=R^6=Cl$, $R^2=R^5=R^7$-$R^{10}=R_{22}=H$, $R_{21}=$t-butyl, $R_5=CH_3$, $R_{11}=$isobutyl, M=Ni, Y=O, X=Br;
35) the complex represented by Formula V, wherein $R^1=R^3=R^4=R^6=F$, $R^2=R^5=R^7$-$R^{10}=R_{22}=H$, $R_{21}=$t-butyl, $R_5=CH_3$, $R_{11}=$isobutyl, M=Ni, Y=O, X=Br;
36) the complex represented by Formula V', wherein $R^1=R^3=R^4=R^6=$isopropyl, $R^2=R^5=R^7$-$R^{10}=R_{31}=R_{32}=H$, $R_5=CH_3$, $R_{11}=$ethyl, M=Ni, Y=O, X=Br;
37) the complex represented by Formula V', wherein $R^1=R^3=R^4=R^6=$ethyl, $R^2=R^5=R^7$-$R^{10}=R_{31}=R_{32}=H$, $R_5=CH_3$, $R_{11}=$ethyl, M=Ni, Y=O, X=Br;
38) the complex represented by Formula V', wherein $R^1=R^3=R^4=R^6=$methyl, $R^2=R^5=R^7$-$R^{10}=R_{31}=R_{32}=H$, $R_5=CH_3$, $R_{11}=$ethyl, M=Ni, Y=O, X=Br;
39) the complex represented by Formula V', wherein $R^1$-$R^6=$methyl, $R^7$-$R^{10}=R_{31}=R_{32}=H$, $R_5=CH_3$, $R_{11}=$ethyl, M=Ni, Y=O, X=Br;
40) the complex represented by Formula V', wherein $R^1=R^3=R^4=R^6=Br$, $R^2=R^5=R^7$-$R^{10}=R_{31}=R_{32}=H$, $R_5=CH_3$, $R_{11}=$ethyl, M=Ni, Y=O, X=Br;
41) the complex represented by Formula V', wherein $R^1=R^3=R^4=R^6=Cl$, $R^2=R^5=R^7$-$R^{10}=R_{31}=R_{32}=H$, $R_5=CH_3$, $R_{11}=$ethyl, M=Ni, Y=O, X=Br;
42) the complex represented by Formula V', wherein $R^1=R^3=R^4=R^6=F$, $R^2=R^5=R^7$-$R^{10}=R_{31}=R_{32}=H$, $R_5=CH_3$, $R_{11}=$ethyl, M=Ni, Y=O, X=Br;
43) the complex represented by Formula V', wherein $R^1=R^3=R^4=R^6=$isopropyl, $R^2=R^5=R^7$-$R^{10}=R_{31}=R_{32}=H$, $R_5=CH_3$, $R_{11}=$isobutyl, M=Ni, Y=O, X=Br;
44) the complex represented by Formula V', wherein $R^1=R^3=R^4=R^6=$ethyl, $R^2=R^5=R^7$-$R^{10}=R_{31}=R_{32}=H$, $R_5=CH_3$, $R_{11}=$isobutyl, M=Ni, Y=O, X=Br;
45) the complex represented by Formula V', wherein $R^1=R^3=R^4=R^6=$methyl, $R^2=R^5=R^7$-$R^{10}=R_{31}=R_{32}=H$, $R_5=CH_3$, $R_{11}=$isobutyl, M=Ni, Y=O, X=Br;
46) the complex represented by Formula V', wherein $R^1$-$R^6=$methyl, $R^7$-$R^{10}=R_{31}=R_{32}=H$, $R_5=CH_3$, $R_{11}=$isobutyl, M=Ni, Y=O, X=Br;
47) the complex represented by Formula V', wherein $R^1=R^3=R^4=R^6=Br$, $R^2=R^5=R^7$-$R^{10}=R_{31}=R_{32}=H$, $R_5=CH_3$, $R_{11}=$isobutyl, M=Ni, Y=O, X=Br;
48) the complex represented by Formula V', wherein $R^1=R^3=R^4=R^6=Cl$, $R^2=R^5=R^7$-$R^{10}=R_{31}=R_{32}=H$, $R_5=CH_3$, $R_{11}=$isobutyl, M=Ni, Y=O, X=Br;
49) the complex represented by Formula V', wherein $R^1=R^3=R^4=R^6=F$, $R^2=R^5=R^7$-$R^{10}=R_{31}=R_{32}=H$, $R_5=CH_3$, $R_{11}=$isobutyl, M=Ni, Y=O, X=Br;
50) the complex represented by Formula V', wherein $R^1=R^3=R^4=R^6=$isopropyl, $R^2=R^5=R^7$-$R^{10}=H$ $R_{31}=R_{32}=R_{11}=$ethyl, $R_5=CH_3$, M=Ni, Y=O, X=Br;
51) the complex represented by Formula V', wherein $R^1=R^3=R^4=R^6=$ethyl, $R^2=R^5=R^7$-$R^{10}=H$, $R_{31}=R_{32}=R_{11}=$ethyl, $R_5=CH_3$, M=Ni, Y=O, X=Br;
52) the complex represented by Formula V', wherein $R^1=R^3=R^4=R^6=$methyl, $R^2=R^5=R^7$-$R^{10}=H$, $R_{31}=R_{32}=R_{11}=$ethyl, $R_5=CH_3$, M=Ni, Y=O, X=Br;
53) the complex represented by Formula V', wherein $R^1$-$R^6=$methyl, $R^7$-$R^{10}=H$, $R_{31}=R_{32}=R_{11}=$ethyl, $R_5=CH_3$, M=Ni, Y=O, X=Br;

54) the complex represented by Formula V', wherein $R^1=R^3=R^4=R^6=Br$, $R^2=R^5=R^7-R^{10}=H$, $R_{31}=R_{32}=R_{11}=$ethyl, $R_5=CH_3$, M=Ni, Y=O, X=Br;
55) the complex represented by Formula V', wherein $R^1=R^3=R^4=R^6=Cl$, $R^2=R^5=R^7-R^{10}=H$, $R_{31}=R_{32}=R_{11}=$ethyl, $R_5=CH_3$, M=Ni, Y=O, X=Br;
56) the complex represented by Formula V', wherein $R^1=R^3=R^4=R^6=F$, $R^2=R^5=R^7-R^{10}=H$, $R_{31}=R_{32}=R_{11}=$ethyl, $R_5=CH_3$, M=Ni, Y=O, X=Br;
57) the complex represented by Formula V', wherein $R^1=R^3=R^4=R^6=$isopropyl, $R^2=R^5=R^7-R^{10}=H$, $R_{31}=R_{32}=R_{11}=$ethyl, $R_5=CH_3$, M=Ni, Y=O, X=Br;
58) the complex represented by Formula V', wherein $R^1=R^3=R^4=R^6=$ethyl, $R^2=R^5=R^7-R^{10}=H$, $R_{31}=R_{32}=$ethyl, $R_5=CH_3$, $R_{11}=$isobutyl, M=Ni, Y=O, X=Br;
59) the complex represented by Formula V', wherein $R^1=R^3=R^4=R^6=$methyl, $R^2=R^5=R^7-R^{10}=H$, $R_{31}=R_{32}=$ethyl, $R_5=CH_3$, $R_{11}=$isobutyl, M=Ni, Y=O, X=Br;
60) the complex represented by Formula V', wherein $R^1-R^6=$methyl, $R^7-R^{10}=H$, $R_{31}=R_{32}=$ethyl, $R_5=CH_3$, $R_{11}=$isobutyl, M=Ni, Y=O, X=Br;
61) the complex represented by Formula V', wherein $R^1=R^3=R^4=R^6=Br$, $R^2=R^5=R^7-R^{10}=H$, $R_{31}=R_{32}=$ethyl, $R_5=CH_3$, $R_{11}=$isobutyl, M=Ni, Y=O, X=Br;
62) the complex represented by Formula V', wherein $R^1=R^3=R^4=R^6=Cl$, $R^2=R^5=R^7-R^{10}=H$, $R_{31}=R_{32}=$ethyl, $R_5=CH_3$, $R_{11}=$isobutyl, M=Ni, Y=O, X=Br;
63) the complex represented by Formula V', wherein $R^1=R^3=R^4=R^6=F$, $R^2=R^5=R^7-R^{10}=H$, $R_{31}=R_{32}=$ethyl, $R_5=CH_3$, $R_{11}=$isobutyl, M=Ni, Y=O, X=Br.

In some embodiments of the invention, the polar monomer is one or more of the olefinic alcohols represented by Formula G:

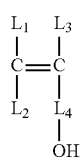

Formula G wherein, $L_1$-$L_3$ are each independently selected from the group consisting of H and C1-C30 alkyl with or without a substituent, $L_4$ is a $C_1$-$C_{30}$ alkylene optionally having a pendant group. Preferably, $L_4$ is a $C_1$-$C_{30}$ alkylene having a pendant group.

In some embodiments of the invention, in the copolymer, the content of monomer units derived from the olefinic alcohols represented by Formula G is from 0.4 to 10.0 mol %, based on the total of the monomer units.

In some embodiments of the invention, the polar monomer is one or more of the unsaturated carboxylic acids represented by Formula G'

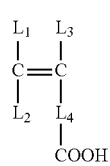

Formula G' wherein, $L_1$-$L_3$ are each independently selected from the group consisting of H and C1-C30 alkyl with or without a substituent, $L_4$ is a $C_1$-$C_{30}$ alkylene optionally having a pendant group. Preferably, $L_4$ is a $C_1$-$C_{30}$ alkylene having a pendant group.

In some embodiments of the invention, in the copolymer, the content of monomer units derived from the unsaturated carboxylic acid represented by Formula G' is from 0.2 to 15.0 mol %, and more preferably from 0.7 to 10.0 mol %, based on the total of the monomer units.

In some embodiments of the invention, in Formula G or G', $L_1$ and $L_2$ are H.

In some embodiments of the invention, in Formula G or G', $L_3$ is H or a $C_1$-$C_{30}$ alkyl, preferably H or a $C_1$-$C_{20}$ alkyl, and more preferably H or a $C_1$-$C_{10}$ alkyl.

In some embodiments of the invention, in Formula G or G', $L_4$ is a $C_1$-$C_{30}$ alkylene optionally having a pendant group, preferably a $C_1$-$C_{20}$ alkylene optionally having a pendant group, more preferably a $C_1$-$C_{10}$ alkylene optionally having a pendant group, and still more preferably a C1-C6 alkylene optionally having a pendant group.

In some embodiments of the invention, the optional substituent in $L_1$-$L_3$ is selected from the group consisting of halogen, $C_1$-$C_{10}$ alkyl, $C_1$-$C_{10}$ alkoxy, $C_6$-$C_{10}$ aryl, cyano and hydroxy, preferably from the group consisting of C1-C6 alkyl, halogen and C1-C6 alkoxy.

In some embodiments of the invention, the optional pendant group in $L_4$ is selected from the group consisting of halogen, $C_6$-$C_{20}$ aryl, $C_1$-$C_{20}$ alkyl and $C_1$-$C_{20}$ alkoxy, with the $C_6$-$C_{20}$ aryl, $C_1$-$C_{20}$ alkyl and $C_1$-$C_{20}$ alkoxy being optionally substituted by a substituent, which is preferably selected from the group consisting of halogen, $C_1$-$C_{10}$ alkyl, $C_1$-$C_{10}$ alkoxy, $C_6$-$C_{10}$ aryl and hydroxy. Preferably, the optional pendant group in $L_4$ is selected from the group consisting of halogen, $C_6$-$C_{20}$ aryl, $C_1$-$C_{20}$ alkyl, hydroxy-substituted $C_1$-$C_{20}$ alkyl and alkoxy-substituted $C_1$-$C_{20}$ alkyl. More preferably, the optional pendant group is selected from the group consisting of halogen, $C_6$-$C_{20}$ aryl, $C_1$-$C_{10}$ alkyl, hydroxy-substituted $C_1$-$C_{10}$ alkyl and alkoxy-substituted $C_{1-10}$ alkyl; and more preferably, the optional pendant group is selected from the group consisting of halogen, phenyl, $C_1$-$C_6$ alkyl and hydroxy-substituted $C_1$-$C_6$ alkyl. Examples of the $C_1$-$C_6$ alkyl include methyl, ethyl, n-propyl, isopropyl, n-butyl, isobutyl, t-butyl, pentyl and hexyl.

According to a preferred embodiment of the present invention, in Formula G or G', $L_1$ and $L_2$ is H, $L_3$ is H or a $C_1$-$C_{30}$ alkyl, $L_4$ is a $C_1$-$C_{30}$ alkylene optionally having a pendant group; the $C_1$-$C_{30}$ alkyl is optionally substituted by a substituent, which is preferably selected from the group consisting of halogen, $C_1$-$C_{10}$ alkyl, $C_1$-$C_{10}$ alkoxy, $C_6$-$C_{10}$ aryl, cyano and hydroxy.

According to a preferred embodiment of the present invention, in Formula G or G', $L_1$ and $L_2$ are H, $L_3$ is H, a $C_1$-$C_{10}$ alkyl or a halogen-substituted $C_1$-$C_{10}$ alkyl, preferably $L_3$ is H or a $C_1$-$C_{10}$ alkyl; $L_4$ is a $C_1$-$C_{20}$ alkylene optionally having a pendant group, for example $L_4$ is methylene group having a pendant group, ethylene group having a pendant group, propylene group having a pendant group, butylene group having a pendant group, $C_5$ alkylene having a pendant group, $C_6$ alkylene having a pendant group, $C_7$ alkylene having a pendant group, $C_8$ alkylene having a pendant group, $C_9$ alkylene having a pendant group, and $C_{10}$ alkylene having a pendant group, $C_{12}$ alkylene having a pendant group, $C_{14}$ alkylene having a pendant group, $C_{18}$ alkylene having a pendant group, $C_{20}$ alkylene having a pendant group, preferably a $C_1$-$C_{10}$ alkylene having a pendant group.

According to a preferred embodiment of the present invention, in Formula G or G', $L_1$ and $L_2$ are H, $L_3$ is H or a $C_{1-6}$ alkyl; $L_4$ is a $C_1$-$C_{10}$ alkylene having a pendant group.

In the present invention, the carbon number n of the Cn alkylene group refers to the number of C atoms on the straight chain, excluding the number of C atoms on the pendant group. For example, isopropylidene (—$CH_2$—CH($CH_3$)—) is referred to herein as a C2 alkylene group with a pendant group (methyl).

According to preferred embodiments of the invention, specific examples of the olefinic alcohol represented by Formula G include, but are not limited to, 2-methyl-3-buten-1-ol, 2-ethyl-3-buten-1-ol, 1,1-diphenyl-3-buten-1-ol, 2-methyl-3-buten-2-ol, 2,2-dimethyl-3-buten-1-ol, 3-methyl-1-penten-3-ol, 2,4-dimethyl-4-penten-2-ol, 4-penten-2-ol, 4-methyl-4-penten-2-ol, 2-methyl-4-penten-2-ol, 2-phenyl-4-penten-2-ol, 2-allyl-hexafluoroisopropanol, 2-hydroxy-5-hexene, 3-buten-2-ol, 3-methyl-5-hexen-3-ol, 2-methyl-2-hydroxy-5-hexene, 1-allylcyclohexanol, 2,3-dimethyl-2-hydroxy-5-hexene, 1-hepten-4-ol, 4-methyl-1-hepten-4-ol, 4-n-propyl-1-hepten-4-ol, 6-hepten-4-ol, 2-methyl-2-hydroxy-6-heptene, 5-methyl-2-hydroxy-6-heptene, 2-hydroxy-3-methyl-6-heptene, 2-hydroxy-3-ethyl-6-heptene, 2-hydroxy-4-methyl-6-heptene, 2-hydroxy-5-methyl-6-heptene, 2,5-dimethyl-1-hepten-4-ol, 2,6-dimethyl-7-octen-2-ol, 2-hydroxy-2,4,5-trimethyl-6-heptene, 2-methyl-3-hydroxy-7-octene, 3-methyl-3-hydroxy-6-heptene, 2-methyl-2-hydroxy-7-octene, 3-methyl-3-hydroxy-7-octene, 4-methyl-2-hydroxy-7-octene, 4-methyl-3-hydroxy-7-octene, 5-methyl-3-hydroxy-7-octene, 6-methyl-3-hydroxy-7-octene, 3-ethyl-3-hydroxy-7-octene, 1,2-dihydroxy-7-octene, 2,6-dimethyl-2,6-dihydroxy-7-octene, 2,6-dimethyl-2,3-dihydroxy-7-octene, 2-methyl-2-hydroxy-3-chloro-7-octene, 2-methyl-2-hydroxy-3,5-dichloro-7-octene, 3,4-dimethyl-4-hydroxy-8-nonene, 4-methyl-4-hydroxy-8-nonene, 4-ethyl-4-hydroxy-8-nonene, 4-propyl-4-hydroxy-8-nonene, 7-octene-2-ol, 3,5-dichloro-2-methyl-7-octen-2-ol, 3-chloro-2-methyl-7-octen-2,3-diol, and 2,6-dimethyl-7-octen-2,6-diol.

Specific examples of the unsaturated carboxylic acid represented by Formula G' include, but are not limited to, 2-methyl-4-pentenoic acid, 2,3-dimethyl-4-pentenoic acid, 2,2-dimethyl-4-pentenoic acid, 2-ethyl-4-pentenoic acid, 2-isopropyl-4-pentenoic acid, 2,2,3-trimethyl-4-pentenoic acid, 2,3,3-trimethyl-4-pentenoic acid, 2-ethyl-3-methyl-4-pentenoic acid, 2-(2-methylpropyl)-4-pentenoic acid, 2,2-diethyl-4-pentenoic acid, 2-methyl-2-ethyl-4-pentenoic acid, 2,2,3,3-tetramethyl-4-pentenoic acid, 2-methyl-5-hexenoic acid, 2-ethyl-5-hexenoic acid, 2-propyl-5-hexenoic acid, 2,3-dimethyl-5-hexenoic acid, 2,2-dimethyl-5-hexenoic acid, 2-isopropyl-5-hexenoic acid, 2-methyl-2-ethyl-5-hexenoic acid, 2-(1-methylpropyl)-5-hexenoic acid, 2,2,3-trimethyl-5-hexenoic acid, 2,2-diethyl-5-hexenoic acid, 2-methyl-6-heptenoic acid, 2-ethyl-6-heptenoic acid, 2-propyl-6-heptenoic acid, 2,3-dimethyl-6-heptenoic acid, 2,4-dimethyl-6-heptenoic acid, 2,2-dimethyl-6-heptenoic acid, 2-isopropyl-5-methyl-6-heptenoic acid, 2-isopropyl-6-heptenoic acid, 2,3,4-trimethyl-6-heptenoic acid, 2-methyl-2-ethyl-6-heptenoic acid, 2-(1-methylpropyl)-6-heptenoic acid, 2,2,3-trimethyl-6-heptenoic acid, 2,2-diethyl-6-heptenoic acid, 2-methyl-7-octenoic acid, 2-ethyl-7-octenoic acid, 2-propyl-7-octenoic acid, 2,3-dimethyl-7-octenoic acid, 2,4-dimethyl-7-octenoic acid, 2,2-dimethyl-7-octenoic acid, 2-isopropyl-5-methyl-7-octenoic acid, 2-isopropyl-7-octenoic acid, 2,3,4-trimethyl-7-octenoic acid, 2-methyl-2-ethyl-7-octenoic acid, 2-(1-methylpropyl)-7-octenoic acid, 2,2,3-trimethyl-7-octenoic acid, 2,2-diethyl-7-octenoic acid, 2-methyl-8-nonenoic acid, 2-ethyl-8-nonenoic acid, 2-propyl-8-nonenoic acid, 2,3-dimethyl-8-nonenoic acid, 2,4-dimethyl-8-nonenoic acid, 2,2-dimethyl-8-nonenoic acid, 2,2-diethyl-8-nonenoic acid, 2-isopropyl-5-methyl-8-nonenoic acid, 2-methyl-9-decenoic acid, 2,3-dimethyl-9-decenoic acid, 2,4-dimethyl-9-decenoic acid or 2-methyl-10-undecenoic acid.

According to preferred embodiments of the invention, the cocatalyst is selected from the group consisting of organoaluminum compounds and/or organoboron compounds.

According to preferred embodiments of the invention, the organoaluminum compounds are selected from the group consisting of alkylaluminoxanes and organoaluminum compounds of general formula $AlR_nX^1_{3-n}$ (alkylaluminums or alkyl aluminum halides), in which R is H, a $C_1$-$C_{20}$ saturated or unsaturated hydrocarbyl or a $C_1$-$C_{20}$ saturated or unsaturated hydrocarbyloxy, preferably a $C_1$-$C_{20}$ alkyl, a $C_1$-$C_{20}$ alkoxy, a $C_7$-$C_{20}$ aralkyl or a $C_6$-$C_{20}$ aryl; $X^1$ is a halogen, preferably chlorine or bromine; and $0<n\le 3$. Specific examples of the organoaluminum compound include, but are not limited to, trimethylaluminum, triethylaluminum, tri-isobutylaluminum, tri-n-hexylaluminum, trioctylaluminum, diethyl aluminum hydride, diisobutyl aluminum hydride, diethyl aluminum chloride, diisobutyl aluminum chloride, ethyl aluminum sesquichloride, ethyl aluminum dichloride, methylaluminoxane (MAO), and modified methyl aluminoxane (MMAO). Preferably, the organoaluminum compound is methylaluminoxane (MAO).

According to preferred embodiments of the invention, the organoboron compound is selected from the group consisting of aromatic hydrocarbyl boron compounds and borates. The aromatic hydrocarbyl boron compounds are preferably substituted or unsubstituted phenyl boron, more preferably tris(pentafluorophenyl)boron. The borates are preferably N,N-dimethylanilinium tetrakis(pentafluorophenyl)borate and/or triphenylcarbonium tetrakis(pentafluorophenyl)borate.

According to preferred embodiments of the invention, the concentration of the main catalyst in the reaction system is from 0.00001 to 100 mmol/L, for example, 0.00001 mmol/L, 0.00005 mmol/L, 0.0001 mmol/L, 0.0005 mmol/L, 0.001 mmol/L, 0.005 mmol/L, 0.01 mmol/L, 0.05 mmol/L, 0.1 mmol/L, 0.3 mmol/L, 0.5 mmol/L, 0.8 mmol/L, 1 mmol/L, 5 mmol/L, 8 mmol/L, 10 mmol/L, 20 mmol/L, 30 mmol/L, 50 mmol/L, 70 mmol/L, 80 mmol/L, 100 mmol/L and any value therebetween, preferably from 0.0001 to 1 mmol/L, and more preferably from 0.001 to 0.5 mmol/L.

According to preferred embodiments of the invention, when the cocatalyst is an organoaluminum compound, the molar ratio of aluminum in the cocatalyst to M in the main catalyst is (10-107):1, for example, 10:1, 20:1, 50:1, 100:1, 200:1, 300:1, 500:1, 700:1, 800:1, 1,000:1, 2,000:1, 3,000:1, 5,000:1, 10,000:1, 100,000:1, 1,000,000:1, 10,000,000:1, and any value therebetween, preferably (10-100,000):1, and more preferably (100-10,000):1; when the cocatalyst is an organoboron compound, the molar ratio of boron in the cocatalyst to M in the main catalyst is (0.1-1,000):1, for example, 0.1:1, 0.2:1, 0.5:1, 0.8:1, 1:1, 1.2:1, 1.4:1, 1.6:1, 1.8:1, 2:1, 2.5:1, 3:1, 4:1, 5:1, 8:1, 10:1, 20:1, 50:1, 100:1, 200:1, 300:1, 500:1, 700:1, 800:1, 1,000:1, and any value therebetween, preferably (0.1-500):1.

According to preferred embodiments of the invention, the olefin include olefins having 2-16 carbon atoms. In some embodiments of the present invention, the olefin includes ethylene or an α-olefin having 3-16 carbon atoms. In other embodiments of the present invention, the olefin is a $C_3$-$C_{16}$ cyclic olefin, preferably a 5-membered ring or a 6-membered ring. Preferably, the olefin is ethylene or an α-olefin having 3-16 carbon atoms, more preferably ethylene or $C_2$-$C_{10}$ α-olefin, such as ethylene, propylene, 1-butene, 1-pentene, 1-hexene, 1-heptene and 1-octene.

According to preferred embodiments of the invention, the concentration of the polar monomer such as the olefinic alcohol monomer represented by Formula G or the unsaturated carboxylic acid monomer represented by Formula G' in the reaction system is from 0.01 to 6,000 mmol/L, preferably from 0.1 to 1,000 mmol/L, more preferably from 1 to 500 mmol/L, for example, 1 mmol/L, 10 mmol/L, 20 mmol/L, 30 mmol/L, 50 mmol/L, 70 mmol/L, 90 mmol/L, 100 mmol/L, 200 mmol/L, 300 mmol/L, 400 mmol/L, 500 mmol/L and any value therebetween.

According to preferred embodiments of the invention, the chain transfer agent is one or more selected from aluminum alkyls, magnesium alkyls, boron alkyls and zinc alkyls. Some chain transfer agents used herein, such as aluminum alkyls, are also considered scavengers in the art.

According to preferred embodiments of the invention, the chain transfer agent is trialkylaluminum and/or dialkylzinc, preferably one or more selected from trimethylaluminum, triethylaluminum, triisopropylaluminum, and triisobutylaluminum, tri-n-hexyl aluminum, tri-n-octyl aluminum, dimethyl zinc and diethyl zinc.

According to preferred embodiments of the invention, the molar ratio of the chain transfer agent to M in the main catalyst is (0.1-2,000):1, for example, 0.1:1, 0.2:1, 0.5:1, 1:1, 2:1, 3:1, 5:1, 8:1, 10:1, 20:1, 50:1, 100:1, 200:1, 300:1, 500:1, 600:1, 800:1, 1,000:1, 2,000:1 and any value therebetween, and preferably (10-600):1.

According to preferred embodiments of the invention, the polymerization is carried out in an alkane solvent, and the alkane solvent is one or more of $C_3$-$C_{20}$ alkanes, preferably $C_3$-$C_{10}$ alkanes, for example, one or more of butane, isobutane, pentane, hexane, heptane, octane and cyclohexane, preferably one or more of hexane, heptane and cyclohexane.

According to preferred embodiments of the invention, the polar monomer is at first subjected to pretreatment to remove active hydrogen. Preferably, the above-mentioned cocatalyst or chain transfer agent is used to pretreat the polar monomer to remove its active hydrogen. Preferably, during the pretreatment, the molar ratio of the functional groups in the polar monomers, such as hydroxyl groups and/or carboxyl groups, to the co-catalyst or chain transfer agent is from 10:1 to 1:10.

According to preferred embodiments of the invention, the reaction is carried out under anhydrous and oxygen-free conditions.

According to preferred embodiments of the invention, the reaction conditions include: a reaction temperature of from −50° C. to 50° C., preferably from −20 to 50° C., more preferably from 0 to 50° C., for example, 0° C., 10° C., 20° C., 30° C., 40° C., 50° C. and any value therebetween; and/or, a reaction time of from 10 to 200 min, preferably from 20 to 60 min. In the present invention, the reaction pressure is not particularly limited, as long as the monomer can undergo a coordination copolymerization reaction. When the olefin is ethylene, from the viewpoint of cost reduction and simplification of the polymerization process, the pressure of ethylene in the reactor is preferably from 1 to 1000 atm, more preferably from 1 to 200 atm, and more preferably from 1 to 50 atm.

As used herein, the term "reaction system" refers to a whole including the solvent, the olefin, the polar monomer, the catalyst, and the optional chain transfer agent.

The present invention also provides the olefin-polar monomer copolymer prepared by the above preparation method, which comprises spherical and/or spherical-like polymers.

According to preferred embodiments of the invention, the spherical and/or spherical-like polymer has an average particle diameter of from 0.1 to 50.0 mm, for example 0.1 mm, 0.5 mm, 1.0 mm, 2.0 mm, 3.0 mm, 5.0 mm, 8.0 mm, 10.0 mm, 15.0 mm, 20.0 mm, 25.0 mm, 30.0 mm, 35.0 mm, 40.0 mm, 45.0 mm, 50.0 mm and any value therebetween, preferably from 0.5 to 20.0 mm.

According to preferred embodiments of the invention, the content of the structural units derived from the olefinic alcohol represented by Formula G in the olefin-olefinic alcohol copolymer is from 0.4 to 30.0 mol %, for example 0.4 mol %, 0.5 mol %, 0.7 mol %, 0.8 mol %, 1.0 mol %, 1.5 mol %, 2.0 mol %, 5.0 mol %, 8.0 mol %, 10.0 mol %, 15.0 mol %, 20.0 mol %, 25.0 mol %, 30.0 mol % and any value therebetween, preferably from 0.7 to 10.0 mol %.

According to preferred embodiments of the invention, the olefin-olefinic alcohol copolymer has a weight average molecular weight of from 30,000 to 500,000, and preferably from 50,000 to 400,000.

According to preferred embodiments of the invention, the olefin-olefinic alcohol copolymer has a molecular weight distribution no more than 4.0, for example 0.1, 0.5, 1.0, 1.5, 2.0, 2.5, 3.0, 3.5, 4.0 and any value therebetween, and preferably from 1.0 to 4.0.

According to preferred embodiments of the invention, the content of the structural units derived from the unsaturated carboxylic acid represented by Formula G' in the olefin-unsaturated carboxylic acid copolymer is from 0.2 to 30.0 mol %, for example 0.4 mol %, 0.5 mol %, 0.7 mol %, 0.8 mol %, 1.0 mol %, 1.5 mol %, 2.0 mol %, 5.0 mol %, 8.0 mol %, 10.0 mol %, 15.0 mol %, 20.0 mol %, 25.0 mol %, 30.0 mol % and any value therebetween, and preferably from 0.7 to 10.0 mol %.

According to preferred embodiments of the invention, the olefin-unsaturated carboxylic acid copolymer has a weight average molecular weight of from 30,000 to 500,000, and preferably from 50,000 to 400,000.

According to preferred embodiments of the invention, the olefin-unsaturated carboxylic acid copolymer has a molecular weight distribution no more than 4.0, for example 0.1, 0.5, 1.0, 1.5, 2.0, 2.5, 3.0, 3.5, 4.0 and any value therebetween, and preferably from 1.0 to 4.0.

In the invention, the particle diameter of the spherical or spherical-like polymer is considered herein to be equal to the diameter of a sphere whose volume is equal to the volume of the particle.

According to another aspect of the invention, the use of the olefin-polar monomer copolymer as a polyolefin material is provided.

In the present disclosure, the symbols used in different general formulae or structural formulae, such as $R^1$, $R^2$, $R^3$, $R^4$, $R^5$, $R^6$, $R^7$, $R^8$, $R^9$, $R^{10}$, $R^{11}$, $R_{12}$, $R_3$, X, M, A, Y, etc. have the same definitions in each general formula or structural formula, unless specifically indicated.

In the present invention, the term "alkyl" refers to straight chain alkyl, branched chain alkyl or cycloalkyl. For example, $C_1$-$C_{20}$ alkyl refers to $C_1$-$C_{20}$ straight chain alkyl, $C_3$-$C_{20}$ branched chain alkyl or $C_3$-$C_{20}$ cycloalkyl. Examples of straight chain or branched chain alkyl include, but are not limited to, methyl, ethyl, n-propyl, isopropyl, n-butyl, sec-butyl, isobutyl, t-butyl, n-pentyl, isopentyl, tert-pentyl, neopentyl, n-hexyl, n-heptyl, n-octyl, and n-decyl.

Examples of $C_3$-$C_{20}$ cycloalkyl include, but are not limited to, cyclopropyl, cyclopentyl, cyclohexyl, 4-methylcyclohexyl, 4-ethylcyclohexyl, 4-n-propylcyclohexyl and 4-n-butylcyclohexyl.

Examples of $C_6$-$C_{20}$ aryl include, but are not limited to, phenyl, 4-methylphenyl, 4-ethylphenyl, dimethylphenyl, vinylphenyl.

Alkenyl refers to straight chain alkenyl, branched alkenyl or cycloalkenyl. For example, $C_2$-$C_{20}$ alkenyl refers to $C_1$-$C_{20}$ straight chain alkenyl, $C_3$-$C_{20}$ branched alkenyl, or $C_3$-$C_{20}$ cycloalkenyl. Examples of alkenyl include, but are not limited to, vinyl, allyl, butenyl.

Examples of $C_7$-$C_{20}$ aralkyl include, but are not limited to, phenylmethyl, phenylethyl, phenyl-n-propyl, phenylisopropyl, phenyl-n-butyl and phenyl-t-butyl.

Examples of $C_7$-$C_{20}$ alkaryl include, but are not limited to, tolyl, ethylphenyl, n-propylphenyl, isopropylphenyl, n-butylphenyl and t-butylphenyl.

The method for preparing a copolymer of an olefin and a polar monomer such as an olefinic alcohol or an unsaturated carboxylic acid provided by the present invention uses a novel catalyst comprising a trinuclear metal complex. The catalyst has not been reported. Therefore, the technical problem solved by the present invention is to provide a new preparation method of olefin-polar monomer copolymer.

Further, in the method for preparing olefin-olefinic alcohol copolymer provided by the present invention, by selecting the reacted olefinic alcohol monomer, the catalyst, and the suitable polymerization process, a spherical and/or spherical-like polymer with good morphology is directly prepared without subsequent processing steps such as granulation, and the resulting polymerization product is not prone to scale in the reactor and facilitates transportation.

Further, the method for preparing olefin-olefinic alcohol copolymer provided by the present invention eliminates the step of saponification reaction so that the preparation process is simpler than the process for preparing olefin-olefinic alcohol copolymer used in the existing industry.

Further, in the method for preparing olefin-unsaturated carboxylic acid copolymer provided by the present invention, by selecting the unsaturated carboxylic acid monomer, the catalyst, and the suitable polymerization process, a spherical and/or spherical-like polymer with good morphology is directly prepared without subsequent processing steps such as granulation, and the resulting polymerization product is not prone to scale in the reactor and facilitates transportation.

Further, the method for preparing olefin-unsaturated carboxylic acid copolymer provided by the present invention eliminates the step of saponification reaction so that the preparation process is simpler than the process for preparing olefin-unsaturated carboxylic acid copolymer used in the existing industry.

EXAMPLES

Figure 1:
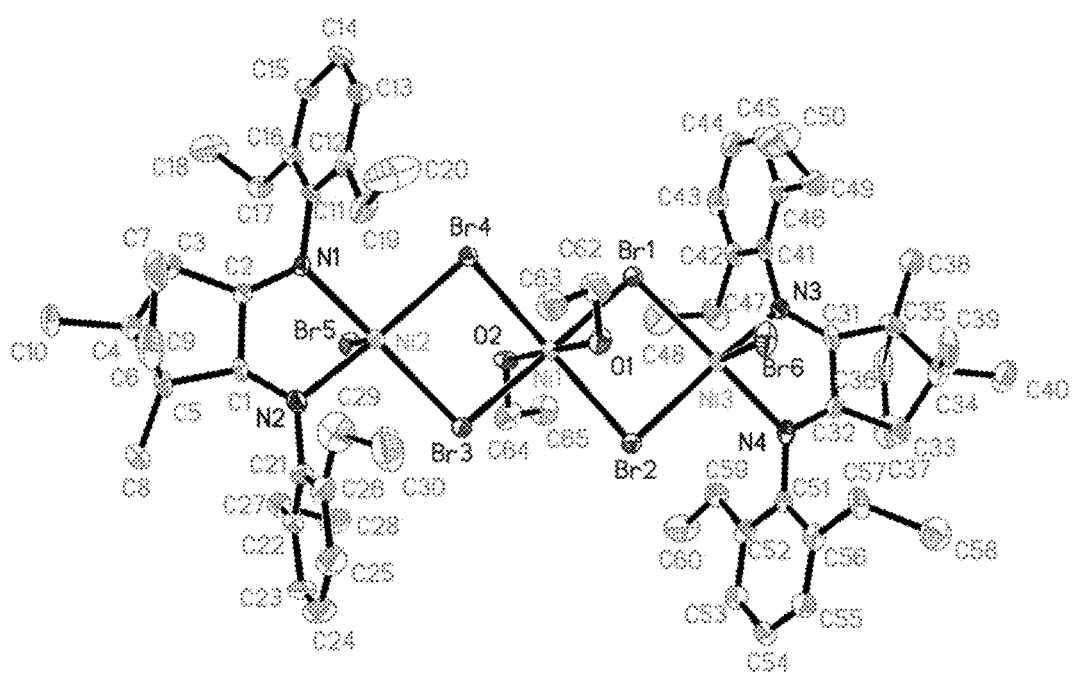
FIG. 1 is a structural unit diagram of the nickel complex Ni1 of Example 1 of the invention (for clarity, hydrogen atoms, dichloromethane solvent molecules and atoms for symmetry operations are not marked).

The present invention will be described in detail below in conjunction with examples and drawings, but it should be understood that the examples and drawings are used only to exemplarily illustrate the present invention, and do not constitute any limitation on the protection scope of the present invention. All reasonable alterations and combinations included in the scope of the inventive concept of the present invention fall into the protection scope of the present invention.

The analytical characterization instruments used in the present invention are as follows:

Prior to measurement, the polymer sample is washed with a dilute acid solution to make the metal content in the polymer ≤50 ppm.

1. Nuclear magnetic resonance instrument for determining the structure of complex ligand: Bruker DMX 300 (300 MHz), with tetramethyl silicon (TMS) as the internal standard, measured at 25° C.

2. Analysis of comonomer content of polymer (the content of structural units derived from the olefinic alcohol represented by Formula G): measured through $^{13}C$ NMR spectra recorded on a 400 MHz Bruker Avance 400 nuclear magnetic resonance spectrometer, using a 10 mm PASEX 13 probe, with the polymer sample being dissolved in 1,2,4-trichlorobenzene at 120° C.

3. Analysis of comonomer content of copolymer (the content of structural units derived from the unsaturated carboxylic acid represented by Formula G'): measured through $^{13}C$ NMR spectra recorded on a 400 MHz Bruker Avance 400 nuclear magnetic resonance spectrometer, using a 10 mm PASEX 13 probe, with the polymer sample being dissolved in deuterated tetrachloroethane at 130° C.

4. Molecular weight and molecular weight distribution PDI (PDI=Mw/Mn) of polymer: PL-GPC220 chromatograph, with trichlorobenzene as solvent, measured at 150° C. (standards: PS; flow rate: 1.0 mL/min; Column: 3×PLgel 10 um M1×ED-B 300×7.5 nm).

5. Activity measurement method: gravimetric method, with activity being expressed as polymer weight (g)/nickel (mol)×2.

The structure of the complexes involved in the following Examples 1-35 is shown by Formula Formula IIIb

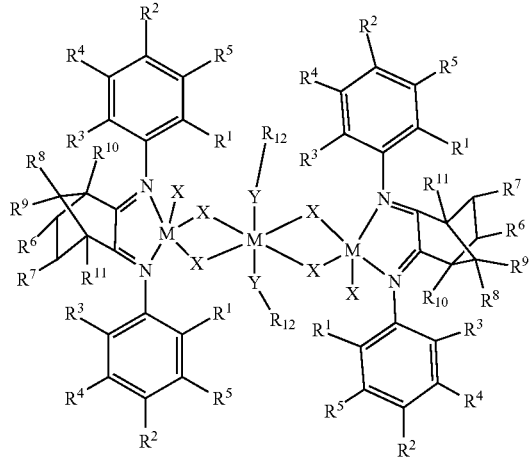

Example 1

1) Preparation of Ligand $L_1$:

Under nitrogen atmosphere, 2,6-diethylaniline (2.0 ml, 12 mmol) was dissolved in 20 ml of toluene, and 12 ml of trimethylaluminum (1.0M, 12 mmol) was added dropwise at room temperature. The reaction was refluxed for 2 hours, and the system was cooled to room temperature. Camphorquinone (0.831 g, 5 mmol) was added, and the system was refluxed for 6 h. The reaction product was neutralized with aqueous sodium hydroxide solution and extracted with dichloromethane, and combined organic layers were dried over anhydrous magnesium sulfate and concentrated. The residues were then subjected to a column chromatography to afford yellow ligand $L_1$. Yield: 69.2%. $^1$H-NMR (CDCl$_3$): δ6.94-6.92 (m, 6H, $C_{Ar}$—CH$_3$), 2.56-2.51 (m, 4H, $C_{Ar}$—CH$_3$), 2.36-2.31 (m, 4H, $C_{Ar}$—CH$_3$), 1.82-1.78 (m, 4H, CH$_2$), 1.54 (m, 1H), 1.24-1.18 (m, 12H), 1.09 (s, 3H, CH$_3$), 0.94 (m, 6H, CH$_3$).

2) Preparation of complex $Ni_1$ (represented by structural Formula IIIb, wherein $R^1$, $R^3$ are ethyl; $R^2$, $R^4$-$R^7$, $R^{10}$ are hydrogen; $R^8$, $R^9$ and $R^{11}$ are methyl; $R_{12}$ is ethyl; M is nickel, Y is O, and X is Br):

A solution of 0.277 g (0.9 mmol) of (DMVE)NiBr$_2$ in ethanol (10 mL) was added slowly dropwise to a solution of 0.258 g (0.6 mmol) of ligand $L_1$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford $Ni_1$ as brownish-red powdery solids. Yield: 78.2%. Elemental analysis (calculated for $C_{64}H_{90}Br_6N_4Ni_3O_2$): C, 47.96; H, 5.66; N, 3.50; experimental value (%): C, 47.48; H, 6.00; N, 3.26.

3) Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time, 8.0 mg (5.0 mol) of the complex $Ni_1$, 15 mmol (2.5 mL) of 2-methyl-2-hydroxy-7-octene, 15 mL of AlEt$_3$ (1.0 mol/L solution in hexane), 6.5 mL of MAO (1.53 mol/L solution in toluene) were added. The reaction was stirred at 30° C. for 30 minutes, with ethylene pressure being maintained at 10 atm.

The reaction mixture was finally neutralized with an ethanol solution acidified with 10 wt % hydrochloric acid to obtain a polymer. The polymerization activity and polymer performance parameters are shown in Table 1 below.

Example 2

Copolymerization of ethylene and 2-methyl-2-hydroxy-7-octene was carried out according to the polymerization procedure described in Example 1, except that 30 mmol (5.1 mL) of 2-methyl-2-hydroxy-7-octene and 30 mL of AlEt$_3$ (1.0 mol/L solution in hexane) were used. The polymerization activity and polymer performance parameters are shown in Table 1 below.

Figure 2:
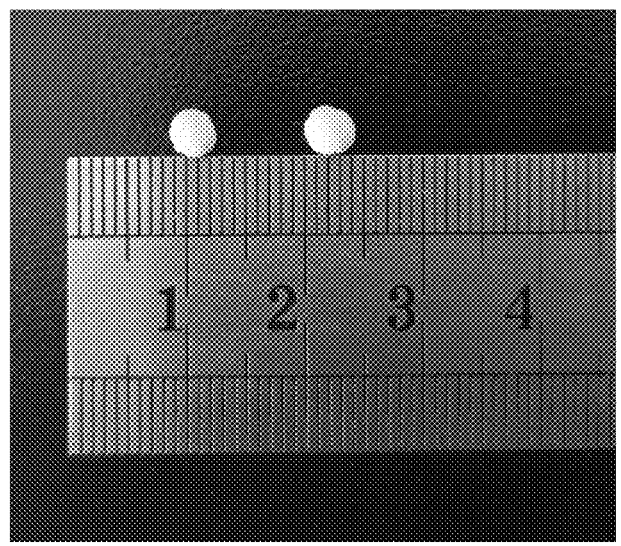
FIG. 2 is a photograph of the spherical and/or spherical-like polymer obtained in Example 2 of the invention.
Figure 3:
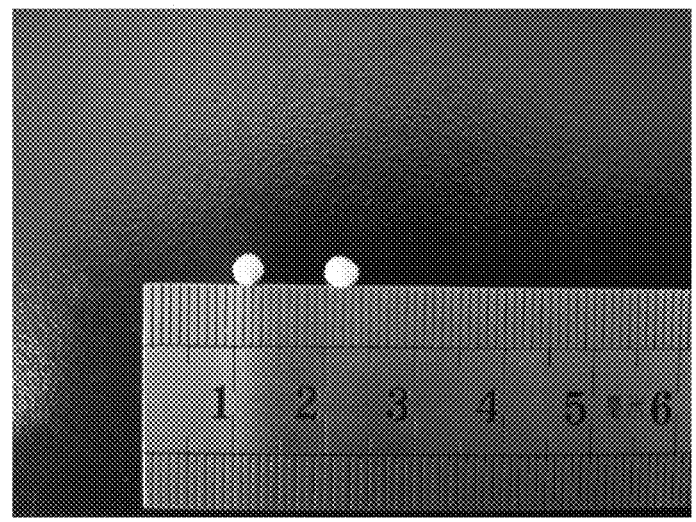
FIG. 3 is a photograph of the olefin-unsaturated carboxylic acid polymer obtained in Example 20 of the invention.

FIG. 2 shows a photograph of the spherical and/or spherical-like polymer prepared in this Example.

Example 3

Copolymerization of ethylene and 2-methyl-2-hydroxy-7-octene was carried out according to the polymerization procedure described in Example 2, except that the polymerization temperature was 60° C. The polymerization activity and polymer performance parameters are shown in Table 1 below.

Example 4

Copolymerization of ethylene and 2-methyl-2-hydroxy-7-octene was carried out according to the polymerization procedure described in Example 2, except that 0.5 mL of diethyl zinc (1 mol/L solution in hexane) was further added together with the catalyst. The polymerization activity and polymer performance parameters are shown in Table 1 below.

Example 5

Copolymerization of ethylene and 2-methyl-2-hydroxy-7-octene was carried out according to the polymerization procedure described in Example 4, except that 2 times quantity of the diethylzinc (i.e., 1.0 mL diethylzinc (1 mol/L solution in hexane)) was used. The polymerization activity and polymer performance parameters are shown in Table 1 below.

Example 6

Copolymerization of ethylene and 2-methyl-2-hydroxy-7-octene was carried out according to the polymerization procedure described in Example 1, except that 3.33 times quantity of the 2-methyl-2-hydroxy-7-octene (i.e., 50 mmol (8.5 mL) of 2-methyl-2-hydroxy-7-octene) and 3.33 times quantity of AlEt$_3$ (i.e., 50 mL of AlEt$_3$ (1.0 mol/L solution in hexane)) were used. The polymerization activity and polymer performance parameters are shown in Table 1 below.

Example 7

Copolymerization of ethylene and 2-methyl-2-hydroxy-7-octene was carried out according to the polymerization procedure described in Example 1, except that 6.67 times quantity of the 2-methyl-2-hydroxy-7-octene (i.e., 100 mmol (17.0 mL) of 2-methyl-2-hydroxy-7-octene) and 6.67 times quantity of the AlEt$_3$ (i.e., 100 mL of AlEt$_3$ (1.0 mol/L solution in hexane)) were used. The polymerization activity and polymer performance parameters are shown in Table 1 below.

Example 8

1) Preparation of Ligand L$_2$:

Under nitrogen atmosphere, 2,6-diisopropylaniline (2.4 ml, 12 mmol) was dissolved in 20 ml of toluene, and 12 ml of trimethylaluminum (1.0M, 12 mmol) was added dropwise at room temperature. The reaction was refluxed for 2 hours, and the system was cooled to room temperature. Camphorquinone (0.831 g, 5 mmol) was added, and the reaction mixture was refluxed for 6 h. The reaction product was neutralized with aqueous sodium hydroxide solution and extracted with dichloromethane, and combined organic layers were dried over anhydrous magnesium sulfate and concentrated. The residues were then subjected to a column chromatography to afford yellow ligand L$_2$. Yield: 41.3%. $^1$H NMR (300 MHz, CDCl3), δ (ppm): 7.06-6.81 (m, 6H, Ar—H), 2.88 (m, 4H, CH(CH$_3$)$_2$), 2.36 (m, 1H,), 1.86 (m, 4H, CH$_2$), 1.24 (d, 24H, CH(CH$_3$)$_2$), 0.96 (s, 6H, CH$_3$), 0.77 (s, 3H, CH$_3$).

2) Preparation of Complex Ni$_2$ (Represented by Structural Formula IIb, Wherein R$^1$, R$^3$ are isopropyl; R$^2$, R$^4$-R$^7$, R$^{10}$ are hydrogen; R$^8$, R$^9$ and R$^{11}$ are methyl; R$_{12}$ is Ethyl; M is Nickel, Y is O, and X is Br):

A solution of 0.277 g (0.9 mmol) of (DME)NiBr$_2$ in ethanol (10 mL) was added slowly dropwise to a solution of 0.291 g (0.6 mmol) of ligand L$_2$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni$_2$ as brownish-red powdery solids. Yield: 74.0%. Elemental analysis (calculated for C$_{72}$H$_{106}$Br$_6$N$_4$Ni$_3$O$_2$): C, 50.42; H, 6.23; N, 3.27; experimental value (%): C, 50.28; H, 6.42; N, 3.18.

3) Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time, 8.6 mg (5.0 mol) of the complex Ni$_2$, 30 mmol (5.1 mL) of 2-methyl-2-hydroxy-7-octene, 30 mL of AlEt$_3$ (1.0 mol/L solution in hexane), 6.5 mL of MAO (1.53 mol/L solution in toluene) were added. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 1 below.

Example 9

Copolymerization of ethylene and 2-methyl-2-hydroxy-7-octene was carried out according to the polymerization procedure described in Example 8, except that the polymerization temperature was 60° C. The polymerization activity and polymer performance parameters are shown in Table 1 below.

Example 10

Ethylene copolymerization was carried out according to the polymerization procedure described in Example 8, except that 30 mmol (4.1 mL) of 3-methyl-5-hexen-3-ol was used as a comonomer. The polymerization activity and polymer performance parameters are shown in Table 1 below.

Example 11

1) Preparation of Complex Ni$_3$ (Represented by structural Formula IIb, wherein R$^1$, R$^3$ are isopropyl; R$^2$, R$^4$-R$^7$, R$^{10}$ are hydrogen; R$^8$, R$^9$ and R$^{11}$ are methyl; R$_{12}$ is Isobutyl; M is Nickel, Y is O, and X is Br):

A solution of 0.277 g (0.9 mmol) of (DME)NiBr$_2$ in 2-methyl-1-propanol (10 mL) was added slowly dropwise to a solution of 0.291 g (0.6 mmol) of ligand L$_2$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni$_3$ as brownish-red powdery solids. Yield: 76.0%. Elemental analysis (calculated for C$_{76}$H$_{114}$Br$_6$N$_4$Ni$_3$O$_2$): C, 51.54; H, 6.49; N, 3.16; experimental value (%): C, 51.28; H, 6.82; N, 3.19.

2) Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.9 mg (5.0 mol) of the complex Ni$_3$, 30 mmol (5.1 mL) of 2-methyl-2-hydroxy-7-octene, 30 mL of AlEt$_3$ (1.0 mol/L solution in hexane), and 6.5 mL of MAO (1.53 mol/L solution in toluene) were added. The reaction was stirred at 30° C. for 30 minutes, with ethylene pressure being maintained at 10 atm.

The reaction mixture was finally neutralized with an ethanol solution acidified with 10 wt % hydrochloric acid to obtain a polymer. The polymerization activity and polymer performance parameters are shown in Table 1 below.

Example 12

Ethylene copolymerization was carried out according to the polymerization procedure described in Example 11, except that 30 mmol (4.5 mL) of 4-methyl-1-hepten-4-ol as a comonomer was used. The polymerization activity and polymer performance parameters are shown in Table 1 below.

Example 13

1) Preparation of Ligand L$_3$:

Under nitrogen atmosphere, 2,4,6-trimethyl-aniline (1.7 ml, 12 mmol) was dissolved in 20 ml of toluene, and 12 ml of trimethylaluminum (1.0M, 12 mmol) was added dropwise at room temperature. The reaction was refluxed for 2 hours, and the system was cooled to room temperature. Camphorquinone (0.831 g, 5 mmol) was added, and the system was refluxed for 6 h. The reaction product was neutralized with aqueous sodium hydroxide solution, extracted with dichloromethane, dried, and concentrated, and then subjected to a column chromatography to afford yellow ligand $L_3$ in a yield of 62.5%. $^1$HNMR (300 MHz, CDCl$_3$), δ (ppm) [with an isomer ratio of 1.2:1]: major isomer: 6.72 (s, 4H, Ar—H), 2.26-2.13 (m, 12H, $C_{Ar}$—CH$_3$), 1.87 (s, 6H, $C_{Ar}$—CH$_3$), 1.79 (m, 4H, CH$_2$), 1.42 (m, 1H), 1.26 (s, 3H, CH$_3$), 1.07 (s, 6H, CH$_3$); minor isomer: 6.67 (s, 4H, Ar—H), 2.09-2.01 (m, 12H, $C_{Ar}$—CH$_3$), 1.85 (s, 6H, $C_{Ar}$—CH$_3$), 1.79 (m, 4H, CH$_2$), 1.40 (m, 1H), 1.26 (s, 3H, CH$_3$), 0.94 (s, 6H, CH$_3$).

2) Preparation of Complex Ni$_4$ (Represented by the Structural Formula IIIb, Wherein $R^1$-$R^3$ are Methyl, $R^4$-$R^7$ and $R^{10}$ are Hydrogen, $R^8$, $R^9$ and $R^{11}$ are Methyl, $R_{12}$ is Ethyl, M is Nickel, Y is O, and X is Br):

A solution of 0.277 g (0.9 mmol) of (DME)NiBr$_2$ in ethanol (10 mL) was added slowly dropwise to a solution of 0.240 g (0.6 mmol) of ligand $L_3$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni$_4$ as brownish-red powdery solids in a yield of 78.6%. Elemental analysis (calculated for $C_{60}H_{82}Br_6N_4Ni_3O_2$): C, 46.59; H, 5.34; N, 3.62; experimental value (%): C, 46.24; H, 5.67; N, 3.21.

3) Polymerization:

After having been continuously dried at 130° C. for 6 hrs, a 1 L stainless steel polymerization autoclave equipped with mechanical stirring was evacuated while it was hot and then filled with N$_2$ gas 3 times. 7.7 mg (5 μmol) of the complex Ni$_4$ was added thereto, followed by evacuating and filling with ethylene to perform replacement 3 times. 500 mL of hexane, 30 mmol (5.1 mL) of 2-methyl-2-hydroxy-7-octene, and 30 mL of AlEt$_3$ (1.0 mol/L solution in hexane) were charged into the autoclave, followed by the addition of 6.5 mL of methylaluminoxane (MAO) (1.53 mol/1 solution in toluene). The reaction was vigorously stirred at 30° C. for 30 minutes, with ethylene pressure being maintained at 10 atm. The reaction mixture was neutralized with an ethanol solution acidified with 10 wt % hydrochloric acid to obtain a polymer. The results are shown in Table 1 below.

Example 14

1) Preparation of Ligand $L_4$:

Under nitrogen atmosphere, 2,6-dimethyl-4-bromo-aniline (2.45 g, 12 mmol) was dissolved in 20 ml of toluene, and 12 ml of trimethylaluminum (1.0M, 12 mmol) was added dropwise at room temperature. The reaction was refluxed for 2 hours, and the system was cooled to room temperature. Camphorquinone (0.831 g, 5 mmol) was added, and the system was refluxed for 6 h. The reaction product was neutralized with aqueous sodium hydroxide solution, extracted with dichloromethane, dried and concentrated, and then subjected to a column chromatography to afford yellow ligand $L_4$ in a yield of 60.7%. $^1$HNMR (300 MHz, CDCl$_3$), δ (ppm) [with an isomer ratio of 1.1:1]: major isomer: 7.05 (s, 4H, Ar—H), 2.18 (m, 12H, $C_{Ar}$—CH$_3$), 1.85 (m, 4H, CH$_2$), 1.37 (m, 1H), 1.26 (s, 3H, CH$_3$), 1.06 (s, 6H, CH$_3$); minor isomer: 7.02 (s, 4H, Ar—H), 2.04 (m, 12H, $C_{Ar}$—CH$_3$), 1.85 (m, 4H, CH$_2$), 1.37 (m, 1H), 1.26 (s, 3H, CH$_3$), 0.96 (s, 6H, CH$_3$).

2) Preparation of Complex Ni$_5$ (Represented by the Structural Formula IIIb, Wherein $R^1$ and $R^3$ are Methyl, $R^2$ is Bromine, $R^4$-$R^7$ and $R^{10}$ are Hydrogen, $R^8$, $R^9$ and $R^{11}$ are Methyl, $R_{12}$ is Ethyl, M is Nickel, Y is O, and X is Br):

A solution of 0.278 g (0.9 mmol) of (DME)NiBr$_2$ in ethanol (10 mL) was added slowly dropwise to a solution of 0.318 g (0.6 mmol) of ligand $L_4$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni$_5$ as brownish-red powdery solids in a yield of 74.1%. Elemental analysis (calculated for $C_{56}H_{70}Br_{10}N_4Ni_3O_2$): C, 37.24; H, 3.91; N, 3.10; experimental value (%): C, 37.38; H, 4.30; N, 3.03.

3) Polymerization:

After having been continuously dried at 130° C. for 6 hrs, a 1 L stainless steel polymerization autoclave equipped with mechanical stirring was evacuated while it was hot and then filled with N$_2$ gas 3 times. 9.0 mg (5 μmol) of the complex Ni$_5$ was added thereto, followed by evacuating and filling with ethylene to perform replacement 3 times. 500 mL of hexane, 30 mmol (5.1 mL) of 2-methyl-2-hydroxy-7-octene, and 30 mL of AlEt$_3$ (1.0 mol/L solution in hexane) were charged into the autoclave, followed by the addition of 6.5 mL of methylaluminoxane (MAO) (1.53 mol/1 solution in toluene). The reaction was vigorously stirred at 30° C. for 30 minutes, with ethylene pressure being maintained at 10 atm. The reaction mixture was neutralized with an ethanol solution acidified with 10 wt % hydrochloric acid to obtain a polymer. The results are shown in Table 1 below.

Example 15

1) Preparation of Ligand $L_5$:

Under nitrogen atmosphere, 2,6-diisopropyl-aniline (2.30 ml, 12 mmol) was dissolved in 20 ml of toluene, and 12 ml of trimethylaluminum (1.0M, 12 mmol) was added dropwise at room temperature. The reaction was refluxed for 2 hours, and the system was cooled to room temperature. Dione (1.225 g, 5 mmol) was added, and the system was refluxed for 6 h. The reaction product was neutralized with aqueous sodium hydroxide solution, extracted with dichloromethane, dried and concentrated, and then subjected to a column chromatography to afford yellow ligand $L_5$ in a yield of 62.7%. $^1$H NMR (300 MHz, CDCl$_3$), δ (ppm): 7.05-6.83 (m, 6H, Ar—H), 3.30 (m, 2H, CH$_2$), 2.80 (m, 4H, CH(CH$_3$)$_2$), 1.55 (m, 1H), 1.83 (m, 4H, CH$_2$), 1.26 (d, 24H, CH(CH$_3$)$_2$), 0.99 (s, 6H, CH$_3$).

2) Preparation of Complex Ni$_6$ (Represented by the Structural Formula IIIb, Wherein $R^1$ and $R^3$ are Isopropyl, $R^2$, $R^4$-$R^7$ and $R^{10}$ are Hydrogen, $R^8$ and $R^9$ are Methyl, $R^{11}$ is CH$_2$Br, $R_{12}$ is Ethyl, M is Nickel, Y is O, and X is Br):

A solution of 0.277 g (0.9 mmol) of (DME)NiBr$_2$ in ethanol (10 mL) was added slowly dropwise to a solution of 0.338 g (0.6 mmol) of ligand $L_5$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni$_6$ as brownish-red powdery solids in a yield of 80.2%. Elemental analysis (calculated for $C_{72}H_{104}Br_8N_4Ni_3O_2$): C, 46.17; H, 5.60; N, 2.99; experimental value (%): C, 46.24; H, 5.80; N, 3.13.

3) Polymerization:

After having been continuously dried at 130° C. for 6 hrs, a 1 L stainless steel polymerization autoclave equipped with mechanical stirring was evacuated while it was hot and then filled with $N_2$ gas 3 times. 9.4 mg (5 μmol) of the complex $Ni_6$ was added thereto, followed by evacuating and filling with ethylene to perform replacement 3 times. 500 mL of hexane, 30 mmol (5.1 mL) of 2-methyl-2-hydroxy-7-octene, and 30 mL of $AlEt_3$ (1.0 mol/L solution in hexane) were charged into the autoclave, followed by the addition of 6.5 mL of methylaluminoxane (MAO) (1.53 mol/1 solution in toluene). The reaction was vigorously stirred at 30° C. for 30 minutes, with ethylene pressure being maintained at 10 atm. The reaction mixture was neutralized with an ethanol solution acidified with 10 wt % hydrochloric acid to obtain a polymer. The results are shown in Table 1 below.

Example 16

Ethylene copolymerization was carried out according to the polymerization procedure described in Example 2, except that 15 mL of a solution of N,N-dimethylanilinium tetrakis(pentafluorophenyl)borate in toluene (1 mmol/L toluene solution) was used instead of the MAO. The results are shown in Table 1 below.

Example 17

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 8.0 mg (5.0 mol) of the complex $Ni_1$, 30 mmol (6.0 mL) of 10-undecen-1-ol, 30 mL of $AlEt_3$ (1.0 mol/L solution in hexane), and 6.5 mL of MAO (1.53 mol/L solution in toluene) were added. The reaction was stirred at 30° C. for 30 minutes, with ethylene pressure being maintained at 10 atm.

The reaction mixture was finally neutralized with an ethanol solution acidified with 10 wt % hydrochloric acid to obtain a polymer. The polymerization activity and polymer performance parameters are shown in Table 1 below.

Example 18

Ethylene copolymerization was carried out according to the polymerization procedure described in Example 2, except that 500 mL of toluene was used instead of the hexane. The results are shown in Table 1 below.

Comparative Example 1

Ethylene copolymerization was carried out according to the polymerization procedure described in Example 1, except that 15 μmol of Comparative Catalyst A was used.

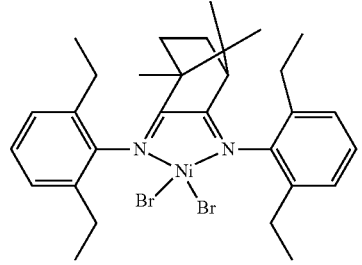

Comparative Catalyst A

Comparative Example 2

Ethylene copolymerization was carried out according to the polymerization procedure described in Example 1, except that 15 μmol of Comparative Catalyst B was used.

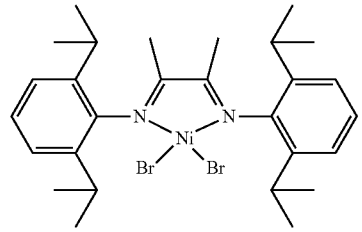

Comparative Catalyst B

TABLE 1

| No. | Complex | Polymerization Activity $10^6$ g · $mol^{-1}(Ni) · h^{-1}$ | Mw (×$10^4$) | PDI | Alcohol content (mol %) | Whether is there spherical or spherical-like polymer particles in the copolymer? | Spherical particle diameter (mm) |
|---|---|---|---|---|---|---|---|
| Example 1 | $Ni_1$ | 20.2 | 34.4 | 2.02 | 0.67 | Yes | 3.5 |
| Example 2 | $Ni_1$ | 26.7 | 48.2 | 1.92 | 1.37 | Yes | 3.8 |
| Example 3 | $Ni_1$ | 21.7 | 20.2 | 1.98 | 1.21 | No | |
| Example 4 | $Ni_1$ | 15.2 | 32.4 | 1.90 | 1.14 | Yes | 2.8 |
| Example 5 | $Ni_1$ | 12.4 | 21.7 | 1.95 | 1.03 | Yes | 2.1 |
| Example 6 | $Ni_1$ | 28.2 | 58.2 | 1.98 | 2.03 | Yes | 2.9 |
| Example 7 | $Ni_1$ | 15.7 | 62.4 | 2.03 | 3.84 | Yes | 2.2 |
| Example 8 | $Ni_2$ | 21.4 | 62.7 | 1.96 | 1.02 | Yes | 3.8 |
| Example 9 | $Ni_2$ | 20.3 | 31.6 | 2.02 | 0.96 | No | |
| Example 10 | $Ni_2$ | 11.7 | 20.6 | 2.02 | 0.98 | Yes | 3.6 |
| Example 11 | $Ni_3$ | 16.4 | 51.2 | 2.01 | 0.94 | Yes | 3.4 |
| Example 12 | $Ni_3$ | 13.3 | 42.7 | 2.04 | 0.93 | Yes | 3.2 |
| Example 13 | $Ni_4$ | 33.2 | 13.4 | 2.01 | 1.48 | Yes | 2.8 |
| Example 14 | $Ni_5$ | 35.1 | 14.9 | 1.98 | 1.46 | Yes | 2.9 |
| Example 15 | $Ni_6$ | 18.4 | 40.3 | 2.02 | 0.94 | Yes | 3.0 |
| Example 16 | $Ni_1$ | 24.2 | 43.3 | 2.04 | 1.36 | Yes | 3.3 |

TABLE 1-continued

| No. | Complex | Polymerization Activity $10^6$ g · $mol^{-1}(Ni) · h^{-1}$ | Mw (×$10^4$) | PDI | Alcohol content (mol %) | Whether is there spherical or spherical-like polymer particles in the copolymer? | Spherical particle diameter (mm) |
|---|---|---|---|---|---|---|---|
| Example 17 | $Ni_1$ | 18.2 | 37.8 | 2.08 | 1.52 | No | |
| Example 18 | $Ni_1$ | 24.1 | 44.3 | 2.02 | 1.36 | No | |
| Comp. Ex. 1 | A | 15.2 | 36.3 | 2.32 | 0.97 | Yes | 3.4 |
| Comp. Ex. 2 | B | 3.41 | 64.3 | 2.35 | 0.92 | No | |

Example 19

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 8.0 mg (5.0 mol) of the complex $Ni_1$, 15 mmol (2.55 g) of 2,2-dimethyl-7-octenoic acid, 15 mL of $AlEt_3$ (1.0 mol/L solution in hexane), and 6.5 mL of MAO (1.53 mol/L solution in toluene) were added. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 2 below.

Example 20

Ethylene copolymerization was carried out according to the polymerization procedure described in Example 19, except that 2 times quantity of 2,2-dimethyl-7-octenoic acid and 2 times quantity of $AlEt_3$ were used. The results are shown in Table 1 below. The polymerization activity and polymer performance parameters are shown in Table 2 below.

Example 21

Ethylene copolymerization was carried out according to the polymerization procedure described in Example 20, except that polymerization temperature was 60° C. The polymerization activity and polymer performance parameters are shown in Table 2 below.

Example 22

Ethylene copolymerization was carried out according to the polymerization procedure described in Example 20, except that 0.5 mL of diethylzinc (1 mol/L solution in hexane) was further added together with the catalyst. The polymerization activity and polymer performance parameters are shown in Table 2 below.

Example 23

Ethylene copolymerization was carried out according to the polymerization procedure described in Example 20, except that 1.0 mL of diethylzinc (1 mol/L solution in hexane) was further added together with the catalyst. The polymerization activity and polymer performance parameters are shown in Table 2 below.

Example 24

Ethylene copolymerization was carried out according to the polymerization procedure described in Example 19, except that 3.33 times quantity (i.e., 50 mmol (8.51 g)) of 2,2-dimethyl-7-octenoic acid and 3.33 times quantity (i.e., 50 mL) of $AlEt_3$ (1.0 mol/L solution in hexane) were used. The polymerization activity and polymer performance parameters are shown in Table 2 below.

Example 25

Ethylene copolymerization was carried out according to the polymerization procedure described in Example 19, except that 6.67 times quantity (i.e., 100 mmol (17.02 g)) of 2,2-dimethyl-7-octenoic acid and 6.67 times quantity (i.e., 100 mL) of $AlEt_3$ (1.0 mol/L solution in hexane) were used. The polymerization activity and polymer performance parameters are shown in Table 2 below.

Example 26

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 8.6 mg (5 mol) of the complex $Ni_2$, 30 mmol (5.10 g) of 2,2-dimethyl-7-octenoic acid, 15 mL of $AlEt_3$ (1.0 mol/L solution in hexane), and 6.5 mL of MAO (1.53 mol/L solution in toluene) were added. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 2 below.

Example 27

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 8.6 mg (5 mol) of the complex $Ni_2$, 50 mmol (8.51 g) of 2,2-dimethyl-7-octenoic acid, 50 mL of $AlEt_3$ (1.0 mol/L solution in hexane), and 6.5 mL of MAO (1.53 mol/L solution in toluene) were added. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 2 below.

Example 28

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 8.6 mg (5 mol) of the complex $Ni_2$, 30 mmol (4.69 g) of 2,2-dimethyl-6-heptenoic acid, 30 mL of $AlEt_3$ (1.0 mol/L solution in hexane), and 6.5 mL of MAO (1.53 mol/L solution in toluene) were added. The reaction was stirred at 30° C. for 60 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 2 below.

Example 29

Ethylene copolymerization was carried out according to the polymerization procedure described in Example 20, except that 8.9 mg (5 μmol) of the complex $Ni_3$ was used as a catalyst. The polymerization activity and polymer performance parameters are shown in Table 2 below.

Example 30

After having been continuously dried at 130° C. for 6 hrs, a 1 L stainless steel polymerization autoclave equipped with mechanical stirring was evacuated while it was hot and then filled with $N_2$ gas 3 times. 7.7 mg (5 μmol) of the complex $Ni_4$ was added thereto, followed by evacuating and filling with ethylene to perform replacement 3 times. 500 mL of hexane, 30 mmol (5.10 g) of 2,2-dimethyl-7-octenoic acid, and 30 mL of $AlEt_3$ (1.0 mol/L solution in hexane) were charged into the autoclave, followed by the addition of 6.5 mL of methylaluminoxane (MAO) (1.53 mol/1 solution in toluene). The reaction was vigorously stirred at 30° C. for 30 minutes, with ethylene pressure being maintained at 10 atm. The reaction mixture was neutralized with an ethanol solution acidified with 10 wt % hydrochloric acid to obtain a polymer. The results are shown in Table 2 below.

Example 31

After having been continuously dried at 130° C. for 6 hrs, a 1 L stainless steel polymerization autoclave equipped with mechanical stirring was evacuated while it was hot and then filled with $N_2$ gas 3 times. 9.0 mg (5 μmol) of the complex $Ni_5$ was added thereto, followed by evacuating and filling with ethylene to perform replacement 3 times. 500 mL of hexane, 30 mmol (5.10 g) of 2,2-dimethyl-7-octenoic acid, and 30 mL of $AlEt_3$ (1.0 mol/L solution in hexane) were charged into the autoclave, followed by the addition of 6.5 mL of methylaluminoxane (MAO) (1.53 mol/1 solution in toluene). The reaction was vigorously stirred at 20° C. for 30 minutes, with ethylene pressure being maintained at 10 atm. The reaction mixture was neutralized with an ethanol solution acidified with 10 wt % hydrochloric acid to obtain a polymer. The results are shown in Table 2 below.

Example 32

After having been continuously dried at 130° C. for 6 hrs, a 1 L stainless steel polymerization autoclave equipped with mechanical stirring was evacuated while it was hot and then filled with $N_2$ gas 3 times. 9.4 mg (5 μmol) of the complex $Ni_6$ was added thereto, followed by evacuating and filling with ethylene to perform replacement 3 times. 500 mL of hexane, 30 mmol (5.10 g) of 2,2-dimethyl-7-octenoic acid, and 30 mL of $AlEt_3$ (1.0 mol/L solution in hexane) were charged into the autoclave, followed by the addition of 6.5 mL of methylaluminoxane (MAO) (1.53 mol/1 solution in toluene). The reaction was vigorously stirred at 50° C. for 30 minutes, with ethylene pressure being maintained at 10 atm. The reaction mixture was neutralized with an ethanol solution acidified with 10 wt % hydrochloric acid to obtain a polymer. The results are shown in Table 2 below.

Example 33

Ethylene copolymerization was carried out according to the polymerization procedure described in Example 20, except that 15 mL of a solution of N,N-dimethylanilinium tetrakis(pentafluorophenyl)borate in toluene (1 mmol/L toluene solution) was used instead of MAO. The results are shown in Table 2 below.

Example 34

Ethylene copolymerization was carried out according to the polymerization procedure described in Example 20, except that 30 mmol (5.53 g) of 10-undecenoic acid was used as a comonomer. The polymerization activity and polymer performance parameters are shown in Table 2 below.

Example 35

Ethylene copolymerization was carried out according to the polymerization procedure described in Example 2, except that 500 mL of toluene was used instead of the hexane. The polymerization activity and polymer performance parameters are shown in Table 2 below.

TABLE 2

| No. | Complex | Polymerization Activity $10^6$ g · $mol^{-1}(Ni)h^{-1}$ | Mn (×$10^4$) | Comonomer content (mol %) | Whether is there spherical and/or spherical-like polymer particles in the copolymer? |
|---|---|---|---|---|---|
| Example 19 | $Ni_1$ | 15.3 | 14.2 | 0.78 | Yes |
| Example 20 | $Ni_1$ | 17.2 | 16.3 | 1.24 | Yes |
| Example 21 | $Ni_1$ | 16.2 | 9.3 | 1.02 | No |
| Example 22 | $Ni_1$ | 11.7 | 10.4 | 1.21 | Yes |
| Example 23 | $Ni_1$ | 9.3 | 8.4 | 1.17 | Yes |
| Example 24 | $Ni_1$ | 20.7 | 18.4 | 2.02 | Yes |
| Example 25 | $Ni_1$ | 16.3 | 16.2 | 3.72 | Yes |
| Example 26 | $Ni_2$ | 15.8 | 20.6 | 1.17 | Yes |
| Example 27 | $Ni_2$ | 11.3 | 16.4 | 1.02 | No |
| Example 28 | $Ni_2$ | 15.2 | 18.9 | 1.15 | Yes |
| Example 29 | $Ni_3$ | 11.3 | 10.4 | 1.01 | Yes |

TABLE 2-continued

| No. | Complex | Polymerization Activity $10^6$ g· $mol^{-1}(Ni)·h^{-1}$ | Mn (×$10^4$) | Comonomer content (mol %) | Whether is there spherical and/or spherical-like polymer particles in the copolymer? |
|---|---|---|---|---|---|
| Example 30 | $Ni_4$ | 21.7 | 8.4 | 1.53 | Yes |
| Example 31 | $Ni_5$ | 13.2 | 6.3 | 1.40 | Yes |
| Example 32 | $Ni_6$ | 14.2 | 17.3 | 1.02 | Yes |
| Example 33 | $Ni_1$ | 15.4 | 14.7 | 1.21 | Yes |
| Example 34 | $Ni_1$ | 14.1 | 13.0 | 1.13 | No |
| Example 35 | $Ni_1$ | 17.0 | 15.4 | 1.23 | No |

It can be seen from Table 2 that when the catalyst of the present invention catalyzes the copolymerization of ethylene and an unsaturated carboxylic acid, it exhibits higher polymerization activity, and the resulting polymer has a higher molecular weight. The catalyst of the present invention can have a copolymerization activity of up to $21.7 \times 10^6$ g·$mol^{-1}(Ni)·h^{-1}$, and the molecular weight of the polymer can be adjusted in a wide range by the addition of a chain transfer agent. In addition, by adjusting the polymerization conditions, a copolymer product with good particle morphology can be obtained.

The following structural Formulae of ligands and complexes are mentioned in Example 36-68:

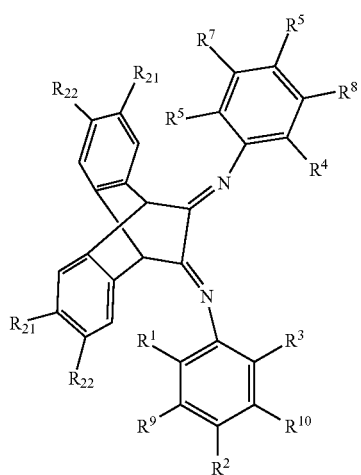

Formula B

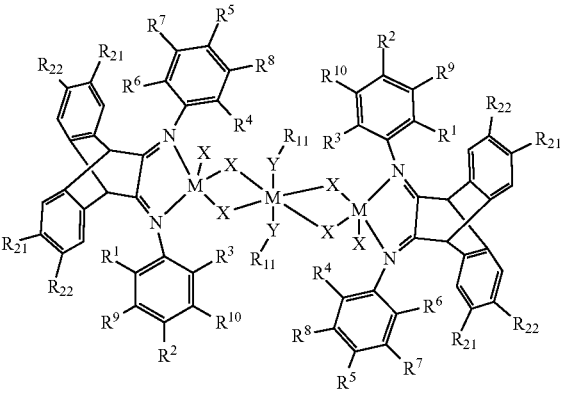

Formula IIIc

Example 36

1) Ligand $L_{11}$ (represented by the structural Formula B, wherein $R^1$, $R^3$, $R^4$, and $R^6$ are isopropyl, $R^2$, $R^5$, $R^7$-$R^{10}$, $R_{21}$, and $R_{22}$ are hydrogen) was prepared by following the literature Organometallics, 2013, 32, 2291-2299.

2) Preparation of Complex $Ni_{11}$ (Represented by the structural Formula IIIc, wherein $R^1$, $R^3$, $R^4$, and $R^6$ are isopropyl, $R^2$, $R^5$, $R^7$-$R^{10}$, $R_{21}$, and $R_{22}$ are hydrogen, $R_1$ is Ethyl, M is Nickel, Y is O, and X is Br):

A solution of 0.277 g (0.9 mmol) of (DME)NiBr$_2$ in ethanol (10 mL) was added slowly dropwise to a solution of 0.332 g (0.6 mmol) of ligand $L_{11}$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford $Ni_{11}$ as brownish-red powdery solids in a yield of 78.2%. Elemental analysis (calculated for $C_{84}H_{98}Br_6N_4Ni_3O_2$): C, 54.50; H, 5.34; N, 3.03; experimental value (%): C, 54.38; H, 5.72; N, 3.16.

3) Polymerization:

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 9.3 mg (5 mol) of the complex $Ni_{11}$, 15 mmol (2.5 mL) of 2-methyl-2-hydroxy-7-octene, 15 mL of AlEt$_3$ (1.0 mol/L solution in hexane), and 6.5 mL of MAO (1.53 mol/L solution in toluene) were added. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

Example 37

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 9.3 mg (5 mol) of the complex $Ni_{11}$, 30 mmol (5.1 mL) of 2-methyl-2-hydroxy-7-octene, 30 mL of AlEt$_3$ (1.0 mol/L solution in hexane), and 6.5 mL of MAO (1.53 mol/L solution in toluene) were added. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

Example 38

Ethylene copolymerization was carried out according to the polymerization procedure described in Example 37, except that the polymerization temperature was 60° C. The polymerization activity and polymer performance parameters are shown in Table 3 below.

Example 39

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 9.3 mg (5 mol) of the complex Ni$_{11}$, 30 mmol (5.1 mL) of 2-methyl-2-hydroxy-7-octene, 30 mL of AlEt$_3$ (1.0 mol/L solution in hexane), 0.5 mL of diethylzinc (1 mol/L solution in hexane), and 6.5 mL of MAO (1.53 mol/L solution in toluene) were added. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

Example 40

Ethylene copolymerization was carried out according to the polymerization procedure described in Example 39, except that 2 times quantity (1.0 mL) of diethylzinc (1 mol/L solution in hexane) was used. The polymerization activity and polymer performance parameters are shown in Table 3 below.

Example 41

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 9.3 mg (5 mol) of the complex Ni$_{11}$, 50 mmol (8.5 mL) of 2-methyl-2-hydroxy-7-octene, 50 mL of AlEt$_3$ (1.0 mol/L solution in hexane), and 6.5 mL of MAO (1.53 mol/L solution in toluene) were added. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

Example 42

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 9.3 mg (5 mol) of the complex Ni$_{11}$, 100 mmol (17.0 mL) of 2-methyl-2-hydroxy-7-octene, 100 mL of AlEt$_3$ (1.0 mol/L solution in hexane), and 6.5 mL of MAO (1.53 mol/L solution in toluene) were added. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

Example 43

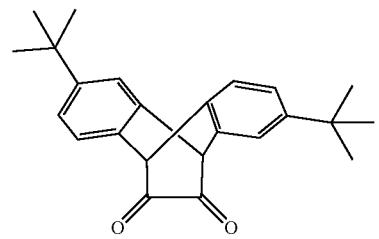

A

1) Ligand L$_{12}$ (represented by the structural Formula B, wherein R$^1$, R$^3$, R$^4$ and R$^6$ are ethyl, R$^2$, R$^5$, R$^7$-R$^{10}$ and R$_{22}$ are hydrogen, and R$_{21}$ is tert-butyl) was prepared by following the Patent CN106397264 as follows. Compound A (2.7 g, 7.8 mmol) and 2,6-diethylaniline (3.0 ml, 17.4 mmol) were refluxed in the presence of p-toluenesulfonic acid (0.02 g) as a catalyst in 100 mL of toluene for 1 day, and then the solvent was filtered off. The residue was dissolved in dichloromethane and then separated by over-basic alumina column chromatography with petroleum ether/ethyl acetate (20:1) as an eluant, with the second fraction being the target product. After removing the solvent, a yellow solid product was obtained at a yield of 81%. $^1$H NMR (CDCl3, δ, ppm): 1.06 (t, 12H, J=7.0 Hz), 1.19 ppm (s, 18H), 2.20 (dd, 8H, J=7.0 Hz), 4.70 (s, 2H), 7.04 (m, 10H), 7.13 (s, 2H).

2) Preparation of Complex Ni$_{12}$ (Represented by the structural Formula IIIc, wherein R$^1$, R$^3$, R$^4$ and R$^6$ are ethyl, R$^2$, R$^5$, R$^7$-R$^{10}$ and R$_{22}$ are hydrogen, R$_{21}$ is tert-Butyl, R$_{11}$ is Ethyl, M is Nickel, Y is O, and X is Br):

A solution of 0.277 g (0.9 mmol) of (DME)NiBr$_2$ in ethanol (10 mL) was added slowly dropwise to a solution of 0.365 g (0.6 mmol) of ligand L$_2$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni$_{12}$ as brownish-red powdery solids in a yield of 82.0%. Elemental analysis (calculated for C$_{92}$H$_{114}$Br$_6$N$_4$Ni$_3$O$_2$): C, 56.28; H, 5.85; N, 2.85; experimental value (%): C, 56.43; H, 6.12; N, 3.08.

3) Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 9.8 mg (5 mol) of the complex Ni$_{12}$, 30 mmol (5.1 mL) of 2-methyl-2-hydroxy-7-octene, 30 mL of AlEt$_3$ (1.0 mol/L solution in hexane), and 6.5 mL of MAO (1.53 mol/L solution in toluene) were added. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

Example 44

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 9.8 mg (5 mol) of the complex $Ni_{12}$, 30 mmol (8.5 mL) of 2-methyl-2-hydroxy-7-octene, 30 mL of $AlEt_3$ (1.0 mol/L solution in hexane), and 6.5 mL of MAO (1.53 mol/L solution in toluene) were added. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

Example 45

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 9.8 mg (5 mol) of the complex $Ni_{12}$, 30 mmol (4.1 mL) of 3-methyl-5-hexen-3-ol, 30 mL of $AlEt_3$ (1.0 mol/L solution in hexane), and 6.5 mL of MAO (1.53 mol/L solution in toluene) were added. The reaction was stirred at 30° C. for 60 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

Example 46

1) Preparation of Ligand $L_{13}$ (represented by the structural Formula B, wherein $R^1$, $R^3$, $R^4$ and $R^6$ are methyl, $R^2$ and $R^5$ are bromine, $R^7$-$R^{10}$ and $R_{22}$ are hydrogen, $R_{21}$ is t-butyl): Compound A (1.77 g, 5.1 mmol) and 2,6-dimethyl-4-bromoaniline (2.3 g, 11.3 mmol) were refluxed, in the presence of p-toluenesulfonic acid (0.02 g) as a catalyst, in 100 mL of toluene for 1 day. The solvent was filtered off, and the residue was dissolved in dichloromethane and separated by column chromatography with petroleum ether/ethyl acetate as an eluant, to afford $L_{13}$ as yellow solids in a yield of 78%. 1H NMR (CDCl3, δ, ppm): 1.84 (s, 12H), 1.19 ppm (s, 18H), 4.70 (s, 2H), 7.04 (8H), 7.12 (s, 2H).

2) Preparation of Complex $Ni_{13}$ (Represented by the Structural Formula IIIc, Wherein $R^1$, $R^3$, $R^4$ and $R^6$ are Methyl, $R^2$ and $R^5$ are Bromine, $R^7$-$R^{10}$ and $R_{22}$ are Hydrogen, $R_{21}$ is Tert-Butyl, $R_{11}$ is Ethyl, M is Nickel, Y is O, and X is Br):

A solution of 0.277 g (0.9 mmol) of $(DME)NiBr_2$ in ethanol (10 mL) was added slowly dropwise to a solution of 0.426 g (0.6 mmol) of ligand $L_{13}$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford $Ni_{13}$ as brownish-red powdery solids in a yield of 82.0%. Elemental analysis (calculated for $C_{84}H_{94}Br_{10}N_4Ni_3O_2$): C, 46.56; H, 4.37; N, 2.59; experimental value (%): C, 46.43; H, 4.72; N, 2.98.

3) Polymerization:

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 10.8 mg (5 mol) of the complex $Ni_{13}$, 30 mmol (5.1 mL) of 2-methyl-2-hydroxy-7-octene, 30 mL of $AlEt_3$ (1.0 mol/L solution in hexane), and 6.5 mL of MAO (1.53 mol/L solution in toluene) were added. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

Example 47

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 10.8 mg (5 mol) of the complex $Ni_{13}$, 30 mmol (4.5 mL) of 4-methyl-1-heptene-4-ol, 30 mL of $AlEt_3$ (1.0 mol/L solution in hexane), and 6.5 mL of MAO (1.53 mol/L solution in toluene) were added. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

Example 48

1) Preparation of Complex $Ni_{14}$ (Represented by the Structural Formula IIIc, Wherein $R^1$, $R^3$, $R^4$ and $R^6$ are Ethyl, $R^2$, $R^5$, $R^7$-$R^{10}$ and $R_{22}$ are Hydrogen, $R_{21}$ is Tert-Butyl, $R_{11}$ is Isobutyl, M is Nickel, Y is O, and X is Br)

A solution of 0.277 g (0.9 mmol) of $(DME)NiBr_2$ in 2-methyl-1-propanol (10 mL) was added slowly dropwise to a solution of 0.365 g (0.6 mmol) of ligand $L_{12}$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford $Ni_{14}$ as brownish-red powdery solids in a yield of 83.0%. Elemental analysis (calculated for $C_{96}H_{122}Br_6N_4Ni_3O_2$): C, 57.09; H, 6.09; N, 2.77; experimental value (%): C, 57.24; H, 6.32; N, 3.04.

2) Polymerization:

After having been continuously dried at 130° C. for 6 hrs, a 1 L stainless steel polymerization autoclave equipped with mechanical stirring was evacuated while it was hot and then filled with $N_2$ gas 3 times. 10.1 mg (5 μmol) of the complex $Ni_{14}$ was added thereto, followed by evacuating and filling with ethylene to perform replacement 3 times. 500 mL of hexane, 30 mmol (5.1 mL) of 2-methyl-2-hydroxy-7-octene, and 30 mL of $AlEt_3$ (1.0 mol/L solution in hexane) were charged into the autoclave, followed by the addition of 6.5 mL of methylaluminoxane (MAO) (1.53 mol/l solution in toluene). The reaction was vigorously stirred at 30° C. for 30 minutes, with ethylene pressure being maintained at 10 atm. The reaction mixture was neutralized with an ethanol solution acidified with 10 wt % hydrochloric acid to obtain a polymer. The results are shown in Table 3 below.

Example 49

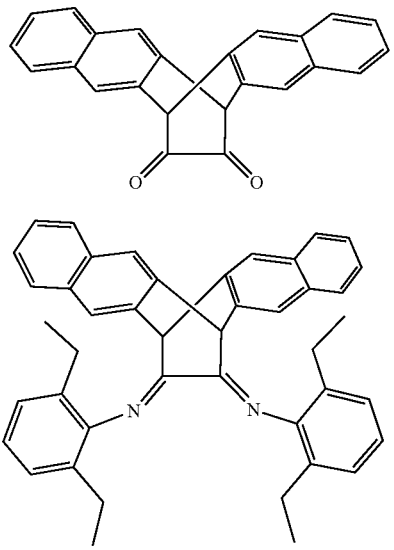

1) Ligand $L_{19}$ was prepared by following the method disclosed in patent application CN201510462932.2 and by using the compound B as a raw material.
2) Preparation of Complex $Ni_{15}$ (Represented by Formula IIIc', wherein $R^1=R^3=R^4=R^6=Et$, $R^2=R^5=R^7-R^{10}=R_{31}=R_{32}=H$, $R_{11}=Et$, M=Ni, Y=O, X=Br):

A solution of 0.277 g (0.9 mmol) of (DME)NiBr$_2$ in ethanol (10 mL) was added slowly dropwise to a solution of 0.358 g (0.6 mmol) of ligand $L_{19}$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford $Ni_{15}$ as brownish-red powdery solids in a yield of 84.3%. Elemental analysis (calculated for $C_{92}H_{90}Br_6N_4Ni_3O_2$): C, 56.98; H, 4.68; N, 2.89; experimental value (%): C, 56.78; H, 4.62; N, 3.18.
3) Polymerization:

After having been continuously dried at 130° C. for 6 hrs, a 1 L stainless steel polymerization autoclave equipped with mechanical stirring was evacuated while it was hot and then filled with $N_2$ gas 3 times. 9.7 mg (5 μmol) of the complex $Ni_{15}$ was added thereto, followed by evacuating and filling with ethylene to perform replacement 3 times. 500 mL of hexane, 30 mmol (5.1 mL) of 2-methyl-2-hydroxy-7-octene, and 30 mL of AlEt$_3$ (1.0 mol/L solution in hexane) were charged into the autoclave, followed by the addition of 6.5 mL of methylaluminoxane (MAO) (1.53 mol/l solution in toluene). The reaction was vigorously stirred at 30° C. for 30 minutes, with ethylene pressure being maintained at 10 atm. The reaction mixture was neutralized with an ethanol solution acidified with 10 wt % hydrochloric acid to obtain a polymer. The results are shown in Table 3 below.

Example 50

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 9.3 mg (5 mol) of the complex $Ni_{11}$, 30 mmol (5.1 mL) of 2-methyl-2-hydroxy-7-octene, and 30 mL of AlEt$_3$ (1.0 mol/L solution in hexane) were added thereto, followed by the addition of 15 mL of a solution of N,N-dimethylanilinium tetrakis(pentafluorophenyl)borate in toluene (1 mmol/L toluene solution). The reaction was stirred at 30° C. for 30 minutes, with ethylene pressure being maintained at 10 atm. The reaction mixture was finally neutralized with an ethanol solution

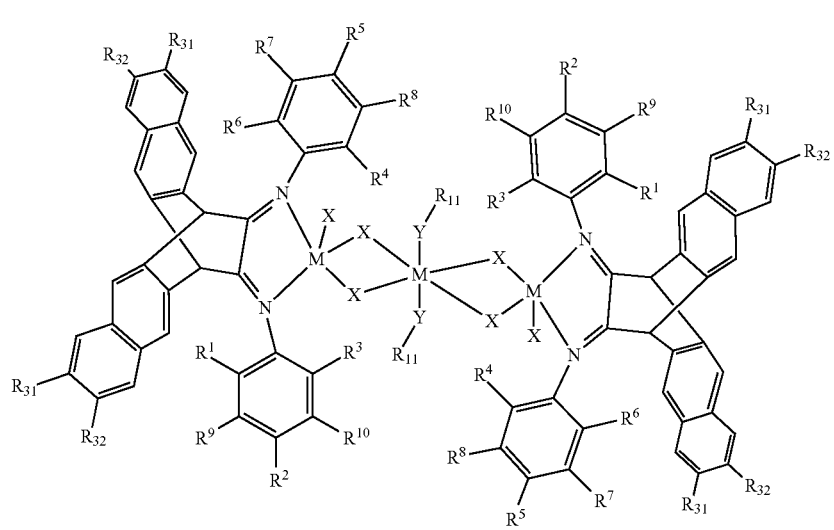

Formula IIIc' acidified with 10 wt % hydrochloric acid to obtain a polymer. The polymerization activity and polymer performance parameters are shown in Table 3 below.

Example 51

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 9.3 mg (5 mol) of the complex $Ni_{11}$, 30 mmol (6.0 mL) of 10-undecen-1-ol, 30 mL of $AlEt_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

Example 52

After having been continuously dried at 130° C. for 6 hrs, a 1 L stainless steel polymerization autoclave equipped with mechanical stirring was evacuated while it was hot and then filled with $N_2$ gas 3 times. 500 mL of toluene was charged into the autoclave, and at the same time 9.3 mg (5 mol) of the complex $Ni_{11}$, 30 mmol (5.1 mL) of 2-methyl-2-hydroxy-7-octene, 30 mL of $AlEt_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

a chain transfer agent. In addition, by adjusting the polymerization conditions, a copolymer product with good particle morphology can be obtained.

Example 53

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 9.3 mg (5 mol) of the complex $Ni_{11}$, 15 mmol (2.55 g) of 2,2-dimethyl-7-octenoic acid, 15 mL of $AlEt_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 4 below.

Example 54

Ethylene copolymerization was carried out according to the procedure described in Example 53, except that 2 times quantity (30 mmol (5.10 g)) of 2,2-dimethyl-7-octenoic acid and 2 times quantity (30 mL) of $AlEt_3$ were used. The results are shown in Table 4 below.

Example 55

Ethylene copolymerization was carried out according to the procedure described in Example 54, except that polymerization temperature was 60° C. The results are shown in Table 4 below.

TABLE 3

| No. | Complex | Polymerization Activity $10^6$ g · $mol^{-1}(Ni) \cdot h^{-1}$ | Mw (×$10^4$) | PDI | Alcohol content (mol %) | Whether is there spherical and/or spherical-like polymer particles in the copolymer? |
|---|---|---|---|---|---|---|
| Example 36 | $Ni_{11}$ | 3.03 | 63.2 | 2.13 | 0.64 | Yes |
| Example 37 | $Ni_{11}$ | 4.12 | 68.2 | 2.11 | 1.27 | Yes |
| Example 38 | $Ni_{11}$ | 2.37 | 22.5 | 2.23 | 1.08 | No |
| Example 39 | $Ni_{11}$ | 2.64 | 48.3 | 2.08 | 1.04 | Yes |
| Example 40 | $Ni_{11}$ | 1.92 | 31.7 | 2.02 | 0.96 | Yes |
| Example 41 | $Ni_{11}$ | 4.94 | 71.3 | 2.04 | 2.01 | Yes |
| Example 42 | $Ni_{11}$ | 2.12 | 74.0 | 2.05 | 3.71 | Yes |
| Example 43 | $Ni_{12}$ | 1.96 | 16.2 | 2.32 | 1.33 | Yes |
| Example 44 | $Ni_{12}$ | 1.27 | 8.4 | 2.36 | 1.00 | No |
| Example 45 | $Ni_{12}$ | 1.15 | 13.8 | 2.24 | 1.16 | Yes |
| Example 46 | $Ni_{13}$ | 2.24 | 6.3 | 2.42 | 1.38 | Yes |
| Example 47 | $Ni_{13}$ | 2.41 | 6.8 | 2.31 | 1.36 | Yes |
| Example 48 | $Ni_{14}$ | 1.53 | 15.6 | 2.14 | 1.17 | Yes |
| Example 49 | $Ni_{15}$ | 2.36 | 17.3 | 2.10 | 1.24 | Yes |
| Example 50 | $Ni_{11}$ | 3.76 | 63.2 | 2.27 | 1.26 | Yes |
| Example 51 | $Ni_{11}$ | 4.42 | 73.1 | 2.02 | 1.26 | No |
| Example 52 | $Ni_{11}$ | 4.13 | 67.0 | 2.12 | 1.27 | No |

It can be seen from Table 3 that the catalyst of the present invention exhibits higher polymerization activity when catalyzing the copolymerization of ethylene and an enol, and the resulting polymer has a higher molecular weight. The catalyst of the invention can have a copolymerization activity of up to $4.94 \times 10^6$ g·$mol^{-1}(Ni) \cdot h^{-1}$. The molecular weight of the polymer can be adjusted in a wide range by the addition of

Example 56

Ethylene copolymerization was carried out according to the procedure described in Example 54, except that 0.5 mL of diethylzinc (1 mol/L solution in hexane) was further added into the autoclave. The results are shown in Table 4 below.

Example 57

Ethylene copolymerization was carried out according to the procedure described in Example 54, except that 1.0 mL of diethylzinc (1 mol/L solution in hexane) was further added into the autoclave. The results are shown in Table 4 below.

Example 58

Ethylene copolymerization was carried out according to the procedure described in Example 53, except that 3.33 times quantity (50 mmol (8.51 g)) of 2,2-dimethyl-7-octenoic acid and 3.33 times quantity (50 mL) of AlEt$_3$ (1.0 mol/L solution in hexane) were used. The results are shown in Table 4 below.

Example 59

Ethylene copolymerization was carried out according to the procedure described in Example 53, except that 6.67 times quantity of 2,2-dimethyl-7-octenoic acid and 6.67 times quantity of AlEt$_3$ (1.0 mol/L solution in hexane) were used. The results are shown in Table 4 below.

Example 60

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 9.8 mg (5 mol) of the complex Ni$_{12}$, 30 mmol (5.10 g) of 2,2-dimethyl-7-octenoic acid, 30 mL of AlEt$_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 4 below.

Example 61

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 9.8 mg (5 mol) of the complex Ni$_{12}$, 50 mmol (8.51 g) of 2,2-dimethyl-7-octenoic acid, 50 mL of AlEt$_3$ (1.0 mol/L solution in hexane), and 6.5 mL of MAO (1.53 mol/1 solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 4 below.

Example 62

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 9.8 mg (5 mol) of the complex Ni$_{12}$, 30 mmol (4.69 g) of 2,2-dimethyl-6-heptenoic acid, 30 mL of AlEt$_3$ (1.0 mol/L solution in hexane), and 6.5 mL of MAO (1.53 mol/1 solution in toluene) were added thereto. The reaction was stirred at 30° C. for 60 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 4 below.

Example 63

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 10.8 mg (5 mol) of the complex Ni$_{13}$, 30 mmol (5.10 g) of 2,2-dimethyl-7-octenoic acid, 30 mL of AlEt$_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 4 below.

Example 64

After having been continuously dried at 130° C. for 6 hrs, a 1 L stainless steel polymerization autoclave equipped with mechanical stirring was evacuated while it was hot and then filled with N$_2$ gas 3 times. 10.1 mg (5 μmol) of the complex Ni$_{14}$ was added thereto, followed by evacuating and filling with ethylene to perform replacement 3 times. 500 mL of hexane, 30 mmol (5.10 g) of 2,2-dimethyl-7-octenoic acid, and 30 mL of AlEt$_3$ (1.0 mol/L solution in hexane) were charged into the autoclave, followed by the addition of 6.5 mL of methylaluminoxane (MAO) (1.53 mol/1 solution in toluene). The reaction was vigorously stirred at 30° C. for 30 minutes, with ethylene pressure being maintained at 10 atm. The reaction mixture was neutralized with an ethanol solution acidified with 10 wt % hydrochloric acid to obtain a polymer. The results are shown in Table 4 below.

Example 65

After having been continuously dried at 130° C. for 6 hrs, a 1 L stainless steel polymerization autoclave equipped with mechanical stirring was evacuated while it was hot and then filled with N$_2$ gas 3 times. 9.7 mg (5 μmol) of the complex Ni$_{15}$ was added thereto, followed by evacuating and filling with ethylene to perform replacement 3 times. 500 mL of hexane, 30 mmol (5.10 g) of 2,2-dimethyl-7-octenoic acid, and 30 mL of AlEt$_3$ (1.0 mol/L solution in hexane) were charged into the autoclave, followed by the addition of 6.5 mL of methylaluminoxane (MAO) (1.53 mol/1 solution in toluene). The reaction was vigorously stirred at 20° C. for 30 minutes, with ethylene pressure being maintained at 10 atm. The reaction mixture was neutralized with an ethanol solution acidified with 10 wt % hydrochloric acid to obtain a polymer. The results are shown in Table 4 below.

Example 66

After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the autoclave, and at the same time 9.3 mg (5 mol) of the complex $Ni_{11}$, 30 mmol (5.10 g) of 2,2-dimethyl-7-octenoic acid, and 30 mL of $AlEt_3$ (1.0 mol/L solution in hexane) were added thereto, followed by the addition of 15 mL of a solution of N,N-dimethylanilinium tetrakis(pentafluorophenyl)borate in toluene (1 mmol/L toluene solution). The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 4 below.

Example 67

After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the autoclave, and at the same time 9.3 mg (5 mol) of the complex $Ni_{11}$, 30 mmol (5.53 g) of 10-undecenoic acid, 30 mL of $AlEt_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 4 below.

Example 68

After having been continuously dried at 130° C. for 6 hrs, a 1 L stainless steel polymerization autoclave equipped with mechanical stirring was evacuated while it was hot and then filled with N₂ gas 3 times. 500 mL of toluene was charged into the autoclave, and at the same time 9.3 mg (5 mol) of the complex $Ni_{11}$, 30 mmol (5.10 g) of 2,2-dimethyl-7-octenoic acid, 30 mL of $AlEt_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 4 below.

TABLE 4

| No. | Complex | Polymerization Activity $10^6$ g · $mol^{-1}(Ni)h^{-1}$ | Mn (×10⁴) | Comonomer content (mol %) | Whether is there spherical and/or spherical-like polymer particles in the copolymer? |
|---|---|---|---|---|---|
| Example 53 | $Ni_{11}$ | 1.54 | 18.4 | 0.72 | Yes |
| Example 54 | $Ni_{11}$ | 1.86 | 22.1 | 1.10 | Yes |
| Example 55 | $Ni_{11}$ | 1.12 | 10.3 | 0.92 | No |
| Example 56 | $Ni_{11}$ | 1.20 | 13.4 | 1.04 | Yes |
| Example 57 | $Ni_{11}$ | 0.98 | 8.4 | 1.01 | Yes |
| Example 58 | $Ni_{11}$ | 2.12 | 24.4 | 1.98 | Yes |
| Example 59 | $Ni_{11}$ | 1.63 | 19.2 | 3.20 | Yes |
| Example 60 | $Ni_{12}$ | 1.13 | 12.6 | 1.14 | Yes |
| Example 61 | $Ni_{12}$ | 1.20 | 13.4 | 2.02 | No |
| Example 62 | $Ni_{12}$ | 1.22 | 12.9 | 1.15 | Yes |
| Example 63 | $Ni_{13}$ | 2.42 | 8.4 | 1.41 | Yes |
| Example 64 | $Ni_{14}$ | 1.06 | 10.7 | 1.10 | Yes |
| Example 65 | $Ni_{15}$ | 1.37 | 14.4 | 1.14 | Yes |
| Example 66 | $Ni_{11}$ | 1.70 | 21.4 | 1.06 | Yes |
| Example 67 | $Ni_{11}$ | 1.35 | 20.2 | 1.10 | No |
| Example 68 | $Ni_{11}$ | 1.38 | 20.4 | 1.09 | No |

It can be seen from Table 4 that when the catalyst of the present invention catalyzes the copolymerization of ethylene and an unsaturated carboxylic acid, it exhibits higher polymerization activity, and the resulting polymer has a higher molecular weight. The catalyst of the present invention can have a copolymerization activity of up to $2.42×10^6$ g·mol⁻(Ni)·h⁻¹, and the molecular weight of the polymer can be adjusted in a wide range by the addition of a chain transfer agent. In addition, by adjusting the polymerization conditions, a copolymer product with good particle morphology can be obtained.

The compounds of the following structural Formulae are mentioned in the following examples:

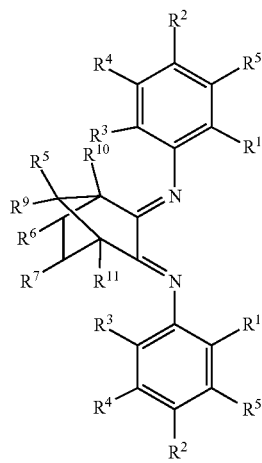

VI

-continued

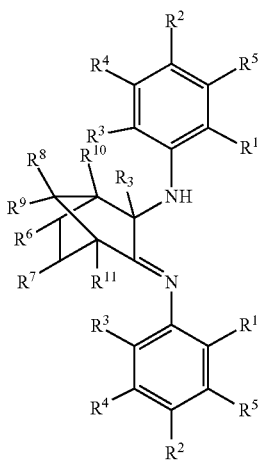

V

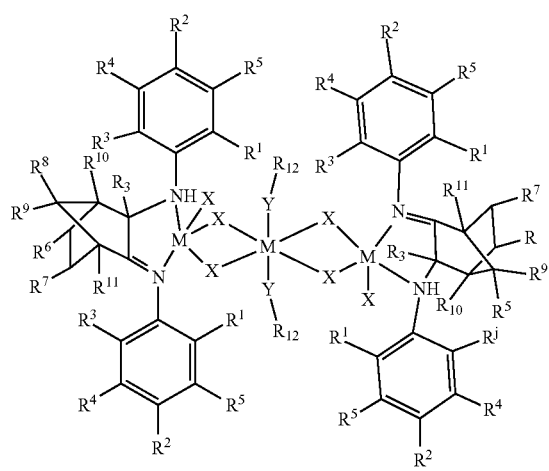

III

Diimine Compound A21: α-diimine compound represented by Formula VI, wherein $R^1=R^3=Me$, $R^2=R^4=R^5=R^6=R^7=R^{10}=H$, $R^8=R^9=R^{11}=CH_3$;

Diimine Compound A22: α-diimine compound represented by Formula VI, wherein $R^1=R^3=iPr$, $R^2=R^4=R^5=R^6=R^7=R^{10}=H$, $R^8=R^9=R^{11}=CH_3$;

Ligand $L_{21}$: amino-imine compound represented by Formula V, wherein $R^1=R^3=Me$, $R^2=R^4=R^5=R^6=R^7=R^{10}=H$, $R^8=R^9=R^{11}=CH_3$, $R_3=CH_3$;

Ligand $L_{22}$: amino-imine compound represented by Formula V, wherein $R^1=R^3=iPr$, $R^2=R^4=R^5=R^6=R^7=R^{10}=H$, $R^8=R^9=R^{11}=CH_3$, $R_3=CH_3$;

Ligand $L_{23}$: amino-imine compound represented by Formula V, wherein $R^1=R^3=iPr$, $R^2=R^4=R^5=R^6=R^7=R^{10}=H$, $R^8=R^9=R^{11}=CH_3$; $R_3=Et$;

Complex $Ni_{21}$: complex represented by Formula III, wherein $R^1=R^3=Me$, $R^2=R^4=R^5=R^6=R^7=R^{10}=H$, $R^8=R^9=R^{11}=CH_3$, $R_3=CH_3$, $R_{12}=Et$, M=Ni, Y=O, X=Br;

Complex $Ni_{22}$: complex represented by Formula III, wherein $R^1=R^3=iPr$, $R^2=R^4=R^5=R^6=R^7=R^{10}=H$, $R^8=R^9=R^{11}=CH_3$; $R_3=CH_3$, $R_{12}=Et$, M=Ni, Y=O, X=Br;

Complex $Ni_{23}$: complex represented by Formula III, wherein $R^1=R^3=iPr$, $R^2=R^4=R^5=R^6=R^7=R^{10}=H$, $R^8=R^9=R^{11}=CH_3$; $R_3=Et$, $R_{12}=Et$, M=Ni, Y=O, X=Br.

Example 69

1) Preparation of Ligand $L_{21}$:

1.5 mL of 2,6-dimethylaniline (12 mmol) was reacted with 57 ml of 1M trimethylaluminum in toluene under refluxing for 3 h. Then, camphorquinone (1.05 g, 5 mmol) was added thereto, and the reaction mixture was refluxed for 8 hours. After cooling, the reaction was terminated with sodium hydroxide/ice water, the reaction mixture was extracted with ethyl acetate, and organic phases were combined and dried over anhydrous magnesium sulfate. The product was separated by column chromatography with petroleum ether/ethyl acetate as an eluent to obtain ligand $L_{21}$ as colorless crystals in a yield of 70.2%. $^1$HNMR δ(ppm) 7.00-6.89 (m, 6H, Ar—H), 3.57 (s, 1H, NH), 2.18 (s, 6H, $C_{Ar}$—$CH_3$), 2.05 (s, 6H, $CH_3$), 1.74 (m, 4H, $CH_2$), 1.44 (s, 3H, $CH_3$), 1.35 (m, 1H), 1.21 (s, 3H, C $H_3$), 1.01 (s, 3H, $CH_3$), 0.87 (s, 3H, $CH_3$).

2) Preparation of Complex Ni21:

A solution of (DME)NiBr$_2$ (277 mg, 0.9 mmol) in ethanol (10 mL) was added dropwise to a solution of ligand $L_{21}$ (233 mg, 0.6 mmol) in dichloromethane (10 mL), and the resulting mixture was stirred at room temperature for 6 h, with precipitants being generated. After filtering, the filter cake was washed with diethyl ether and dried to afford red powdery solids in a yield of 70%. Elemental analysis (calculated for $C_{58}H_{22}Br_6N_4Ni_3O_2$): C, 45.75; H, 5.43; N, 3.68; experimental value (%): C, 45.56; H, 5.83; N, 3.46.

3) Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 7.6 mg (5 mol) of the complex $Ni_{21}$, 15 mmol (2.5 mL) of 2-methyl-2-hydroxy-7-octene, 15 mL of AlEt$_3$ (1.0 mol/L solution in hexane), and 6.5 mL of methylaluminoxane (MAO) (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 5 below.

Example 70

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 7.6 mg (5 mol) of the complex $Ni_{21}$, 30 mmol (5.1 mL) of 2-methyl-2-hydroxy-7-octene, 30 mL of AlEt$_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 5 below.

Figure 4:
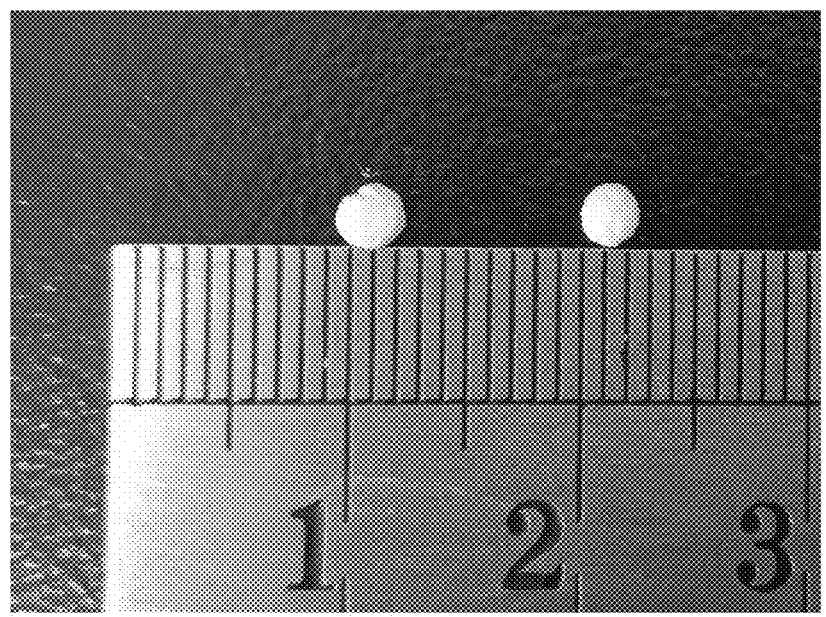
FIG. 4 is a photograph of the spherical and/or spherical-like polymer obtained in Example 70 of the invention.

FIG. 4 shows a photograph of the spherical and/or spherical-like polymer prepared in this example.

Example 71

Ethylene copolymerization was carried out according to the procedure described in Example 70, except that polymerization temperature was 60° C. The results are shown in Table 5 below.

Example 72

Ethylene copolymerization was carried out according to the procedure described in Example 70, except that 0.5 mL of diethylzinc (1 mol/L solution in hexane) was further added into the autoclave. The results are shown in Table 5 below.

Example 73

Ethylene copolymerization was carried out according to the procedure described in Example 70, except that 1.0 mL of diethylzinc (1 mol/L solution in hexane) was further added into the autoclave. The results are shown in Table 5 below.

Example 74

Ethylene copolymerization was carried out according to the procedure described in Example 69, except that 3.33 times quantity (50 mmol (8.5 mL)) of 2-methyl-2-hydroxy-7-octene and 3.33 times quantity (50 mL) of AlEt$_3$ (1.0 mol/L solution in hexane) were used. The results are shown in Table 5 below.

Example 75

Ethylene copolymerization was carried out according to the procedure described in Example 69, except that 6.67 times quantity of 2-methyl-2-hydroxy-7-octene and 6.67 times quantity of AlEt$_3$ (1.0 mol/L solution in hexane) were used. The results are shown in Table 5 below.

Example 76

1) Preparation of Ligand L$_{22}$:

To a reaction flask were successively charged with 3.88 g (8 mmol) of α-diimine compound A22, 30 ml of toluene, and 1M trimethylaluminum (16 ml, 16 mmol), and the contents were allowed to react under reflux for 8 hours. The reaction was terminated with sodium hydroxide/ice water and extracted with ethyl acetate, and organic phases were combined and dried over anhydrous magnesium sulfate. The product was separated by column chromatography with petroleum ether/ethyl acetate as an eluent to obtain ligand L$_{22}$ as colorless crystals in a yield of 84.2%. $^1$HNMR δ(ppm) 7.19-7.06 (m, 6H, Ar—H), 3.42 (s, 1H, NH), 2.98 (m, 2H, CH(CH$_3$)$_2$), 2.88 (m, 2H, CH(CH$_3$)$_2$), 2.32 (m, 1H), 1.81 (m, 4H, CH$_2$), 1.50 (s, 3H, CH$_3$), 1.21 (m, 24H, CH$_3$), 0.92 (s, 3H, CH$_3$), 0.75 (s, 3H, CH$_3$), 0.72 (s, 3H, CH$_3$).

2) Preparation of Complex Ni$_{22}$:

A solution of (DME)NiBr$_2$ (277 mg, 0.9 mmol) in ethanol (10 mL) was added dropwise to a solution of ligand L$_{22}$ (300 mg, 0.6 mmol) in dichloromethane (10 mL), and the resulting mixture was stirred at room temperature for 6 h, with precipitants being generated. After filtering, the filter cake was washed with diethyl ether and dried to afford red powdery solids in a yield of 78%. Elemental analysis (calculated for C$_{74}$H$_{114}$Br$_6$N$_4$Ni$_3$O$_2$): C, 50.87; H, 6.58; N, 3.21; experimental value (%): C, 50.57; H, 6.73; N, 3.04.

3) Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.7 mg (5 mol) of the complex Ni$_{22}$, 30 mmol (5.1 mL) of 2-methyl-2-hydroxy-7-octene, 30 mL of AlEt$_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 5 below.

Example 77

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.7 mg (5 mol) of the complex Ni$_{22}$, 30 mmol (8.5 mL) of 2-methyl-2-hydroxy-7-octene, 30 mL of AlEt$_3$ (1.0 mol/L solution in hexane), and 6.5 mL of MAO (1.53 mol/1 solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 5 below.

Example 78

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.7 mg (5 mol) of the complex Ni$_{22}$, 30 mmol (4.1 mL) of 3-methyl-5-hexen-3-ol, 30 mL of AlEt$_3$ (1.0 mol/L solution in hexane), and 6.5 mL of MAO (1.53 mol/1 solution in toluene) were added thereto. The reaction was stirred at 30° C. for 60 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 5 below.

Example 79

1) Preparation of Ligand L$_{23}$:

To a reaction flask were successively charged with 3.88 g (8 mmol) of α-diimine compound A22, 30 ml of diethyl ether, and 2M diethylzinc (4 ml, 8 mmol), and the contents were stirred at room temperature for 3 hours. The reaction was terminated with ice water, the reaction mixture was extracted with ethyl acetate, and organic phases were combined and dried over anhydrous magnesium sulfate. The product was separated by column chromatography with petroleum ether/ethyl acetate as an eluent to obtain ligand L$_{23}$ as colorless crystals with a yield of 52.1%. $^1$HNMR δ(ppm) 7.17-7.06 (m, 6H, Ar—H), 4.44 (s, 1H, NH), 2.98

(m, 2H, CH(CH$_3$)$_2$), 2.87 (m, 2H, CH(CH$_3$)$_2$), 2.33 (m, 1H), 1.86 (m, 2H, CH$_2$), 1.81 (m, 4H, CH$_2$), 1.21 (m, 24H, CH$_3$), 1.08 (t, 3H, CH$_3$), 0.93 (s, 3H, CH$_3$), 0.75 (s, 3H, CH$_3$), 0.72 (s, 3H, CH$_3$).

2) Preparation of Complex Ni$_{23}$:

A solution of (DME)NiBr$_2$ (277 mg, 0.9 mmol) in ethanol (10 mL) was added dropwise to a solution of ligand L$_{23}$ (309 mg, 0.6 mmol) in dichloromethane (10 mL), and the resulting mixture was stirred at room temperature for 6 h, with precipitants being generated. After filtering, the filter cake was washed with diethyl ether and dried to afford red powdery solids in a yield of 72%. Elemental analysis (calculated for C$_{76}$H$_{118}$Br$_6$N$_4$Ni$_3$O$_2$): C, 51.42; H, 6.70; N, 3.16; experimental value (%): C, 51.29; H, 6.98; N, 3.04.

3) Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.9 mg (5 mol) of the complex Ni$_{23}$, 30 mmol (5.1 mL) of 2-methyl-2-hydroxy-7-octene, 30 mL of AlEt$_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 5 below.

Example 80

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.9 mg (5 mol) of the complex Ni$_{23}$, 30 mmol (4.5 mL) of 4-methyl-1-hepten-4-ol, 30 mL of AlEt$_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 5 below.

Example 81

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 7.6 mg (5 mol) of the complex Ni$_{21}$, 30 mmol (5.1 mL) of 2-methyl-2-hydroxy-7-octene, and 30 mL of AlEt$_3$ (1.0 mol/L solution in hexane) were added thereto, followed by the addition of 15 mL of a solution of N,N-dimethylanilinium tetrakis(pentafluorophenyl)borate in toluene (1 mmol/L toluene solution). The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 5 below.

Example 82

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 7.6 mg (5 mol) of the complex Ni$_{21}$, 30 mmol (6.0 mL) of 10-undecen-1-ol, 30 mL of AlEt$_3$ (1.0 mol/L solution in hexane), and 6.5 mL of MAO (1.53 mol/solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 5 below.

Example 83

After having been continuously dried at 130° C. for 6 hrs, a 1 L stainless steel polymerization autoclave equipped with mechanical stirring was evacuated while it was hot and then filled with N$_2$ gas 3 times. 500 mL of toluene was charged into the autoclave, and at the same time 7.6 mg (5 mol) of the complex Ni$_2$, 30 mmol (5.1 mL) of 2-methyl-2-hydroxy-7-octene, 30 mL of AlEt$_3$ (1.0 mol/L solution in hexane), and 6.5 mL of MAO (1.53 mol/solution in toluene) were added thereto. The reaction was stirred at 30° C. for 30 minutes, with ethylene pressure being maintained at 10 atm. The reaction mixture was finally neutralized with an ethanol solution acidified with 10 w % hydrochloric acid to obtain a polymer. The polymerization activity and polymer performance parameters are shown in Table 5 below.

TABLE 5

| No. | Complex | Polymerization Activity 10$^6$ g · mol$^{-1}$(Ni) · h$^{-1}$ | Mw (×10$^4$) | PDI | Alcohol content (mol %) | Whether is there spherical and/or spherical-like polymer particles in the copolymer? |
|---|---|---|---|---|---|---|
| Example 69 | Ni21 | 2.72 | 18.4 | 1.72 | 0.71 | Yes |
| Example 70 | Ni21 | 3.02 | 20.1 | 1.68 | 1.14 | Yes |
| Example 71 | Ni21 | 1.03 | 6.4 | 1.60 | 0.93 | No |
| Example 72 | Ni21 | 1.63 | 12.0 | 1.50 | 1.02 | Yes |
| Example 73 | Ni21 | 1.07 | 7.6 | 1.12 | 0.96 | Yes |
| Example 74 | Ni21 | 2.96 | 20.8 | 1.73 | 1.42 | Yes |
| Example 75 | Ni21 | 1.54 | 21.7 | 1.86 | 2.37 | Yes |
| Example 76 | Ni22 | 5.17 | 38.6 | 1.57 | 1.02 | Yes |
| Example 77 | Ni22 | 4.12 | 14.6 | 1.77 | 0.92 | No |
| Example 78 | Ni22 | 4.33 | 33.1 | 1.64 | 1.01 | Yes |

TABLE 5-continued

| No. | Complex | Polymerization Activity $10^6$ g · mol$^{-1}$(Ni) · h$^{-1}$ | Mw (×10$^4$) | PDI | Alcohol content (mol %) | Whether is there spherical and/or spherical-like polymer particles in the copolymer? |
|---|---|---|---|---|---|---|
| Example 79 | Ni23 | 2.12 | 18.3 | 1.67 | 0.99 | Yes |
| Example 80 | Ni23 | 2.07 | 16.4 | 1.70 | 1.02 | Yes |
| Example 81 | Ni21 | 2.76 | 18.3 | 1.65 | 1.11 | Yes |
| Example 82 | Ni21 | 3.12 | 21.6 | 1.66 | 1.12 | No |
| Example 83 | Ni21 | 3.04 | 19.6 | 1.65 | 1.15 | No |

It can be seen from Table 5 that when the catalyst of the present invention catalyzes the copolymerization of ethylene and an enol, it exhibits higher polymerization activity, and the resulting polymer has a higher molecular weight. The catalyst of the present invention can have a copolymerization activity of up to $5.17 \times 10^6$ g·mol$^{-i}$(Ni)·h$^{-1}$, and the molecular weight of the polymer can be adjusted in a wide range by the addition of a chain transfer agent. In addition, by adjusting the polymerization conditions, a copolymer product with good particle morphology can be obtained.

Example 84

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 7.6 mg (5 mol) of the complex Ni$_{21}$, 15 mmol (2.55 g) of 2,2-dimethyl-7-octenoic acid, 15 mL of AlEt$_3$ (1.0 mol/L solution in hexane), and 6.5 mL of MAO (1.53 mol/l solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 6 below.

Example 85

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 7.6 mg (5 mol) of the complex Ni$_{21}$, 30 mmol (5.10 g) of 2,2-dimethyl-7-octenoic acid, 30 mL of AlEt$_3$ (1.0 mol/L solution in hexane), and 6.5 mL of MAO (1.53 mol/l solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 6 below.

Example 86

Ethylene copolymerization was carried out according to the procedure described in Example 85, except that polymerization temperature was 60° C. The results are shown in Table 6 below.

Example 87

Ethylene copolymerization was carried out according to the procedure described in Example 85, except that 0.5 mL of diethylzinc (1 mol/L solution in hexane) was further added into the autoclave. The results are shown in Table 6 below.

Example 88

Ethylene copolymerization was carried out according to the procedure described in Example 85, except that 1.0 mL of diethylzinc (1 mol/L solution in hexane) was further added into the autoclave. The results are shown in Table 6 below.

Example 89

Ethylene copolymerization was carried out according to the procedure described in Example 84, except that 3.33 times quantity (50 mmol (8.51 g)) of 2,2-dimethyl-7-octenoic acid and 3.33 times quantity (50 mL) of AlEt$_3$ (1.0 mol/L solution in hexane) were used. The results are shown in Table 6 below.

Example 90

Ethylene copolymerization was carried out according to the procedure described in Example 84, except that 6.67 times quantity of 2,2-dimethyl-7-octenoic acid and 6.67 times quantity of AlEt$_3$ (1.0 mol/L solution in hexane) were used. The results are shown in Table 6 below.

Example 91

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.7 mg (5 mol) of the complex Ni$_{22}$, 30 mmol (5.10 g) of 2,2-dimethyl-7-octenoic acid, 30 mL of AlEt$_3$ (1.0 mol/L solution in hexane), and 6.5 mL of MAO (1.53 mol/l solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 6 below.

Example 92

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.7 mg (5 mol) of the complex Ni$_{22}$, 50 mmol (8.51 g) of 2,2-dimethyl-7- octenoic acid, 50 mL of AlEt$_3$ (1.0 mol/L solution in hexane), and 6.5 mL of MAO (1.53 mol/l solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 6 below.

Example 93

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.7 mg (5 mol) of the complex Ni$_{22}$, 30 mmol (4.69 g) of 2,2-dimethyl-6-heptenoic acid, 30 mL of AlEt$_3$ (1.0 mol/L solution in hexane), and 6.5 mL of MAO (1.53 mol/l solution in toluene) were added thereto. The reaction was stirred at 30° C. for 60 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 6 below.

Example 94

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.9 mg (5 mol) of the complex Ni$_{23}$, 30 mmol (5.10 g) of 2,2-dimethyl-7-octenoic acid, 30 mL of AlEt$_3$ (1.0 mol/L solution in hexane), and 6.5 mL of MAO (1.53 mol/l solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 6 below.

Example 95

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.9 mg (5 mol) of the complex Ni$_{23}$, 30 mmol (4.26 g) of 2-isopropyl-4-pentenoic acid, 30 mL of AlEt$_3$ (1.0 mol/L solution in hexane), and 6.5 mL of MAO (1.53 mol/l solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 6 below.

Example 96

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 7.6 mg (5 mol) of the complex Ni$_{21}$, 30 mmol (5.10 g) of 2,2-dimethyl-7-octenoic acid, and 30 mL of AlEt$_3$ (1.0 mol/L solution in hexane) were added thereto, followed by the addition of 15 mL of a solution of N,N-dimethylanilinium tetrakis(pentafluorophenyl)borate in toluene (1 mmol/L toluene solution). The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 6 below.

Example 97

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 7.6 mg (5 mol) of the complex Ni$_{21}$, 30 mmol (5.53 g) of 10-undecenoic acid, 30 mL of AlEt$_3$ (1.0 mol/L solution in hexane), and 6.5 mL of MAO (1.53 mol/l solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 6 below.

Example 98

After having been continuously dried at 130° C. for 6 hrs, a 1 L stainless steel polymerization autoclave equipped with mechanical stirring was evacuated while it was hot and then filled with N$_2$ gas 3 times. 500 mL of toluene was charged into the autoclave, and at the same time 7.6 mg (5 μmol) of the complex Ni$_2$, 30 mmol (5.10 g) of 2,2-dimethyl-7-octenoic acid, 30 mL of AlEt$_3$ (1.0 mol/L solution in hexane), and 6.5 mL of MAO (1.53 mol/l solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 6 below.

TABLE 6

| No. | Complex | Polymerization Activity $10^6$ g · mol$^{-1}$(Ni) · h$^{-1}$ | Mn (×$10^4$) | Comonomer content (mol %) | Whether is there spherical and/or spherical-like polymer particles in the copolymer? |
|---|---|---|---|---|---|
| Example 84 | Ni21 | 1.96 | 5.12 | 0.67 | Yes |
| Example 85 | Ni21 | 2.02 | 5.43 | 1.10 | Yes |
| Example 86 | Ni21 | 1.33 | 2.52 | 0.96 | No |
| Example 87 | Ni21 | 1.52 | 2.72 | 1.02 | Yes |
| Example 88 | Ni21 | 1.00 | 1.63 | 0.97 | Yes |
| Example 89 | Ni21 | 2.12 | 6.33 | 1.44 | Yes |

TABLE 6-continued

| No. | Complex | Polymerization Activity $10^6$ g· mol$^{-1}$(Ni)·h$^{-1}$ | Mn (×10$^4$) | Comonomer content (mol %) | Whether is there spherical and/or spherical-like polymer particles in the copolymer? |
|---|---|---|---|---|---|
| Example 90 | Ni21 | 1.23 | 5.10 | 2.72 | Yes |
| Example 91 | Ni22 | 4.52 | 14.7 | 1.13 | Yes |
| Example 92 | Ni22 | 4.17 | 8.6 | 0.93 | No |
| Example 93 | Ni22 | 4.07 | 13.3 | 1.13 | Yes |
| Example 94 | Ni23 | 2.32 | 9.3 | 1.07 | Yes |
| Example 95 | Ni23 | 1.21 | 5.4 | 0.96 | Yes |
| Example 96 | Ni21 | 1.97 | 5.36 | 1.09 | Yes |
| Example 97 | Ni21 | 2.07 | 5.53 | 1.11 | No |
| Example 98 | Ni21 | 2.04 | 5.36 | 1.10 | No |

It can be seen from Table 6 that when the catalyst of the present invention catalyzes the copolymerization of ethylene and an unsaturated carboxylic acid, it exhibits higher polymerization activity, and the resulting polymer has a higher molecular weight. The catalyst of the present invention can have a copolymerization activity of up to $4.52 \times 10^6$ g·mol$^{-1}$(Ni)·h$^{-1}$, and the molecular weight of the polymer can be adjusted in a wide range by the addition of a chain transfer agent. In addition, by adjusting the polymerization conditions, a copolymer product with good particle morphology can be obtained.

The following compounds, ligands and complexes are mentioned in the following examples:

Formula V

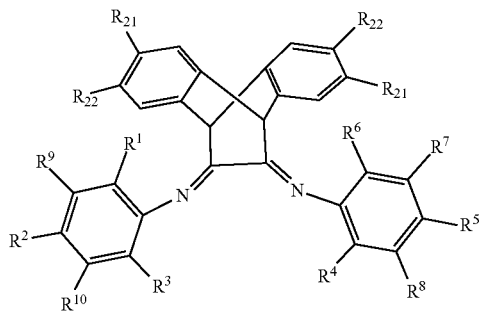

Formula V'

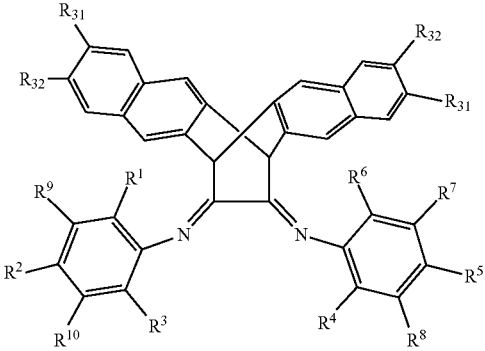

Diimine Compound A31: α-diimine compound represented by Formula V, wherein $R^1=R^3=R^4=R^6=CH_3$, $R^2=R^5=R^7=R^8=R^9=R^{10}=R_{21}=R_{22}=H$;

Diimine Compound A32: α-diimine compound represented by Formula V, wherein $R^1=R^3=R^4=R^6=i\text{-Pr}$, $R^2=R^5=R^7=R^8=R^9=R^{10}=R_{21}=R_{22}=H$;

Diimine Compound A33: α-diimine compound represented by Formula V', wherein $R^1=R^3=R^4=R^6=Me$, $R^2=R^5=R^7=R^8=R^9=R^{10}=R_{31}=R_{32}=H$;

Formula VI

Formula VI'

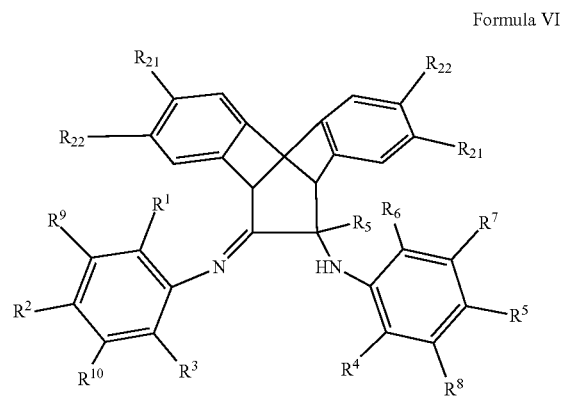

Ligand L31: amino-imine compound represented by Formula VI, wherein $R^1=R^3=R^4=R^6=CH_3$, $R^2=R^5=R^7=R^8=R^9=R^{10}=R_{21}=R_{22}=H$, $R_5=CH_3$;

Ligand L32: amino-imine compound represented by Formula VI, wherein $R^1=R^3=R^4=R^6=i\text{-Pr}$, $R^2=R^5=R^7=R^8=R^9=R^{10}=R_{21}=R_{22}=H$, $R_5=CH_3$;

Ligand L33: amino-imine compound represented by Formula VI, wherein $R^1=R^3=R^4=R^6=CH_3$, $R^2=R^5=R^7=R^8=R^9=R^{10}=R_{21}=R_{22}=H$, $R_5=Et$;

Ligand L34: amino-imine compound represented by Formula VI', wherein $R^1=R^3=R^4=R^6=Me$, $R^2=R^5=R^7=R^8=R^9=R^{10}=R_{31}=R_{32}=H$, $R_5=CH_3$;

Formula II

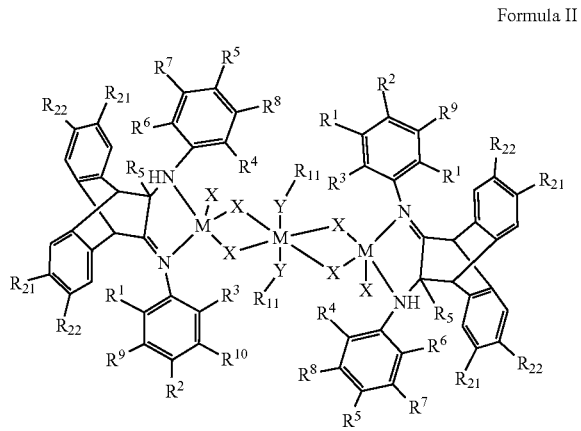

Complex Ni31: complex represented by Formula II, wherein $R^1=R^3=R^4=R^6=CH_3$, $R^2=R^5=R^7=R^8=R^9=R^{10}=R_{21}=R_{22}=H$, $R_5=CH_3$, $R_{11}=Et$, M=Ni, Y=O, X=Br;

Complex Ni32: complex represented by Formula II, wherein $R^1=R^3=R^4=R^6=iPr$, $R^2=R^5=R^7=R^8=R^9=R^{10}=R_{21}=R_{22}=H$; $R_5=CH_3$, $R_{11}=Et$, M=Ni, Y=O, X=Br;

Complex Ni33: complex represented by Formula II, wherein $R^1=R^3=R^4=R^6=iPr$, $R^2=R^5=R^7=R^8=R^9=R^{10}=R_{21}=R_{22}=H$; $R_5=CH_3$, $R_{11}=$isobutyl, M=Ni, Y=O, X=Br;

Complex Ni34: complex represented by Formula II, wherein $R^1=R^3=R^4=R^6=CH_3$, $R^2=R^5=R^7=R^8=R^9=R^{10}=R_{21}=R_{22}=H$; $R_5=Et$, $R_{11}=Et$, M=Ni, Y=O, X=Br;

Complex Ni35: complex represented by Formula II', wherein $R^1=R^3=R^4=R^6=CH_3$, $R^2=R^5=R^7=R^8=R^9=R^{10}=R_{31}=R_{32}=H$; $R_5=Me$, $R_1=Et$, M=Ni, Y=O, X=Br.

Example 99

1) Preparation of Ligand L31:

To a reaction flask were successively charged with 3.52 g (8 mmol) of α-diimine compound A1, 30 ml of toluene, and 1M trimethylaluminum (16 mL, 16 mmol), and the reaction mixture was refluxed for 8 hours. The reaction was terminated with sodium hydroxide/ice water, the reaction mixture was extracted with ethyl acetate, and organic phases were combined and dried over anhydrous magnesium sulfate. The product was separated by column chromatography with petroleum ether/ethyl acetate as an eluent to obtain ligand L31 as colorless crystals with a yield of 85.2%. $^1$HNMR δ(ppm) 7.23-6.88 (m, 14H), 4.84 (s, 1H), 4.73 (s, 1H), 3.85 (s, 1H, NH), 2.02 (s, 3H, $CH_3$), 1.87 (s, 6H, $CH_3$), 1.75 (s, 6H, $CH_3$).

2) Preparation of Complex Ni31:

10 mL solution of $(DME)NiBr_2$ (277 mg, 0.9 mmol) in ethanol was added dropwise to 10 mL solution of ligand L31 (274 mg, 0.6 mmol) in dichloromethane, and the resulting mixture was stirred at room temperature for 6 h, with precipitants being generated. After filtering, the filter cake was washed with diethyl ether and dried to afford red powdery solids in a yield of 74%. Elemental analysis (calculated for $C_{70}H_{74}Br_6N_4Ni_3O_2$): C, 50.68; H, 4.50; N, 3.38; experimental value (%): C, 50.53; H, 4.73; N, 3.21.

3) After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 8.3 mg (5 mol) of the complex Ni31, 15 mmol (2.5 mL) of 2-methyl-2-hydroxy-7-octene, 15 mL of $AlEt_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 7 below.

Example 100

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 8.3 mg (5 mol) of the complex Ni31, 30 mmol (5.1 mL) of 2-methyl-2-hydroxy-7-octene, 30 mL of $AlEt_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 7 below.

Example 101

Ethylene copolymerization was carried out according to the procedure described in Example 100, except that polymerization temperature was 60° C. The results are shown in Table 7 below.

Example 102

Ethylene copolymerization was carried out according to the procedure described in Example 100, except that 0.5 mL of diethylzinc (1 mol/L solution in hexane) was further added into the autoclave. The results are shown in Table 7 below.

Example 103

Ethylene copolymerization was carried out according to the procedure described in Example 100, except that 1.0 mL of diethylzinc (1 mol/L solution in hexane) was further added into the autoclave. The results are shown in Table 7 below.

Example 104

Ethylene copolymerization was carried out according to the procedure described in Example 99, except that 3.33 times quantity of 2-methyl-2-hydroxy-7-octene and 3.33 times quantity of AlEt₃ (1.0 mol/L solution in hexane) were used. The results are shown in Table 7 below.

Example 105

Ethylene copolymerization was carried out according to the procedure described in Example 99, except that 6.67 times quantity of 2-methyl-2-hydroxy-7-octene and 6.67 times quantity of AlEt₃ (1.0 mol/L solution in hexane) were used. The results are shown in Table 7 below.

Example 106

1) Preparation of Ligand L32:
To a reaction flask were successively charged with 4.42 g (8 mmol) of α-diimine compound A32, 30 ml of toluene, and 1M trimethylaluminum (16 mL, 16 mmol), and the reaction mixture was refluxed for 8 hours. The reaction was terminated with sodium hydroxide/ice water, the reaction mixture was extracted with ethyl acetate, and organic phases were combined and dried over anhydrous magnesium sulfate. The product was separated by column chromatography with petroleum ether/ethyl acetate as an eluent to obtain ligand L32 as colorless crystals in a yield of 76.2%. $^1$HNMR δ(ppm) 7.21-6.95 (m, 14H), 4.96 (s, 1H), 4.87 (s, 1H), 3.85 (s, 1H, NH), 2.51 (m, 4H, CH(CH₃)₂), 2.02 (s, 3H, CH₃), 1.18 (d, 3H, CH₃), 1.11 (d, 3H, CH₃), 1.05 (d, 6H, CH₃), 0.98 (d, 6H, CH₃), 0.60 (d, 6H, CH₃).

2) Preparation of Complex Ni32:
10 mL solution of (DME)NiBr₂ (277 mg, 0.9 mmol) in ethanol was added dropwise to 10 mL solution of ligand L2 (341 mg, 0.6 mmol) in dichloromethane, and the resulting mixture was stirred at room temperature for 6 h, with precipitants being generated. After filtering, the filter cake was washed with diethyl ether and dried to afford red powdery solids in a yield of 76%. Elemental analysis (calculated for C₈₆H₁₀₆Br₆N₄Ni3O₂): C, 54.85; H, 5.67; N, 2.97; experimental value (%): C, 54.61; H, 5.73; N, 3.14.

3) Polymerization:
After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the autoclave, and at the same time 9.4 mg (5 mol) of the complex Ni32, 30 mmol (5.1 mL) of 2-methyl-2-hydroxy-7-octene, 30 mL of AlEt₃ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 7 below.

Example 107

After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the autoclave, and at the same time 9.4 mg (5 mol) of the complex Ni32, 30 mmol (8.5 mL) of 2-methyl-2-hydroxy-7-octene, 30 mL of AlEt₃ (1.0 mol/L solution in hexane), and 6.5 mL of MAO (1.53 mol/1 solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 7 below.

Example 108

After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the autoclave, and at the same time 9.4 mg (5 mol) of the complex Ni32, 30 mmol (4.1 mL) of 3-methyl-5-hexen-3-ol, 30 mL of AlEt₃ (1.0 mol/L solution in hexane), and 6.5 mL of MAO (1.53 mol/1 solution in toluene) were added thereto. The reaction was stirred at 30° C. for 60 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 7 below.

Example 109

A solution of 277 mg (0.9 mmol) of (DME)NiBr₂ in 2-methyl-1-propanol (10 mL) was added slowly dropwise to a solution of 341 mg (0.6 mmol) of ligand L32 in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni33 as brownish-red powdery solids in a yield of 84.0%. FT-IR (KBr disc, cm⁻¹) 2969, 1677, 1628, 1462, 1342, 1109, 794, 760. Elemental analysis (calculated for C₉₀H₁₁₄Br₆N₄Ni₃O₂): C, 55.74; H, 5.92; N, 2.89; experimental value (%): C, 56.08; H, 6.12; N, 3.08.

After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the autoclave, and at the same time 9.7 mg (5 mol) of the complex Ni33, 30 mmol (5.1 mL) of 2-methyl-2-hydroxy-7-octene, 30 mL of AlEt₃ (1.0 mol/L solution in hexane), and 6.5 mL of MAO (1.53 mol/1 solution in toluene) were added thereto. The reaction was stirred at 30° C. for 60 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 7 below.

Example 110

1) Preparation of Ligand L33:
To a reaction flask were successively charged with 3.52 g (8 mmol) of α-diimine compound A31, 30 ml of diethyl ether, and 2M diethylzinc (4 mL, 8 mmol), and the reaction mixture was stirred at room temperature for 3 hours. The reaction was terminated with ice water, the reaction mixture was extracted with ethyl acetate, and organic phases were combined and dried over anhydrous magnesium sulfate. The product was separated by column chromatography with petroleum ether/ethyl acetate as an eluent to obtain ligand L33 as colorless crystals in a yield of 50.1%. $^1$HNMR δ(ppm) 7.22-6.86 (m, 14H), 4.82 (s, 1H), 4.73 (s, 1H), 3.85

(s, 1H, NH), 2.04 (m, 2H, CH$_2$CH$_3$), 1.89 (s, 6H, CH$_3$), 1.74 (s, 6H, CH$_3$), 0.89 (t, 3H, CH$_3$).

2) Preparation of Complex Ni34:

10 mL solution of (DME)NiBr$_2$ (277 mg, 0.9 mmol) in ethanol was added dropwise to 10 mL solution of ligand L3 (282 mg, 0.6 mmol) in dichloromethane, and the resulting mixture was stirred at room temperature for 6 h, with precipitants being generated. After filtering, the filter cake was washed with diethyl ether and dried to afford red powdery solids in a yield 73%. Elemental analysis (calculated for C$_{72}$H$_{78}$Br$_6$N$_4$Ni3O$_2$): C, 51.26; H, 4.66; N, 3.32; experimental value (%): C, 51.39; H, 4.93; N, 3.24.

3) After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.4 mg (5 mol) of the complex Ni34, 30 mmol (5.1 mL) of 2-methyl-2-hydroxy-7-octene, 30 mL of AlEt$_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 7 below.

Example 111

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.4 mg (5 mol) of the complex Ni34, 30 mmol (4.5 mL) of 4-methyl-1-heptene-4-ol, 30 mL of AlEt$_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 7 below.

Example 112

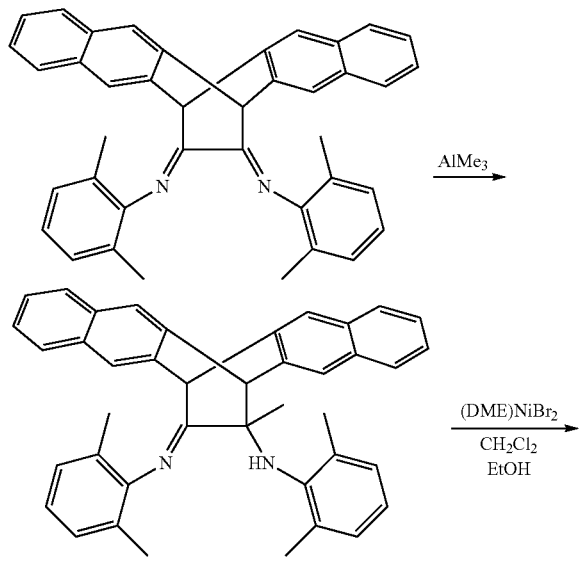

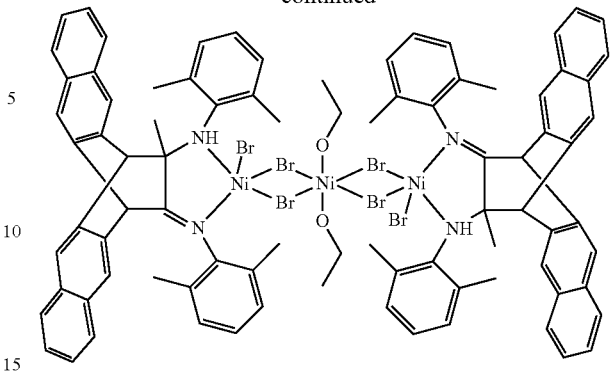

1) Preparation of Ligand L34:

To a reaction flask were successively charged with 4.32 g (8 mmol) of α-diimine compound A33, 30 ml of toluene, and 1M trimethylaluminum (16 mL, 16 mmol), and the reaction mixture was stirred at room temperature for 3 hours. The reaction was terminated with ice water, the reaction mixture was extracted with ethyl acetate, and organic phases were combined and dried over anhydrous magnesium sulfate. The product was separated by column chromatography with petroleum ether/ethyl acetate as an eluent to obtain ligand L34 as colorless crystals in a yield of 72.1%. $^1$HNMR δ(ppm) 7.68-7.54 (m, 8H), 7.37 (m, 4H), 7.11-7.04 (m, 6H), 5.16 (s, 1H), 5.08 (s, 1H), 4.05 (s, 1H, NH), 1.94 (s, 3H, CH$_3$), 1.89 (s, 6H, CH$_3$), 1.73 (s, 6H, CH$_3$).

2) Preparation of Complex Ni35:

10 mL solution of (DME)NiBr$_2$ (277 mg, 0.9 mmol) in ethanol was added dropwise to 10 mL solution of ligand L34 (334 mg, 0.6 mmol) in dichloromethane, and the resulting mixture was stirred at room temperature for 6 h, with precipitants being generated. After filtering, the filter cake was washed with diethyl ether and dried to afford red powdery solids in a yield of 72%. Elemental analysis (calculated for C$_{86}$H$_{82}$Br$_6$N$_4$Ni3O$_2$): C, 55.56; H, 4.45; N, 3.01; experimental value (%): C, 55.74; H, 4.73; N, 3.14.

3) Polymerization:

After having been continuously dried at 130° C. for 6 hrs, a 1 L stainless steel polymerization autoclave equipped with mechanical stirring was evacuated while it was hot and then filled with N$_2$ gas 3 times. 9.3 mg (5 μmol) of the complex Ni35 was added thereto, followed by evacuating and filling with ethylene to perform replacement 3 times. 500 mL of hexane, 30 mmol (5.1 mL) of 2-methyl-2-hydroxy-7-octene, and 30 mL of AlEt$_3$ (1.0 mol/L solution in hexane) were charged into the autoclave, followed by the addition of 6.5 mL of methylaluminoxane (MAO) (1.53 mol/1 solution in toluene). The reaction was vigorously stirred at 60° C. for 30 minutes, with ethylene pressure being maintained at 10 atm. The reaction mixture was finally neutralized with an ethanol solution acidified with 10 wt % hydrochloric acid to obtain a polymer. The results are shown in Table 7 below.

Example 113

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.3 mg (5 mol) of the complex Ni31, 30 mmol (5.1 mL) of 2-methyl-2-hydroxy-7-octene, and 30 mL of AlEt$_3$ (1.0 mol/L solution in hexane) were added thereto, followed by the addition of 15 mL of a solution of N,N-dimethylanilinium tetrakis(pentafluorophenyl)borate in toluene (1 mmol/L toluene solution). The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 7 below.

Example 114

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 8.3 mg (5 mol) of the complex Ni31, 30 mmol (6.0 mL) of 10-undecen-1-ol, 30 mL of $AlEt_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 7 below.

Example 115

After having been continuously dried at 130° C. for 6 hrs, a 1 L stainless steel polymerization autoclave equipped with mechanical stirring was evacuated while it was hot and then filled with $N_2$ gas 3 times. 500 mL of toluene was charged into the autoclave, and at the same time 8.3 mg (5 µmol) of the complex Ni31, 30 mmol (5.1 mL) of 2-methyl-2-hydroxy-7-octene, 30 mL of $AlEt_3$ (1.0 mol/L solution in hexane), and 6.5 mL of MAO (1.53 mol/solution in toluene) were added thereto. The reaction was stirred at 30° C. for 30 minutes, with ethylene pressure being maintained at 10 atm. The reaction mixture was finally neutralized with an ethanol solution acidified with 10 wt hydrochloric acid to obtain a polymer. The polymerization activity and polymer performance parameters are shown in Table 7 below.

It can be seen from Table 7 that when the catalyst of the present invention catalyzes the copolymerization of ethylene and an enol, it exhibits higher polymerization activity, and the resulting polymer has a higher molecular weight. The catalyst of the present invention can have a copolymerization activity of up to $5.27 \times 10^5$ g·mol$^{-1}$(Ni)·h$^{-1}$, and the molecular weight of the polymer can be adjusted in a wide range by the addition of a chain transfer agent. In addition, by adjusting the polymerization conditions, a copolymer product with good particle morphology can be obtained.

Example 116

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 8.3 mg (5 mol) of the complex Ni31, 15 mmol (2.55 g) of 2,2-dimethyl-7-octenoic acid, 15 mL of $AlEt_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 8 below.

Example 117

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the autoclave, and at the same time 8.3 mg (5 mol) of the complex Ni31, 30 mmol (5.10 g) of 2,2-dimethyl-7-octenoic acid, 30 mL of $AlEt_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid

TABLE 7

| No. | Complex | Polymerization Activity $10^5$ g · mol$^{-1}$(Ni) · h$^{-1}$ | Mw (×10$^4$) | PDI | Alcohol content (mol %) | Whether is there spherical and/or spherical-like polymer particles in the copolymer? |
|---|---|---|---|---|---|---|
| Example 99 | Ni31 | 3.66 | 15.7 | 1.54 | 0.78 | Yes |
| Example 100 | Ni31 | 3.89 | 16.8 | 1.42 | 1.13 | Yes |
| Example 101 | Ni31 | 2.12 | 10.1 | 1.96 | 0.98 | No |
| Example 102 | Ni31 | 3.12 | 11.7 | 1.24 | 1.09 | Yes |
| Example 103 | Ni31 | 2.37 | 6.9 | 1.23 | 1.06 | Yes |
| Example 104 | Ni31 | 4.04 | 18.9 | 1.32 | 1.43 | Yes |
| Example 105 | Ni31 | 3.10 | 14.8 | 1.40 | 2.16 | Yes |
| Example 106 | Ni32 | 5.27 | 50.4 | 1.25 | 1.02 | Yes |
| Example 107 | Ni32 | 3.96 | 25.7 | 2.02 | 0.96 | No |
| Example 108 | Ni32 | 4.88 | 49.2 | 1.21 | 1.02 | Yes |
| Example 109 | Ni33 | 4.16 | 41.7 | 1.23 | 1.01 | Yes |
| Example 110 | Ni34 | 2.02 | 13.4 | 1.40 | 1.10 | Yes |
| Example 111 | Ni34 | 2.04 | 12.7 | 1.42 | 1.11 | Yes |
| Example 112 | Ni35 | 4.46 | 18.7 | 1.38 | 1.19 | Yes |
| Example 113 | Ni31 | 3.64 | 15.7 | 1.45 | 1.13 | Yes |
| Example 114 | Ni31 | 3.84 | 18.7 | 1.37 | 1.16 | No |
| Example 115 | Ni31 | 3.91 | 16.7 | 1.40 | 1.14 | No |

Example 118

Ethylene copolymerization was carried out according to the procedure described in Example 117, except that polymerization temperature was 60° C. The results are shown in Table 8 below.

Example 119

Ethylene copolymerization was carried out according to the procedure described in Example 117, except that 0.5 mL of diethylzinc (1 mol/L solution in hexane) was further added into the autoclave. The results are shown in Table 8 below.

Example 120

Ethylene copolymerization was carried out according to the procedure described in Example 117, except that 1.0 mL of diethylzinc (1 mol/L solution in hexane) was further added into the autoclave. The results are shown in Table 8 below.

Example 121

Ethylene copolymerization was carried out according to the procedure described in Example 116, except that 3.33 times quantity (50 mmol (8.51 g)) of 2,2-dimethyl-7-octenoic acid and 3.33 times quantity (50 mL) of AlEt$_3$ (1.0 mol/L solution in hexane) were used. The results are shown in Table 8 below.

Example 122

Ethylene copolymerization was carried out according to the procedure described in Example 116, except that 6.67 times quantity of 2,2-dimethyl-7-octenoic acid and 6.67 times quantity of AlEt$_3$ (1.0 mol/L solution in hexane) were used. The results are shown in Table 8 below.

Example 123

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 9.4 mg (5 mol) of the complex Ni32, 30 mmol (5.10 g) of 2,2-dimethyl-7-octenoic acid, 30 mL of AlEt$_3$ (1.0 mol/L solution in hexane), and 6.5 mL of MAO (1.53 mol/l solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 8 below.

Example 124

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 9.4 mg (5 mol) of the complex Ni32, 50 mmol (8.51 g) of 2,2-dimethyl-7-octenoic acid, 50 mL of AlEt$_3$ (1.0 mol/L solution in hexane), and 6.5 mL of MAO (1.53 mol/1 solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 8 below.

Example 125

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 9.4 mg (5 mol) of the complex Ni32, 30 mmol (4.69 g) of 2,2-dimethyl-6-heptenoic acid, 30 mL of AlEt$_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 8 below.

Example 126

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 9.7 mg (5 mol) of the complex Ni33, 30 mmol (5.10 g) of 2,2-dimethyl-7-octenoic acid, 30 mL of AlEt$_3$ (1.0 mol/L solution in hexane), and 6.5 mL of MAO (1.53 mol/1 solution in toluene) were added thereto. The reaction was stirred at 30° C. for 60 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 8 below.

Example 127

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.4 mg (5 mol) of the complex Ni34, 30 mmol (5.10 g) of 2,2-dimethyl-7-octenoic acid, 30 mL of AlEt$_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 8 below.

Example 128

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.4 mg (5 mol) of the complex Ni34, 30 mmol (4.26 g) of 2-isopropyl-4-pentenoic acid, 30 mL of AlEt$_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 8 below.

Example 129

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 9.3 mg (5 mol) of the complex Ni35, 30 mmol (5.10 g) of 2,2-dimethyl-7-octenoic acid, 30 mL of AlEt$_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 8 below.

Example 130

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.3 mg (5 mol) of the complex Ni31, 30 mmol (5.10 g) of 2,2-dimethyl-7-octenoic acid, 30 mL of AlEt$_3$ (1.0 mol/L solution in hexane), and 15 mL of a solution of N,N-dimethylanilinium tetrakis(pentafluorophenyl)borate in toluene (1 mmol/L toluene solution) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 8 below.

Example 131

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the autoclave, and at the same time 8.3 mg (5 mol) of the complex Ni31, 30 mmol (5.53 g) of 10-undecenoic acid, 30 mL of AlEt$_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 8 below.

Example 132

After having been continuously dried at 130° C. for 6 hrs, a 1 L stainless steel polymerization autoclave equipped with mechanical stirring was evacuated while it was hot and then filled with N$_2$ gas 3 times. 500 mL of toluene was charged into the autoclave, and at the same time 8.3 mg (5 mol) of the complex Ni31, 30 mmol (5.10 g) of 2,2-dimethyl-7-octenoic acid, 30 mL of AlEt$_3$ (1.0 mol/L solution in hexane), and 6.5 mL of MAO (1.53 mol/1 solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 8 below.

TABLE 8

| No. | Complex | Polymerization Activity $10^5$ g · mol$^{-1}$(Ni) · h$^{-1}$ | Mn (×10$^4$) | Comonomer content (mol %) | Whether is there spherical and/or spherical-like polymer particles in the copolymer? |
|---|---|---|---|---|---|
| Example 116 | Ni31 | 2.67 | 6.73 | 0.72 | Yes |
| Example 117 | Ni31 | 3.08 | 7.13 | 1.16 | Yes |
| Example 118 | Ni31 | 2.71 | 4.64 | 1.03 | No |
| Example 119 | Ni31 | 2.52 | 5.37 | 1.09 | Yes |
| Example 120 | Ni31 | 1.73 | 2.86 | 1.04 | Yes |
| Example 121 | Ni31 | 3.32 | 7.70 | 1.44 | Yes |
| Example 122 | Ni31 | 2.44 | 6.21 | 2.38 | Yes |
| Example 123 | Ni32 | 4.64 | 17.26 | 1.02 | Yes |
| Example 124 | Ni32 | 3.27 | 12.38 | 0.98 | No |
| Example 125 | Ni32 | 4.41 | 15.82 | 1.03 | Yes |
| Example 126 | Ni33 | 4.07 | 13.24 | 1.01 | Yes |
| Example 127 | Ni34 | 2.42 | 4.67 | 1.02 | Yes |
| Example 128 | Ni34 | 2.13 | 4.24 | 1.03 | Yes |
| Example 129 | Ni35 | 3.68 | 7.96 | 1.21 | Yes |
| Example 130 | Ni31 | 3.01 | 7.02 | 1.14 | Yes |
| Example 131 | Ni31 | 3.02 | 7.14 | 1.15 | No |
| Example 132 | Ni31 | 3.09 | 7.04 | 1.15 | No |

It can be seen from Table 8 that when the catalyst of the present invention catalyzes the copolymerization of ethylene and an unsaturated carboxylic acid, it exhibits higher polymerization activity, and the resulting polymer has a higher molecular weight. The catalyst of the present invention can have a copolymerization activity of up to 4.64×10$^5$ g·mol$^-$(Ni)·h$^{-1}$, and the molecular weight of the polymer can be adjusted in a wide range by the addition of a chain transfer agent. In addition, by adjusting the polymerization conditions, a copolymer product with good particle morphology can be obtained.

It should be noted that the above-described examples are only used to illustrate the present invention and do not constitute any limitation to the present invention. The present invention has been described with reference to typical examples, but it should be understood that the words used therein are descriptive and explanatory words, rather than restrictive words. The present invention may be modified within the scope of the claims of the present invention as stipulated, and the present invention may be revised without departing from the scope and spirit of the present invention.

Although the present invention described therein relates to specific methods, materials and embodiments, it does not mean that the present invention is limited to the specific examples disclosed therein. On the contrary, the present invention can be extended to all other methods and applications with the same function.

We claim:

1. A method for preparing an olefin-polar monomer copolymer, comprising copolymerizing an olefin and a polar monomer in the presence of a catalyst and optionally a chain transfer agent to produce the olefin-polar monomer copolymer, wherein, the catalyst comprises a main catalyst and optionally a cocatalyst, the main catalyst comprises a diimine-metal complex represented by Formula I:

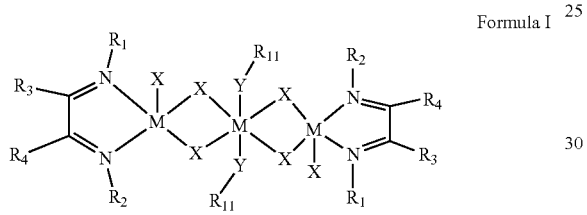

Formula I wherein, $R_1$ and $R_2$ are each independently a C1-C30 hydrocarbyl with or without a substituent Q; $R_3$ and $R_4$ are each independently selected from the group consisting of hydrogen, halogen, hydroxy, C1-C20 hydrocarbyl with or without a substituent Q, and adjacent $R_3$ and $R_4$ groups are optionally joined to form a ring or ring system; each $R_{11}$ is independently a C1-C20 hydrocarbyl with or without a substituent Q; each Y is independently a Group VIA non-metal atom; each M is independently a Group VIII metal; each X is independently selected from the group consisting of halogen, C1-C10 hydrocarbyl with or without a substituent Q and C1-C10 hydrocarbyloxy with or without a substituent Q, or the main catalyst comprises an amino-imine metal complex represented by Formula I':

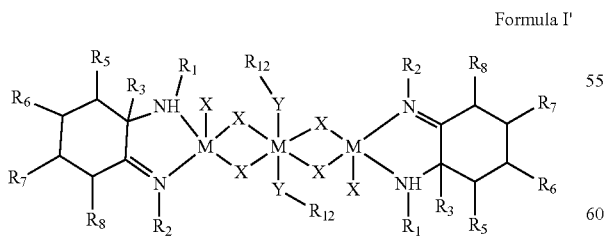

Formula I' wherein, $R_1$ and $R_2$ are each independently a C1-C30 hydrocarbyl with or without a substituent Q; each $R_3$ is independently selected from the group consisting of hydrogen and C1-C20 hydrocarbyl with or without a substituent Q; $R_5$ to $R_8$ are each independently selected from the group consisting of hydrogen, halogen, hydroxy, and C1-C20 hydrocarbyl with or without a substituent Q, and $R_5$ to $R_8$ groups are optionally joined to form a ring or ring system; each $R_{12}$ is independently a C1-C20 hydrocarbyl with or without a substituent Q; each Y is independently a Group VIA non-metal atom; each M is independently a Group VIII metal; each X is independently selected from the group consisting of halogen, C1-C10 hydrocarbyl with or without a substituent Q and C1-C10 hydrocarbyloxy with or without a substituent Q, wherein each substituent Q in the diimine-metal complex or in the amino-imine metal complex is independently selected from the group consisting of halogen, hydroxy, C1-C10 alkyl, halogenated C1-C10 alkyl, C1-C10 alkoxy and halogenated C1-C10 alkoxy, wherein the olefin is an olefin having 2 to 16 carbon atoms, and wherein the polar monomer is one or more of olefinic alcohols represented by Formula G:

Formula G wherein, $L_1$-$L_3$ are each independently selected from the group consisting of H and C1-C30 alkyl with or without a substituent, $L_4$ is a C1-C30 alkylene optionally having a pendant group, or alternatively, the polar monomer is an unsaturated carboxylic acid represented by Formula G':

Formula G' wherein, $L_1$-$L_3$ are each independently selected from the group consisting of H and C1-C30 alkyl with or without a substituent, $L_4$ is a C1-C30 alkylene having a pendant group.

2. The method as claimed in claim 1, wherein:
the main catalyst comprises a diimine metal complex represented by Formula Ib:

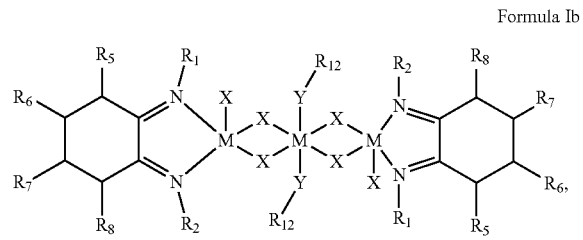

Formula Ib wherein, $R_1$ and $R_2$ are each independently a C1-C30 hydrocarbyl with or without the substituent Q; $R_5$-$R_8$ are each independently selected from the group consisting of hydrogen, halogen, hydroxy, C1-C20 hydrocarbyl with or without the substituent Q, and $R_5$-$R_8$ are optionally joined to form a ring or ring system; each $R_{12}$ is independently a C1-C20 hydrocarbyl with or without the substituent Q; each Y is independently a Group VIA nonmetal atom; each M is independently a Group VIII metal; and each X is independently selected from the group consisting of halogen, C1-C10 hydrocarbyl with or without the substituent Q and C1-C10 hydrocarbyloxy with or without the substituent Q.

3. The method as claimed in claim 2, having at least one feature selected from:
   $R_1$ and $R_2$ are independently selected from the group consisting of C1-C20 alkyl with or without the substituent Q and C6-C20 aryl with or without the substituent Q;
   each M is independently selected from the group consisting of nickel and palladium;
   each Y is independently selected from the group consisting of O and S;
   each X is independently selected from the group consisting of halogen, C1-C10 alkyl with or without the substituent Q, and C1-C10 alkoxy with or without the substituent Q;
   each $R_{12}$ is independently a C1-C20 alkyl with or without the substituent Q; and
   the substituent Q is selected from the group consisting of halogen, hydroxy, C1-C6 alkyl, halogenated C1-C6 alkyl, C1-C6 alkoxy and halogenated C1-C6 alkoxy.

4. The method as claimed in claim 2, wherein the diimine metal complex is represented by Formula IIIb:

Formula IIIb

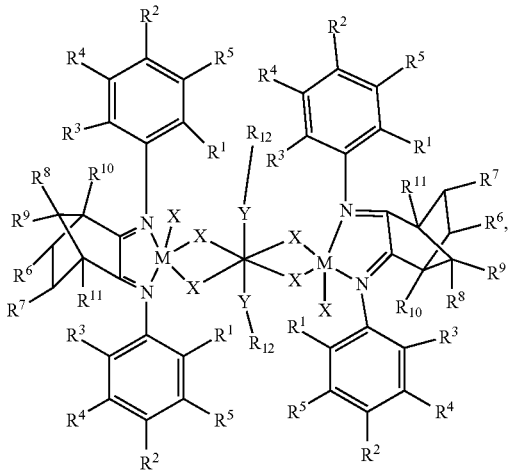

wherein, $R^1$-$R^{11}$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C6-C20 aryloxy with or without the substituent Q, C7-C20 aralkyl with or without the substituent Q, C7-C20 aralkoxy with or without the substituent Q, C7-C20 alkaryl with or without the substituent Q and C7-C20 alkaryloxy with or without the substituent Q, and
   M, X, Y and $R_{12}$ are as defined in claim 2.

5. The method as claimed in claim 2, wherein in the diimine metal complex, $R^1$-$R^{11}$ are each independently selected from the group consisting of hydrogen, halogen, hydroxy, C1-C10 alkyl with or without the substituent Q, C2-C10 alkenyl with or without the substituent Q, C2-C10 alkynyl with or without the substituent Q, C1-C10 alkoxy with or without the substituent Q, C2-C10 alkenoxy with or without the substituent Q, C2-C10 alkynoxy with or without the substituent Q, C6-C15 aryl with or without the substituent Q, C6-C15 aryloxy with or without the substituent Q, C7-C15 aralkyl with or without the substituent Q, C7-C15 aralkoxy with or without the substituent Q, C7-C15 alkaryl with or without the substituent Q and C7-C15 alkaryloxy with or without the substituent Q.

6. The method as claimed in claim 5, wherein the diimine metal complex is selected from the group consisting of:
   1) The diimine metal complex represented by Formula IIIb, wherein $R^1$=$R^3$=methyl, $R^2$=$R^4$-$R^7$=$R^{10}$=H, $R^8$=$R^9$=$R^{11}$=methyl, $R_{12}$=ethyl, M=Ni, Y=O, X=Br;
   2) The diimine metal complex represented by Formula IIIb, wherein $R^1$=$R^3$=ethyl, $R^2$=$R^4$-$R^7$=$R^{10}$=H, $R^8$=$R^9$=$R^{11}$=methyl, $R_{12}$=ethyl, M=Ni, Y=O, X=Br;
   3) The diimine metal complex represented by Formula IIIb, wherein $R^1$=$R^3$=isopropyl, $R^2$=$R^4$-$R^7$=$R^{10}$=H, $R^8$=$R^9$=$R^{11}$=methyl, $R_{12}$=ethyl, M=Ni, Y=O, X=Br;
   4) The diimine metal complex represented by Formula IIIb, wherein $R^1$-$R^3$=methyl, $R^4$-$R^7$=$R^{10}$=H, $R^8$=$R^9$=$R^{11}$=methyl, $R_{12}$=ethyl, M=Ni, Y=O, X=Br;
   5) The diimine metal complex represented by Formula IIIb, wherein $R^1$=$R^3$=methyl, $R^2$=Br, $R^4$ $R^7$=$R^{10}$=H, $R^8$=$R^9$=$R^{11}$=methyl, $R_{12}$=ethyl, M=Ni, Y=O, X=Br;
   6) The diimine metal complex represented by Formula IIIb, wherein $R^1$=$R^3$=F, $R^2$=$R^4$-$R^7$=$R^{10}$=H, $R^8$=$R^9$=$R^{11}$=methyl, $R_{12}$=ethyl, M=Ni, Y=O, X=Br;
   7) The diimine metal complex represented by Formula IIIb, wherein $R^1$=$R^3$=Cl, $R^2$=$R^4$-$R^7$=$R^{10}$=H, $R^8$=$R^9$=$R^{11}$=methyl, $R_{12}$=ethyl, M=Ni, Y=O, X=Br;
   8) The diimine metal complex represented by Formula IIIb, wherein $R^1$=$R^3$=Br, $R^2$=$R^4$-$R^7$=$R^{10}$=H, $R^8$=$R^9$=$R^{11}$=methyl, $R_{12}$=ethyl, M=Ni, Y=O, X=Br;
   9) The diimine metal complex represented by Formula IIIb, wherein $R^1$=$R^3$=methyl, $R^2$=$R^4$-$R^7$=$R^{10}$=H, $R^8$=$R^9$=$R^{11}$=methyl, $R_{12}$=isobutyl, M=Ni, Y=O, X=Br;
   10) The diimine metal complex represented by Formula IIIb, wherein $R^1$=$R^3$=ethyl, $R^2$=$R^4$-$R^7$=$R^{10}$=H, $R^8$=$R^9$=$R^{11}$=methyl, $R_{12}$=isobutyl, M=Ni, Y=O, X=Br;
   11) The diimine metal complex represented by Formula IIIb, wherein $R^1$=$R^3$=isopropyl, $R^2$=$R^4$-$R^7$=$R^{10}$=H, $R^8$=$R^9$=$R^{11}$=methyl, $R_{12}$=isobutyl, M=Ni, Y=O, X=Br;
   12) The diimine metal complex represented by Formula IIIb, wherein $R^1$-$R^3$=methyl, $R^4$-$R^7$=$R^{10}$=H, $R^8$=$R^9$=$R^{11}$=methyl, $R_{12}$=isobutyl, M=Ni, Y=O, X=Br;
   13) The diimine metal complex represented by Formula IIIb, wherein $R^1$-$R^3$=methyl, $R^2$=Br, $R^4$-$R^7$=$R^{10}$=H, $R^8$=$R^9$=$R^{11}$=methyl, $R_{12}$=isobutyl, M=Ni, Y=O, X=Br;

14) The diimine metal complex represented by Formula IIIb, wherein $R^1=R^3=F$, $R^2=R^4-R^7=R^{10}=H$, $R^8=R^9=R^{11}=$methyl, $R_{12}=$isobutyl, M=Ni, Y=O, X=Br;

15) The diimine metal complex represented by Formula IIIb, wherein $R^1=R^3=Cl$, $R^2=R^4-R^7=R^{10}=H$, $R^8=R^9=R^{11}=$methyl, $R_{12}=$isobutyl, M=Ni, Y=O, X=Br;

16) The diimine metal complex represented by Formula IIIb, wherein $R^1=R^3=Br$, $R^2=R^4-R^7=R^{10}=H$, $R^8=R^9=R^{11}=$methyl, $R_{12}=$isobutyl, M=Ni, Y=O, X=Br;

17) The diimine metal complex represented by Formula IIIb, wherein $R^1=R^3=$methyl, $R^2=R^4-R^7=R^{10}=H$, $R^8=R^9=$methyl, $R^{11}=$bromomethyl, $R_{12}=$ethyl, M=Ni, Y=O, X=Br;

18) The diimine metal complex represented by Formula IIIb, wherein $R^1=R^3=$ethyl, $R^2=R^4-R^7=R^{10}=H$, $R^8=R^9=$methyl, $R^{11}=$bromomethyl, $R_{12}=$ethyl, M=Ni, Y=O, X=Br;

19) The diimine metal complex represented by Formula IIIb, wherein $R^1=R^3=$isopropyl, $R^2=R^4-R^7=R^{10}=H$, $R^8=R^9=$methyl, $R^{11}=$bromomethyl, $R_{12}=$ethyl, M=Ni, Y=O, X=Br;

20) The diimine metal complex represented by Formula IIIb, wherein $R^1=R^3=$methyl, $R^4-R^7=R^{10}=H$, $R^8=R^9=$methyl, $R^{11}=$bromomethyl, $R_{12}=$ethyl, M=Ni, Y=O, X=Br;

21) the diimine metal complex represented by Formula IIIb, wherein $R^1=R^3=$methyl, $R^2=Br$, $R^4-R^7=R^{10}=H$, $R^8=R^9=$methyl, $R^{11}=$bromomethyl, $R_{12}=$ethyl, M=Ni, Y=O, X=Br;

22) The diimine metal complex represented by Formula IIIb, wherein $R^1=R^3=F$, $R^2-R^4-R^7=R^{10}=H$, $R^8=R^9=$methyl, $R^{11}=$bromomethyl, $R_{12}=$ethyl, M=Ni, Y=O, X=Br;

23) the diimine metal complex represented by Formula IIIb, wherein $R^1=R^3=Cl$, $R^2=R^4-R^7=R^{10}=H$, $R^8=R^9=$methyl, $R^{11}=$bromomethyl, $R_{12}=$ethyl, M=Ni, Y=O, X=Br; and 24) the diimine metal complex represented by Formula IIIb, wherein $R^1=R^3=Br$, $R^2=R^4-R^7=R^{10}=H$, $R^8=R^9=$methyl, $R^{11}=$bromomethyl, $R_{12}=$ethyl, M=Ni, Y=O, X=Br.

7. The method as claimed in claim 1, wherein:
the main catalyst comprises a diimine metal complex represented by Formula Ic:

Formula Ic

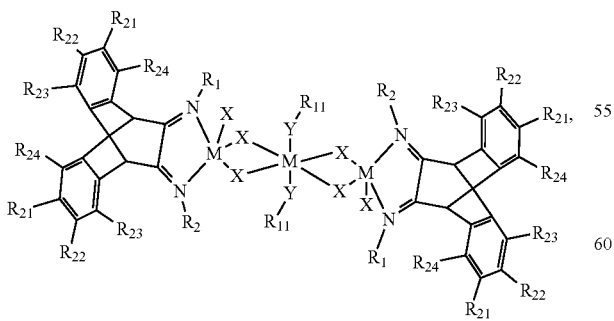

wherein, $R_{21}-R_{24}$ are each independently selected from the group consisting of hydrogen, halogen, hydroxy, C1-C20 hydrocarbyl with or without the substituent Q and C1-C20 hydrocarbyloxy with or without the substituent Q, and $R_{21}-R_{24}$ are optionally joined to form a ring or ring system.

8. The method as claimed in claim 7, having at least one feature selected from:
$R_1$ and $R_2$ are independently selected from the group consisting of C1-C20 alkyl with or without the substituent Q and C6-C20 aryl with or without the substituent Q;
each M is independently selected from the group consisting of nickel and palladium;
each Y is independently selected from the group consisting of O and S;
each X is independently selected from the group consisting of halogen, C1-C10 alkyl with or without the substituent Q and C1-C10 alkoxy with or without the substituent Q;
each $R_{11}$ is independently a C1-C20 alkyl with or without the substituent Q; and
the substituent Q is selected from the group consisting of halogen, hydroxy, C1-C6 alkyl, halogenated C1-C6 alkyl, C1-C6 alkoxy and halogenated C1-C6 alkoxy.

9. The method as claimed in claim 7, wherein the diimine metal complex has a structure represented by Formula IIIc:

Formula IIIc

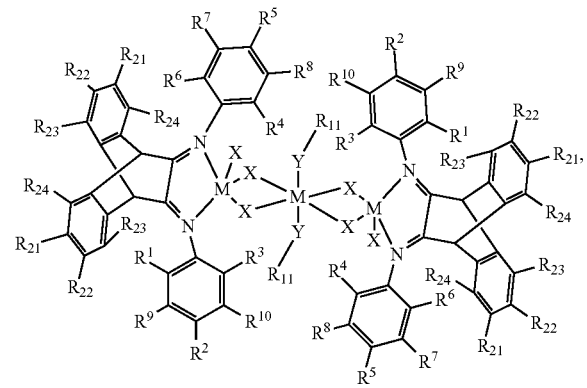

wherein, $R^1-R^{10}$, $R_{21}-R_{24}$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C6-C20 aryloxy with or without the substituent Q, C7-C20 aralkyl with or without the substituent Q, C7-C20 aralkoxy with or without the substituent Q, C7-C20 alkaryl with or without the substituent Q and C7-C20 alkaryloxy with or without the substituent Q, and $R^1-R^{10}$ are optionally joined to form a ring or ring system, $R_{21}-R_{24}$ are optionally joined to form a ring or ring system; and
$R_{11}$, Y, M and X are as defined in claim 7.

10. The method as claimed in claim 7, wherein in the diimine metal complex, $R^1-R^{10}$, $R_{21}-R_{24}$ are each independently selected from the group consisting of hydrogen, halogen, hydroxy, C1-C10 alkyl with or without the substituent Q, C2-C10 alkenyl with or without the substituent Q, C2-C10 alkynyl with or without the substituent Q, C1-C10 alkoxy with or without the substituent Q, C2-C10 alkenoxy with or without the substituent Q, C2-C10 alkynoxy with or without the substituent Q, C6-C15 aryl with or without the substituent Q, C6-C15 aryloxy with or without the substituent Q, C7-C15 aralkyl with or without the substituent Q C7-C15 aralkoxy with or without the substituent Q, C7-C15 alkaryl with or without the substituent Q and C7-C15 alkaryloxy with or without the substituent Q.

11. The method as claimed in claim 9, wherein the diimine metal complex is selected from the group consisting of:

1) The complex represented by Formula IIIc, wherein $R^1=R^3=R^4=R^6=$isopropyl, $R^2=R^5=R^7-R^{10}=R_{21}=R_{22}=R_{23}=R_{24}=$H, $R_{11}=$ethyl, M=Ni, Y=O, X=Br;

2) The complex represented by Formula IIIc, wherein $R^1=R^3=R^4=R^6=$ethyl, $R^2=R^5=R^7-R^{10}=R_{21}=R_{22}=R_{23}=R_{24}=$H, $R_{11}=$ethyl, M=Ni, Y=O, X=Br;

3) The complex represented by Formula IIIc, wherein $R^1=R^3=R^4=R^6=$methyl, $R^2=R^5=R^7-R^{10}=R_{21}=R_{22}=R_{23}=R_{24}=$H, $R_{11}=$ethyl, M=Ni, Y=O, X=Br;

4) The complex represented by Formula IIIc, wherein $R^1-R^6=$methyl, $R^7-R^{10}=R_{21}=R_{22}=R_{23}=R_{24}=$H, $R_{11}=$ethyl, M=Ni, Y=O, X=Br;

5) The complex represented by Formula IIIc, wherein $R^1=R^3=R^4=R^6=$Br, $R^2=R^5=R^7-R^{10}=R_{21}=R_{22}=R_{23}=R_{24}=$H, $R_{11}=$ethyl, M=Ni, Y=O, X=Br;

6) The complex represented by Formula IIIc, wherein $R^1=R^3=R^4=R^6=$Cl, $R^2=R^5=R^7-R^{10}=R_{21}=R_{22}=R_{23}=R_{24}=$H, $R_{11}=$ethyl, M=Ni, Y=O, X=Br;

7) The complex represented by Formula IIIc, wherein $R^1=R^3=R^4=R^6=$F, $R^2=R^5=R^7-R^{10}=R_{21}=R_{22}=R_{23}=R_{24}=$H, $R_{11}=$ethyl, M=Ni, Y=O, X=Br;

8) The complex represented by Formula IIIc, wherein $R^1=R^3=R^4=R^6=$isopropyl, $R^2=R^5=R^7-R^{10}=R_{21}=R_{22}=R_{23}=R_{24}=$H, $R_{11}=$isobutyl, M=Ni, Y=O, X=Br;

9) The complex represented by Formula IIIc, wherein $R^1=R^3=R^4=R^6=$ethyl, $R^2=R^5=R^7-R^{10}=R_{21}=R_{22}=R_{23}=R_{24}=$H, $R_{11}=$isobutyl, M=Ni, Y=O, X=Br;

10) The complex represented by Formula IIIc, wherein $R^1=R^3=R^4=R^6=$methyl, $R^2=R^5=R^7-R^{10}=R_{21}=R_{22}=R_{23}-R_{24}=$H, $R_{11}=$isobutyl, M=Ni, Y=O, X=Br;

11) The complex represented by Formula IIIc, wherein $R^1-R^6=$methyl, $R^7-R^{10}=R_{21}=R_{22}=R_{23}=R_{24}=$H, $R_{11}=$isobutyl, M=Ni, Y=O, X=Br;

12) The complex represented by Formula IIIc, wherein $R^1=R^3=R^4=R^6=$Br, $R^2=R^5=R^7-R^{10}=R_{21}=R_{22}=R_{23}=R_{24}=$H, $R_{11}=$isobutyl, M=Ni, Y=O, X=Br;

13) The complex represented by Formula IIIc, wherein $R^1=R^3=R^4=R^6=$Cl, $R^2=R^5=R^7-R^{10}=R_{21}=R_{22}=R_{23}=R_{24}=$H, $R_{11}=$isobutyl, M=Ni, Y=O, X=Br;

14) The complex represented by Formula IIIc, wherein $R^1=R^3=R^4=R^6=$F, $R^2=R^5=R^7-R^{10}=R_{21}=R_{22}=R_{23}=R_{24}=$H, $R_{11}=$isobutyl, M=Ni, Y=O, X=Br;

15) The complex represented by Formula IIIc, wherein $R^1=R^3=R^4=R^6=$isopropyl, $R^2=R^5=R^7-R^{10}=R_{22}=$H, $R_{21}=$t-butyl, $R_{23}=R_{24}=$H, $R_{11}=$ethyl, M=Ni, Y=O, X=Br;

16) The complex represented by Formula IIIc, wherein $R^1=R^3=R^4=R^6=$ethyl, $R^2=R^5=R^7-R^{10}=R_{22}=$H, $R_{21}=$t-butyl, $R_{23}=R_{24}=$H, $R_{11}=$ethyl, M=Ni, Y=O, X=Br;

17) The complex represented by Formula IIIc, wherein $R^1=R^3=R^4=R^6=$methyl, $R^2=R^5=R^7-R^{10}=R_{22}=$H, $R_{21}=$t-butyl, $R_{23}=R_{24}=$H, $R_{11}=$ethyl, M=Ni, Y=O, X=Br;

18) The complex represented by Formula IIIc, wherein $R^1-R^6=$methyl, $R^7-R^{10}=R_{22}=$H, $R_{21}=$t-butyl, $R_{23}=R_{24}=$H, $R_{11}=$ethyl, M=Ni, Y=O, X=Br;

19) The complex represented by Formula IIIc, wherein $R^1=R^3=R^4=R^6=$Br, $R^2=R^5=R^7=R^{10}=R_{22}=$H, $R_{21}=$t-butyl, $R_{23}=R_{24}=$H, $R_{11}=$ethyl, M=Ni, Y=O, X=Br;

20) The complex represented by Formula IIIc, wherein $R^1=R^3=R^4=R^6=$Cl, $R^2=R^5=R^7=R^{10}=R_{22}=$H, $R_{21}=$t-butyl, $R_{23}=R_{24}=$H, $R_{11}=$ethyl, M=Ni, Y=O, X=Br;

21) the complex represented by Formula IIIc, wherein $R^1=R^3=R^4=R^6=$F, $R^2=R^5=R^7=R^{10}=R_{22}=$H, $R_{21}=$t-butyl, $R_{23}=R_{24}=$H, $R_{11}=$ethyl, M=Ni, Y=O, X=Br;

22) The complex represented by Formula IIIc, wherein $R^1=R^3=R^4=R^6=$isopropyl, $R^2=R^5=R^7-R^{10}=R_{22}=$H, $R_{21}=$t-butyl, $R_{23}=R_{24}=$H, $R_{11}=$isobutyl, M=Ni, Y=O, X=Br;

23) the complex represented by Formula IIIc, wherein $R^1=R^3=R^4=R^6=$ethyl, $R^2=R^5=R^7-R^{10}=R_{22}=$H, $R_{21}=$t-butyl, $R_{23}=R_{24}=$H, $R_{11}=$isobutyl, M=Ni, Y=O, X=Br;

24) The complex represented by Formula IIIc, wherein $R^1=R^3=R^4=R^6=$methyl, $R^2=R^5=R^7-R^{10}=R_{22}=$H, $R_{21}=$t-butyl, $R_{23}=R_{24}=$H, $R_{11}=$isobutyl, M=Ni, Y=O, X=Br;

25) The complex represented by Formula IIIc, wherein $R^1-R^6=$methyl, $R^7-R^{10}=R_{22}=$H, $R_{21}=$t-butyl, $R_{23}=R_{24}=$H, $R_{11}=$isobutyl, M=Ni, Y=O, X=Br;

26) the complex represented by Formula IIIc, wherein $R^1=R^3=R^4=R^6=$Br, $R^2=R^5=R^7-R^{10}=R_{22}=$H, $R_{21}=$t-butyl, $R_{23}=R_{24}=$H, $R_{11}=$isobutyl, M=Ni, Y=O, X=Br;

27) The complex represented by Formula IIIc, wherein $R^1=R^3=R^4=R^6=$Cl, $R^2=R^5=R^7-R^{10}=R_{22}=$H, $R_{21}=$t-butyl, $R_{23}=R_{24}=$H, $R_{11}=$isobutyl, M=Ni, Y=O, X=Br;

28) The complex represented by Formula IIIc, wherein $R^1=R^3=R^4=R^6=$F, $R^2=R^5=R^7-R^{10}=R_{22}=$H, $R_{21}=$t-butyl, $R_{23}=R_{24}=$H, $R_{11}=$isobutyl, M=Ni, Y=O, X=Br;

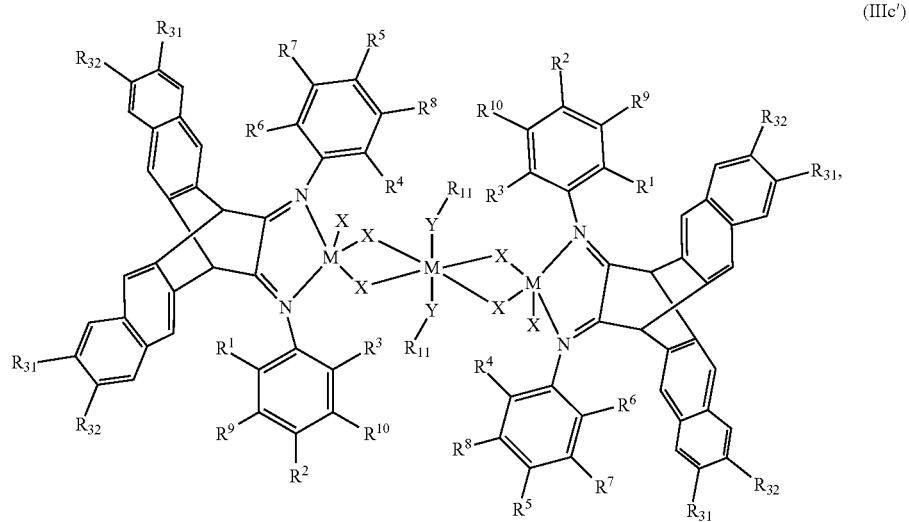

(IIIc')

29) The complex represented by Formula (IIIc'), wherein $R^1=R^3=R^4=R^6$=isopropyl, $R^2=R^5=R^7-R^{10}=R_{31}=R_{32}$=H, $R_{11}$=ethyl, M=Ni, Y=O, X=Br;

30) The complex represented by Formula (IIIc'), wherein $R^1=R^3=R^4=R^6$=ethyl, $R^2=R^5=R^7-R^{10}=R_{31}=R_{32}$=H, $R_{11}$=ethyl, M=Ni, Y=O, X=Br;

31) The complex represented by Formula (IIIc'), wherein $R^1=R^3=R^4=R^6$=methyl, $R^2=R^5=R^7-R^{10}=R_{31}=R_{32}$=H, $R_{11}$=ethyl, M=Ni, Y=O, X=Br;

32) The complex represented by Formula (IIIc'), wherein $R^1$-$R^6$=methyl, $R^7$-$R^{10}=R_{31}=R_{32}$=H, $R_{11}$=ethyl, M=Ni, Y=O, X=Br;

33) The complex represented by Formula (IIIc'), wherein $R^1=R^3=R^4=R^6$=Br, $R^2=R^5=R^7-R^{10}=R_{31}=R_{32}$=H, $R_{11}$=ethyl, M=Ni, Y=O, X=Br;

34) the complex represented by Formula (IIIc'), wherein $R^1=R^3=R^4=R^6$=Cl, $R^2=R^5=R^7-R^{10}=R_{31}=R_{32}$=H, $R_{11}$=ethyl, M=Ni, Y=O, X=Br;

35) the complex represented by Formula (IIIc'), wherein $R^1=R^3=R^4=R^6$=F, $R^2=R^5=R^7-R^{10}=R_{31}=R_{32}$=H, $R_{11}$=ethyl, M=Ni, Y=O, X=Br;

36) the complex represented by Formula (IIIc'), wherein $R^1=R^3=R^4=R^6$=isopropyl, $R^2=R^5=R^7-R^{10}=R_{31}=R_{32}$=H, $R_{11}$=isobutyl, M=Ni, Y=O, X=Br;

37) the complex represented by Formula (IIIc'), wherein $R^1=R^3=R^4=R^6$=ethyl, $R^2=R^5=R^7-R^{10}=R_{31}=R_{32}$=H, $R_{11}$=isobutyl, M=Ni, Y=O, X=Br;

38) the complex represented by Formula (IIIc'), wherein $R^1=R^3=R^4=R^6$=methyl, $R^2=R^5=R^7-R_{10}=R_{31}=R_{32}$=H, $R_{11}$=isobutyl, M=Ni, Y=O, X=Br;

39) the complex represented by Formula (IIIc'), wherein $R^1$-$R^6$=methyl, $R^7$-$R^{10}=R_{31}=R_{32}$=H, $R_{11}$=isobutyl, M=Ni, Y=O, X=Br;

40) the complex represented by Formula (IIIc'), wherein $R^1=R^3=R^4=R^6$=Br, $R^2=R^5=R^7-R^{10}=R_{31}=R_{32}$=H, $R_{11}$=isobutyl, M=Ni, Y=O, X=Br;

41) the complex represented by Formula (IIIc'), wherein $R^1=R^3=R^4=R^6$=Cl, $R^2=R^5=R^7-R^{10}=R_{31}=R_{32}$=H, $R_{11}$=isobutyl, M=Ni, Y=O, X=Br;

42) the complex represented by Formula (IIIc'), wherein $R^1=R^3=R^4=R^6$=F, $R^2=R^5=R^7-R^{10}=R_{31}=R_{32}$=H, $R_{11}$=isobutyl, M=Ni, Y=O, X=Br;

43) the complex represented by Formula (IIIc'), wherein $R^1=R^3=R^4=R^6$=isopropyl, $R^2=R^5=R^7-R^{10}$=H $R_{31}=R_{32}=R_{11}$=ethyl, M=Ni, Y=O, X=Br;

44) the complex represented by Formula (IIIc'), wherein $R^1=R^3=R^4=R^6$=ethyl, $R^2=R^5=R^7-R^{10}$=H, $R_{31}=R_{32}=R_{11}$=ethyl, M=Ni, Y=O, X=Br;

45) the complex represented by Formula (IIIc'), wherein $R^1=R^3=R^4=R^6$=methyl, $R^2=R^5=R^7-R^{10}$=H, $R_{31}=R_{32}=R_{11}$=ethyl, M=Ni, Y=O, X=Br;

46) the complex represented by Formula (IIIc'), wherein $R^1$-$R^6$=methyl, $R^7$-$R^{10}$=H, $R_{31}=R_{32}=R_{11}$=ethyl, M=Ni, Y=O, X=Br;

47) the complex represented by Formula (IIIc'), wherein $R^1=R^3=R^4=R^6$=Br, $R^2=R^5=R^7-R^{10}$=H, $R_{31}=R_{32}=R_{11}$=ethyl, M=Ni, Y=O, X=Br;

48) the complex represented by Formula (IIIc'), wherein $R^1=R^3=R^4=R^6$=Cl, $R^2=R^5=R^7-R^{10}$=H, $R_{31}=R_{32}=R_{11}$=ethyl, M=Ni, Y=O, X=Br;

49) The complex represented by Formula (IIIc'), wherein $R^1=R^3=R^4=R^6$=F, $R^2=R^5=R^7-R^{10}$=H, $R_{31}=R_{32}=R_{11}$=ethyl, M=Ni, Y=O, X=Br;

50) the complex represented by Formula (IIIc'), wherein $R^1=R^3=R^4=R^6$=isopropyl, $R^2=R^5=R^7-R^{10}$=H, $R_{31}=R_{32}=R_{11}$=ethyl, M=Ni, Y=O, X=Br;

51) the complex represented by Formula (IIIc'), wherein $R^1=R^3=R^4=R^6$=ethyl, $R^2=R^5=R^7-R^{10}$=H, $R_{31}=R_{32}$=ethyl, $R_{11}$=isobutyl, M=Ni, Y=O, X=Br;

52) the complex represented by Formula (IIIc'), wherein $R^1=R^3=R^4=R^6$=methyl, $R^2=R^5=R^7-R^{10}$=H, $R_{31}=R_{32}$=ethyl, $R_{11}$=isobutyl, M=Ni, Y=O, X=Br;

53) the complex represented by Formula (IIIc'), wherein $R^1$-$R^6$=methyl, $R^7$-$R^{10}$=H, $R_{31}=R_{32}$=ethyl, $R_{11}$=isobutyl, M=Ni, Y=O, X=Br;

54) the complex represented by Formula (IIIc'), wherein $R^1=R^3=R^4=R^6$=Br, $R^2=R^5=R^7-R^{10}$=H, $R_{31}=R_{32}$=ethyl, $R_{11}$=isobutyl, M=Ni, Y=O, X=Br;

55) the complex represented by Formula (IIIc'), wherein $R^1=R^3=R^4=R^6$=Cl, $R^2=R^5=R^7-R^{10}$=H, $R_{31}=R_{32}$=ethyl, $R_{11}$=isobutyl, M=Ni, Y=O, X=Br; and 56) the complex represented by Formula (IIIc'), wherein $R^1=R^3=R^4=R^6$=F, $R^2=R^5=R^7-R^{10}$=H, $R_{31}=R_{32}$=ethyl, $R_{11}$=isobutyl, M=Ni, Y=O, X=Br.

12. The method as claimed in claim 1, wherein the main catalyst comprises the amino-imine metal complex represented by Formula I'.

13. The method as claimed in claim 12, wherein the amino-imine metal complex has at least one feature selected from:
$R_1$ and $R_2$ are independently selected from the group consisting of C1-C20 alkyl with or without the substituent Q and C6-C20 aryl with or without the substituent Q;
each M is independently selected from the group consisting of nickel and palladium;
each Y is independently selected from the group consisting of O and S;
each X is independently selected from the group consisting of halogen, C1-C10 alkyl with or without the substituent Q and C1-C10 alkoxy with or without the substituent Q;
each $R_{12}$ is independently a C1-C20 alkyl with or without the substituent Q;
each $R_3$ is selected from the group consisting of C1-C20 alkyl with or without the substituent Q, C6-C20 aryl with or without the substituent Q, C7-C20 aralkyl with or without the substituent Q and C7-C20 alkaryl with or without the substituent Q; and
the substituent Q is selected from the group consisting of halogen, hydroxy, $C_1$-$C_6$ alkyl, halogenated $C_1$-$C_6$ alkyl, $C_1$-$C_6$ alkoxy and halogenated $C_1$-$C_6$ alkoxy.

14. The method as claimed in claim 12, wherein the amino-imine metal complex is represented by Formula III':

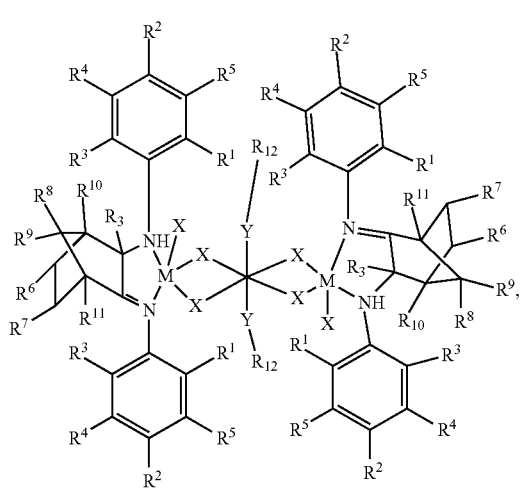

Formula III' wherein, $R^1$-$R^{11}$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C6-C20 aryloxy with or without the substituent Q, C7-C20 aralkyl with or without the substituent Q, C7-C20 aralkyloxy with or without the substituent Q, C7-C20 alkaryl with or without the substituent Q and C7-C20 alkaryloxy with or without the substituent Q; and
$R_3$, $R_{12}$, Y, M and X are as defined in claim 12.

15. The method as claimed in claim 14, wherein in the amino-imine metal complex, $R^1$-$R^{11}$ are each independently selected from the group consisting of hydrogen, halogen, hydroxy, C1-C10 alkyl with or without the substituent Q, C2-C10 alkenyl with or without the substituent Q, C2-C10 alkynyl with or without the substituent Q, C1-C10 alkoxy with or without the substituent Q, C2-C10 alkenoxy with or without the substituent Q, C2-C10 alkynoxy with or without the substituent Q, C6-C15 aryl with or without the substituent Q, C6-C15 aryloxy with or without the substituent Q, C7-C15 aralkyl with or without the substituent Q, C7-C15 aralkoxy with or without the substituent Q, C7-C15 alkaryl with or without the substituent Q and C7-C15 alkaryloxy with or without the substituent Q.

16. The method as claimed in claim 14, wherein the amino-imine metal complex is selected from the group consisting of:
the complex represented by Formula III', wherein $R^1$-$R^3$=isopropyl, $R^2$=$R^4$=$R^5$=$R^6$=$R^7$=$R^{10}$=H, $R^8$=$R^9$=$R^{11}$=$CH_3$, $R_3$=$CH_3$, $R_{12}$=methyl, M=Ni, Y=O, X=Br;
the complex represented by Formula III', wherein $R^1$=$R^3$=isopropyl, $R^2$=$R^4$=$R^5$=$R^6$=$R^7$=$R^{10}$=H, $R^8$=$R^9$=$R^{11}$=$CH_3$, $R_3$=ethyl, $R_{12}$=methyl, M=Ni, Y=O, X=Br;
the complex represented by Formula III', wherein $R^1$=$R^3$=ethyl, $R^2$=$R^4$=$R^5$=$R^6$=$R^7$=$R^{10}$=H, $R^8$=$R^9$=$R^{11}$=$CH_3$, $R_3$=$CH_3$, $R_{12}$=methyl, M=Ni, Y=O, X=Br;
the complex represented by Formula III', wherein $R^1$=$R^3$=ethyl, $R^2$=$R^4$=$R^5$=$R^6$=$R^7$=$R^{10}$=H, $R^8$=$R^9$=$R^{11}$=$CH_3$, $R_3$=ethyl, $R_{12}$=methyl, M=Ni, Y=O, X=Br;
the complex represented by Formula III', wherein $R^1$=$R^3$=methyl, $R^2$=$R^4$=$R^5$=$R^6$=$R^7$=$R^{10}$=H, $R^8$=$R^9$=$R^{11}$=$CH_3$, $R_3$=$CH_3$, $R_{12}$=methyl, M=Ni, Y=O, X=Br;
the complex represented by Formula III', wherein $R^1$=$R^3$=methyl, $R^2$=$R^4$=$R^5$=$R^6$=$R^7$=$R^{10}$=H, $R^8$=$R^9$=$R^{11}$=$CH_3$, $R_3$=ethyl, $R_{12}$=methyl, M=Ni, Y=O, X=Br;
the complex represented by Formula III', wherein $R^1$=$R^3$=isopropyl, $R^2$=$R^4$=$R^5$=$R^6$=$R^7$=$R^{10}$=H, $R^8$=$R^9$=$R^{11}$=$CH_3$, $R_3$=$CH_3$, $R_{12}$=ethyl, M=Ni, Y=O, X=Br;
the complex represented by Formula III', wherein $R^1$=$R^3$=isopropyl, $R^2$=$R^4$=$R^5$=$R^6$=$R^7$=$R^{10}$=H, $R^8$=$R^9$=$R^{11}$=$CH_3$, $R_3$=ethyl, $R_{12}$=ethyl, M=Ni, Y=O, X=Br;
the complex represented by Formula III', wherein $R^1$=$R^3$=ethyl, $R^2$=$R^4$=$R^5$=$R^6$=$R^7$=$R^{10}$=H, $R^8$=$R^9$=$R^{11}$=$CH_3$, $R_3$=$CH_3$, $R_{12}$=ethyl, M=Ni, Y=O, X=Br;
the complex represented by Formula III', wherein $R^1$=$R^3$=ethyl, $R^2$=$R^4$=$R^5$=$R^6$=$R^7$=$R^{10}$=H, $R^8$=$R^9$=$R^{11}$=$CH_3$, $R_3$=ethyl, $R_{12}$=ethyl, M=Ni, Y=O, X=Br;
the complex represented by Formula III', wherein $R^1$=$R^3$=methyl, $R^2$=$R^4$=$R^5$=$R^6$=$R^7$=$R^{10}$=H, $R^8$=$R^9$=$R^{11}$=$CH_3$, $R_3$=$CH_3$, $R_{12}$=ethyl, M=Ni, Y=O, X=Br;

the complex represented by Formula III', wherein $R^1=R^3=$methyl, $R^2=R^4=R^5=R^6=R^7=R^{10}=$H, $R^8=R^9=R^{11}=CH_3$, $R_3=$ethyl, $R_{12}=$ethyl, M=Ni, Y=O, X=Br;

the complex represented by Formula III', wherein $R^1=R^3=$methyl, $R^2=R^4=R^5=R^6=R^7=R^{10}=$H, $R^8=R^9=R^{11}=CH_3$, $R_3=CH_3$, $R_{12}=$i-Pr, M=Ni, Y=O, X=Br;

the complex represented by Formula III', wherein $R^1$-$R^3=$methyl, $R^4$-$R^7=R^{10}=$H, $R^8=R^9=R^{11}=CH_3$, $R_3=$ethyl, $R_{12}=$ethyl, M=Ni, Y=O, X=Br;

the complex represented by Formula III', wherein $R^1$-$R^3=$methyl, $R_4$-$R_7=R^{10}=$H, $R^8=R^9=R^{11}=CH_3$, $R_3=CH_3$, $R_{12}=$ethyl, M=Ni, Y=O, X=Br;

the complex represented by Formula III', wherein $R^1=R^3=$methyl, $R^2=$Br, $R^4$-$R^7=R^{10}=$H, $R^8=R^9=R^{11}=R_3=CH_3$, $R_{12}=$ethyl, M=Ni, Y=O, X=Br;

the complex represented by Formula III', wherein $R^1=R^3=$methyl, $R^2=$Br, $R^4$-$R^7=R^{10}=$H, $R^8=R^9=R^{11}=CH_3$, $R_3=$ethyl, $R_{12}=$ethyl, M=Ni, Y=O, X=Br;

the complex represented by Formula III', wherein $R^1=R^3=$F, $R^2=R^4$-$R^7=R^{10}=$H, $R^8=R^9=R^{11}=CH_3$, $R_3=$ethyl, $R_{12}=$ethyl, M=Ni, Y=O, X=Br;

the complex represented by Formula III', wherein $R^1=R^3=$Cl, $R^2=R^4$-$R^7=R^{10}=$H, $R^8=R^9=R^{11}=CH_3$, $R_3=$ethyl, $R_{12}=$ethyl, M=Ni, Y=O, X=Br;

the complex represented by Formula III', wherein $R^1=R^3=$Br, $R^2=R^4$-$R^7=R^{10}=$H, $R^8=R^9=R^{11}=CH_3$, $R_3=$ethyl, $R_{12}=$ethyl, M=Ni, Y=O, X=Br;

the complex represented by Formula III', wherein $R^1=R^3=$methyl, $R^2=R^4$-$R^7=R^{10}=$H, $R^8=R^9=R^{11}=CH_3$, $R_3=$ethyl, $R_{12}=$isobutyl, M=Ni, Y=O, X=Br;

the complex represented by Formula III', wherein $R^1=R^3=$ethyl, $R^2=R^4$-$R^7=R^{10}=$H, $R^8=R^9=R^{11}=CH_3$, $R_3=CH_3$, $R_{12}=$isobutyl, M=Ni, Y=O, X=Br;

the complex represented by Formula III', wherein $R^1=R^3=$isopropyl, $R^2=R^4$-$R^7=R^{10}=$H, $R^8=R^9=R^{11}=CH_3$, $R_3=CH_3$, $R_{12}=$isobutyl, M=Ni, Y=O, X=Br;

the complex represented by Formula III', wherein $R^1$-$R^3=$methyl, $R^4$-$R^7=R^{10}=$H, $R^8=R^9=R^{11}=CH_3$, $R_3=CH_3$, $R_{12}=$isobutyl, M=Ni, Y=O, X=Br;

the complex represented by Formula III', wherein $R^1=R^3=$methyl, $R^2=$Br, $R^4$-$R^7=R^{10}=$H, $R^8=R^9=R^{11}=$methyl, $R_3=$isopropyl, $R_{12}=$isobutyl, M=Ni, Y=O, X=Br;

the complex represented by Formula III', wherein $R^1=R^3=$F, $R^2=R^4$-$R^7=R^{10}=$H, $R^8=R^9=R^{11}=CH_3$, $R_3=$isopropyl, $R_{12}=$isobutyl, M=Ni, Y=O, X=Br;

the complex represented by Formula III', wherein $R^1=R^3=$Cl, $R^2=R^4$-$R^7=R^{10}=$H, $R^8=R^9=R^{11}=CH_3$, $R_3=$isopropyl, $R_{12}=$isobutyl, M=Ni, Y=O, X=Br;

the complex represented by Formula III', wherein $R^1=R^3=$Br, $R^2=R^4$-$R^7=R^{10}=$H, $R^8=R^9=R^{11}=CH_3$, $R_3=$isopropyl, $R_{12}=$isobutyl, M=Ni, Y=O, X=Br;

the complex represented by Formula III', wherein $R^1=R^3=$methyl, $R^2=R^4$-$R^7=R^{10}=$H, $R^8=R^9=CH_3$, $R^{11}=$bromomethyl, $R_3=$isopropyl, $R_{12}=$ethyl, M=Ni, Y=O, X=Br;

the complex represented by Formula III', wherein $R^1=R^3=$ethyl, $R^2=R^4$-$R^7=R^{10}=$H, $R^8=R^9=CH_3$, $R^{11}=CH_2Br$, $R_3=$isopropyl, $R_{12}=$ethyl, M=Ni, Y=O, X=Br;

the complex represented by Formula III', wherein $R^1=R^3=$isopropyl, $R^2=R^4$-$R^7=R^{10}=$H, $R^8=R^9=CH_3$, $R^{11}=CH_2Br$, $R_3=$ethyl, $R_{12}=$ethyl, M=Ni, Y=O, X=Br;

the complex represented by Formula III', wherein $R^1$-$R^3=$methyl, $R^4$-$R^7=R^{10}=$H, $R^8=R^9=CH_3$, $R^{11}=CH_2Br$, $R_{12}=$ethyl, M=Ni, Y=O, X=Br;

the complex represented by Formula III', wherein $R^1=R^3=$methyl, $R^2=$Br, $R^4$-$R^7=R^{10}=$H, $R^8=R^9=$methyl, $R^3=$ethyl, $R^{11}=CH_2Br$, $R_{12}=$ethyl, M=Ni, Y=O, X=Br;

the complex represented by Formula III', wherein $R^1=R^3=$F, $R^2=R^4$-$R^7=R^{10}=$H, $R^8=R^9=$methyl, $R^{11}=CH_2Br$, $R_3=$isobutyl, $R_{12}=$ethyl, M=Ni, Y=O, X=Br;

the complex represented by Formula III', wherein $R^1=R^3=$Cl, $R^2=R^4$-$R^7=R^{10}=$H, $R^8=R^9=$methyl, $R^{11}=CH_2Br$, $R_3=$isobutyl, $R_{12}=$ethyl, M=Ni, Y=O, X=Br; and the complex represented by Formula III', wherein $R^1=R^3=$Br, $R^2=R^4$-$R^7=R^{10}=$H, $R^8=R^9=$methyl, $R^{11}=CH_2Br$, $R_3=$isobutyl, $R_{12}=$ethyl, M=Ni, Y=O, X=Br.

17. The method as claimed in claim 12, wherein the amino-imine metal complex has a structure represented by Formula IV':

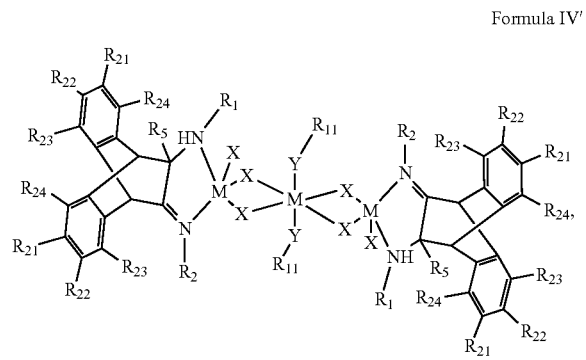

Formula IV' wherein, $R_1$ and $R_2$ are each independently a C1-C30 hydrocarbyl with or without the substituent Q; $R_{21}$-$R_{24}$ are each independently selected from the group consisting of hydrogen, halogen, hydroxy, C1-C20 hydrocarbyl with or without the substituent Q and C1-C20 hydrocarbyloxy with or without the substituent Q, and $R_{21}$-$R_{24}$ are optionally joined to form a ring or ring system; each $R_5$ is independently selected from the group consisting of hydrogen and C1-C20 hydrocarbyl with or without the substituent Q; each $R_{11}$ is independently a C1-C20 hydrocarbyl with or without the substituent Q; each Y is independently a Group VIA nonmetal atom; each M is independently a Group VIII metal; each X is independently selected from the group consisting of halogen, C1-C10 hydrocarbyl with or without the substituent Q and C1-C10 hydrocarbyloxy with or without the substituent Q.

18. The method as claimed in claim 17, wherein the amino-imine metal complex has at least one feature selected from:

$R_1$ and $R_2$ are independently selected from the group consisting of C1-C20 alkyl with or without the substituent Q and C6-C20 aryl with or without the substituent Q;

each M is independently selected from the group consisting of nickel and palladium;

each Y is independently selected from the group consisting of O and S;

each X is independently selected from the group consisting of halogen, C1-C10 alkyl with or without the substituent Q and C1-C10 alkoxy with or without the substituent Q;

each $R_{11}$ is independently a C1-C20 alkyl with or without the substituent Q;

each $R_5$ is independently selected from the group consisting of C1-C20 alkyl with or without the substituent Q, C6-C20 aryl with or without the substituent Q, C7-C20 aralkyl with or without the substituent Q and C7-C20 alkaryl with or without the substituent Q;

the substituent Q is selected from the group consisting of halogen, hydroxy, C1-C6 alkyl, halogenated C1-C6 alkyl, C1-C6 alkoxy and halogenated C1-C6 alkoxy; and $R_{21}$-$R_{24}$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C7-C20 aralkyl with or without the substituent Q, C7-C20 alkaryl with or without the substituent Q, C6-C20 aryloxy with or without the substituent Q, C7-C20 aralkyloxy with or without the substituent Q and C7-C20 alkaryloxy with or without the substituent Q, and $R_{21}$-$R_{24}$ are optionally joined to form a ring or ring system.

19. The method as claimed in claim 17, wherein the amino-imine metal complex has a structure represented by Formula IV'A:

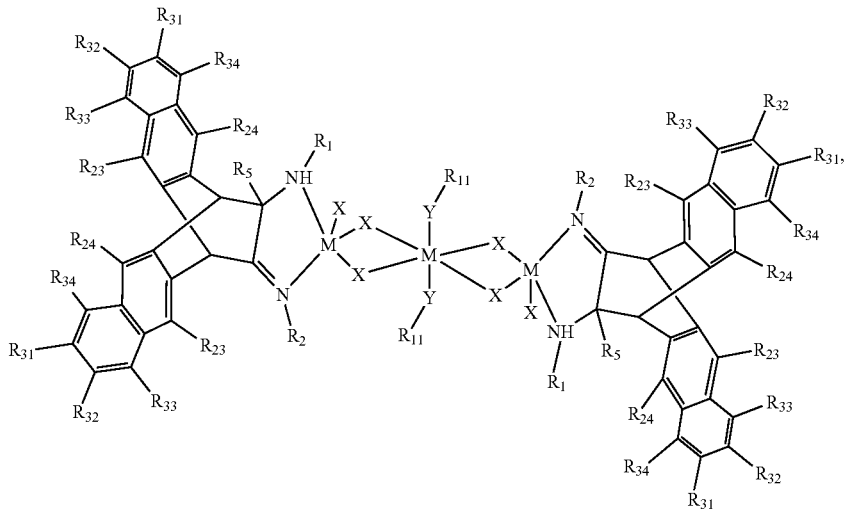

Formula IV' A wherein $R_{31}$-$R_{34}$ have the same meanings as $R_{21}$-$R_{24}$ in Formula IV', and $R_1$, $R_2$, $R_5$, $R_{11}$, Y, M and X are as defined for Formula IV' in claim 17.

20. The method as claimed in claim 17, wherein the amino-imine metal complex is represented by the following Formula V or V':

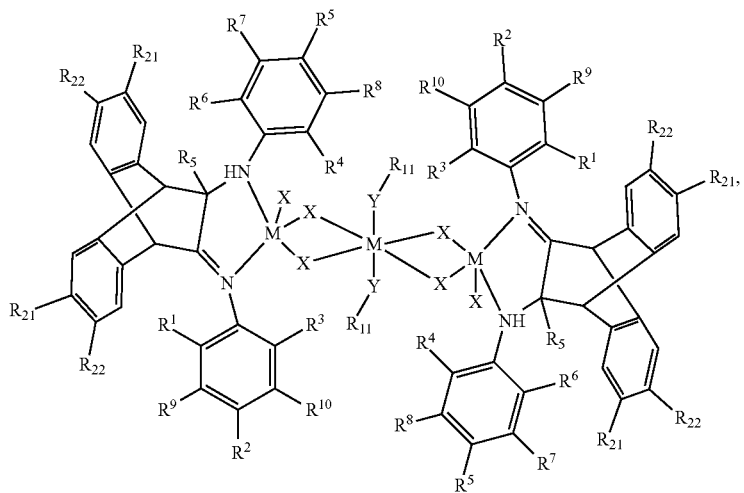

Formula V

Formula V'

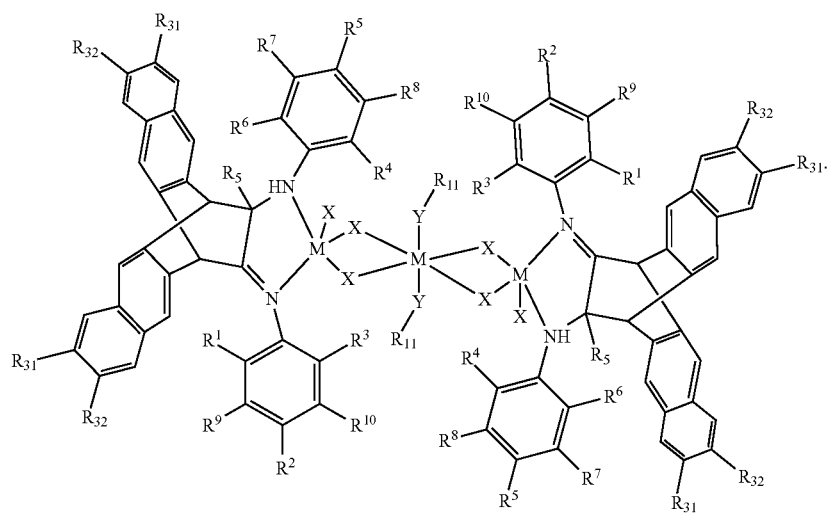

21. The method as claimed in claim 1, wherein in Formula G, the substituent in $L_1$-$L_3$ is one or more selected from the group consisting of halogen, $C_1$-$C_{10}$ alkyl, $C_1$-$C_{10}$ alkoxy, $C_6$-$C_{10}$ aryl, cyano, and hydroxy;
the pendant group in $L_4$ is one or more selected from the group consisting of halogen, $C_6$-$C_{20}$ aryl, $C_1$-$C_{20}$ alkyl and $C_1$-$C_{20}$ alkoxy, the $C_6$-$C_{20}$ aryl, $C_1$-$C_{20}$ alkyl, and $C_1$-$C_{20}$ alkoxy being optionally substituted by a substituent, which is one or more selected from the group consisting of halogen, $C_1$-$C_{10}$ alkyl, $C_1$-$C_{10}$ alkoxy, $C_6$-$C_{10}$ aryl, and hydroxy.

22. The method as claimed in claim 1, wherein in Formula G', the substituent in $L_1$-$L_3$ is one or more selected from the group consisting of halogen, $C_1$-$C_{10}$ alkyl, $C_1$-$C_{10}$ alkoxy, $C_6$-$C_{10}$ aryl, cyano, and hydroxy;
the pendant group in $L_4$ is one or more selected from the group consisting of halogen, $C_6$-$C_{20}$ aryl, $C_1$-$C_{20}$ alkyl and $C_1$-$C_{20}$ alkoxy, the $C_6$-$C_{20}$ aryl, $C_1$-$C_{20}$ alkyl, and $C_1$-$C_{20}$ alkoxy being optionally substituted by a substituent, which is one or more selected from the group consisting of halogen, $C_1$-$C_{10}$ alkyl, $C_1$-$C_{10}$ alkoxy, $C_6$-$C_{10}$ aryl and hydroxy.

23. The method as claimed in claim 1, wherein the cocatalyst is selected from the group consisting of organoaluminum compounds and organoboron compounds; the organoaluminum compounds are selected from the group consisting of alkylaluminoxanes, aluminum alkyls and alkyl aluminum halides; the organoboron compounds are selected from the group consisting of aromatic hydrocarbyl boron compounds and borates; the chain transfer agent is selected from the group consisting of aluminum alkyls, magnesium alkyls, boron alkyls and zinc alkyls; wherein, when the cocatalyst is the organoaluminum compound, a molar ratio of aluminum in the cocatalyst to M in the diimine metal complex is $(10\text{-}10^7):1$; when the cocatalyst is the organoboron compound, a molar ratio of boron in the cocatalyst to M in the diimine metal complex is $(0.1\text{-}1000):1$; and a molar ratio of the chain transfer agent to M in the diimine metal complex is $(0.1\text{-}5000):1$.

24. The method as claimed in claim 2, having at least one feature selected from:
$R_1$ and $R_2$ are independently selected from the group consisting of C1-C20 alkyl with or without the substituent Q and C6-C20 aryl with or without the substituent Q, and at least one of $R_1$ and $R_2$ is a group represented by Formula A:

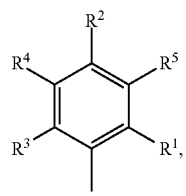

Formula A wherein $R^1$-$R^5$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C6-C20 aryloxy with or without the substituent Q, C7-C20 aralkyl with or without the substituent Q, C7-C20 aralkoxy with or without the substituent Q, C7-C20 alkaryl with or without the substituent Q and C7-C20 alkaryloxy with or without the substituent Q, and $R^1$-$R^5$ are optionally joined to form a ring;
each X is independently selected from the group consisting of halogen, C1-C6 alkyl with or without the substituent Q and C1-C6 alkoxy with or without the substituent Q; and
each $R_{12}$ is independently a C1-C10 alkyl with or without the substituent Q.

25. The method as claimed in claim 7, having at least one feature selected from:
$R_1$ and $R_2$ are independently selected from the group consisting of C1-C20 alkyl with or without the substituent Q and C6-C20 aryl with or without the substituent Q, and at least one of $R_1$ and $R_2$ is a group represented by Formula A:

Formula A

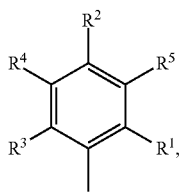

wherein, $R^1$-$R^5$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C6-C20 aryloxy with or without the substituent Q, C7-C20 aralkyl with or without the substituent Q, C7-C20 aralkoxy with or without the substituent Q, C7-C20 alkaryl with or without the substituent Q and C7-C20 alkaryloxy with or without the substituent Q, and $R^1$-$R^5$ are optionally joined to form a ring or ring system;
 each X is independently selected from the group consisting of halogen, C1-C6 alkyl with or without the substituent Q and C1-C6 alkoxy with or without the substituent Q; and
 each $R_{11}$ is independently a C1-C10 alkyl with or without the substituent Q.

26. The method as claimed in claim 12, wherein the amino-imine metal complex has at least one feature selected from:
 $R_1$ and $R_2$ are independently selected from the group consisting of C1-C20 alkyl with or without the substituent Q and C6-C20 aryl with or without the substituent Q, and at least one of $R_1$ and $R_2$ is a group represented by Formula A:

Formula A

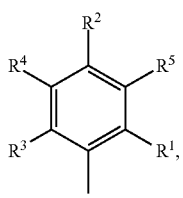

wherein, $R^1$-$R^5$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C6-C20 aryloxy with or without the substituent Q, C7-C20 aralkyl with or without the substituent Q, C7-C20 aralkyloxy with or without the substituent Q, C7-C20 alkaryl with or without the substituent Q and C7-C20 alkaryloxy with or without the substituent Q, and $R^1$-$R^5$ are optionally joined to form a ring or ring system;
 each X is independently selected from the group consisting of halogen, C1-C6 alkyl with or without the substituent Q and C1-C6 alkoxy with or without the substituent Q;
 each $R_{12}$ is independently a C1-C10 alkyl with or without the substituent Q; and
 each $R_3$ is selected from the group consisting of C1-C10 alkyl with or without the substituent Q, C6-C10 aryl with or without the substituent Q, C7-C15 aralkyl with or without the substituent Q and C7-C15 alkaryl with or without the substituent Q.

27. The method as claimed in claim 17, wherein the amino-imine metal complex has at least one feature selected from:
 $R_1$ and $R_2$ are independently selected from the group consisting of C1-C20 alkyl with or without the substituent Q and C6-C20 aryl with or without the substituent Q, and at least one of $R_1$ and $R_2$ is a group represented by Formula A:

Formula A

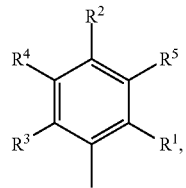

wherein, $R^1$-$R^5$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C6-C20 aryloxy with or without the substituent Q, C7-C20 aralkyl with or without the substituent Q, C7-C20 aralkyloxy with or without the substituent Q, C7-C20 alkaryl with or without the substituent Q and C7-C20 alkaryloxy with or without the substituent Q, and $R^1$-$R^5$ are optionally joined to form a ring or ring system;
 each X is independently selected from the group consisting of halogen, C1-C6 alkyl with or without the substituent Q and C1-C6 alkoxy with or without the substituent Q;
 each $R_{11}$ is independently a C1-C10 alkyl with or without the substituent Q;
 each $R_5$ is independently selected from the group consisting of C1-C10 alkyl with or without the substituent Q, C6-C10 aryl with or without the substituent Q, C7-C15 aralkyl with or without the substituent Q and C7-C15 alkaryl with or without the substituent Q; and
 $R_{21}$-$R_{24}$ are each independently selected from the group consisting of hydrogen, halogen, hydroxy, C1-C10 alkyl with or without the substituent Q, C2-C10 alkenyl with or without the substituent Q, C2-C10 alkynyl with or without the substituent Q, C1-C10 alkoxy with or without the substituent Q, C2-C10 alkenoxy with or without the substituent Q, C2-C10 alkynoxy with or without the substituent Q, C6-C15 aryl with or without the substituent Q, C7-C15 aralkyl with or without the substituent Q, C7-C15 alkaryl with or without the substituent Q, C6-C15 aryloxy with or without the substituent Q, C7-C15 aralkoxy with or without the substituent Q and C7-C15 alkaryloxy with or without the substituent Q.

28. The method as claimed in claim 20, wherein the amino-imine metal complex is selected from the group consisting of:

1) The complex represented by Formula V, wherein $R^1=R^3=R^4=R^6$=isopropyl, $R^2=R^5=R^7\text{-}R^{10}=R_{21}=R_{22}$=H, $R_5$=$CH_3$, $R_{11}$=ethyl, M=Ni, Y=O, X=Br;
2) The complex represented by Formula V, wherein $R^1=R^3=R^4=R^6$=ethyl, $R^2=R^5=R^7\text{-}R^{10}=R_{21}=R_{22}$=H, $R_5$=$CH_3$, $R_{11}$=ethyl, M=Ni, Y=O, X=Br;
3) The complex represented by Formula V, wherein $R^1=R^3=R^4=R^6$=methyl, $R^2=R^5=R^7\text{-}R^{10}=R_{21}=R_{22}$=H, $R_5$=$CH_3$, $R_{11}$=ethyl, M=Ni, Y=O, X=Br;
4) The complex represented by Formula V, wherein $R^1\text{-}R^6$=methyl, $R^7\text{-}R^{10}=R_{21}=R_{22}$=H, $R_5$=$CH_3$, $R_{11}$=ethyl, M=Ni, Y=O, X=Br;
5) The complex represented by Formula V, wherein $R^1=R^3=R^4=R^6$=Br, $R_2=R_5=R_7\text{-}R^{10}=R_{21}=R_{22}$=H, $R_5$=$CH_3$, $R_{11}$=ethyl, M=Ni, Y=O, X=Br;
6) The complex represented by Formula V, wherein $R^1=R^3=R^4=R^6$=Cl, $R^2=R^5=R^7\text{-}R^{10}=R_{21}=R_{22}$=H, $R_5$=$CH_3$, $R_{11}$=ethyl, M=Ni, Y=O, X=Br;
7) The complex represented by Formula V, wherein $R^1=R^3=R^4=R^6$=F, $R_2=R_5\text{-}R_7\text{-}R^{10}=R_{21}=R_{22}$=H, $R_5$=$CH_3$, $R_{11}$=ethyl, M=Ni, Y=O, X=Br;
8) The complex represented by Formula V, wherein $R^1=R^3=R^4=R^6$=isopropyl, $R^2=R^5=R^7\text{-}R^{10}=R_{21}=R_{22}$=H, $R_5=R_{11}$=ethyl, M=Ni, Y=O, X=Br;
9) The complex represented by Formula V, wherein $R^1=R^3=R^4=R^6$=ethyl, $R^2=R^5=R^7\text{-}R^{10}=R_{21}=R_{22}$=H, $R_5=R_{11}$=ethyl, M=Ni, Y=O, X=Br;
10) The complex represented by Formula V, wherein $R^1=R^3=R^4=R_6$=methyl, $R^2=R^5=R^7\text{-}R^{10}=R_{21}=R_{22}$=H, $R_5=R_{11}$=ethyl, M=Ni, Y=O, X=Br;
11) The complex represented by Formula V, wherein $R^1\text{-}R^6$=methyl, $R^7\text{-}R^{10}=R_{21}=R_{22}$=H, $R_5=R_{11}$=ethyl, M=Ni, Y=O, X=Br;
12) The complex represented by Formula V, wherein $R^1=R^3=R^4=R^6$=Br, $R^2=R^5=R^7\text{-}R^{10}=R_{21}=R_{22}$=H, $R_5=R_{11}$=ethyl, M=Ni, Y=O, X=Br;
13) The complex represented by Formula V, wherein $R^1=R^3=R^4=R^6$=Cl, $R^2=R^5=R^7\text{-}R^{10}=R_{21}=R_{22}$=H, $R_5=R_{11}$=ethyl, M=Ni, Y=O, X=Br;
14) The complex represented by Formula V, wherein $R^1=R^3=R^4=R^6$=F, $R^2=R^5=R^7\text{-}R^{10}=R_{21}=R_{22}$=H, $R_5=R_{11}$=ethyl, M=Ni, Y=O, X=Br;
15) The complex represented by Formula V, wherein $R^1=R^3=R^4=R^6$=isopropyl, $R^2=R^5=R^7\text{-}R^{10}=R_{21}=R_{22}$=H, $R_5$=$CH_3$, $R_{11}$=isobutyl, M=Ni, Y=O, X=Br;
16) The complex represented by Formula V, wherein $R^1=R^3=R^4=R^6$=ethyl, $R_2=R_5=R_7\text{-}R^{10}=R_{21}=R_{22}$=H, $R_5$=$CH_3$, $R_{11}$=isobutyl, M=Ni, Y=O, X=Br;
17) The complex represented by Formula V, wherein $R^1=R^3=R^4=R^6$=methyl, $R^2=R^5=R^7\text{-}R^{10}=R_{21}=R_{22}$=H, $R_5$=$CH_3$, $R_{11}$=isobutyl, M=Ni, Y=O, X=Br;
18) The complex represented by Formula V, wherein $R^1\text{-}R^6$=methyl, $R^7\text{-}R^{10}=R_{21}=R_{22}$=H, $R_5$=$CH_3$, $R_{11}$=isobutyl, M=Ni, Y=O, X=Br;
19) The complex represented by Formula V, wherein $R^1=R^3=R^4=R^6$=Br, $R^2=R^5=R^7\text{-}R^{10}=R_{21}=R_{22}$=H, $R_5$=$CH_3$, $R_{11}$=isobutyl, M=Ni, Y=O, X=Br;
20) The complex represented by Formula V, wherein $R^1=R^3=R^4=R^6$=Cl, $R^2=R_5=R_7\text{-}R^{10}=R_{21}=R_{22}$=H, $R_5$=$CH_3$, $R_{11}$=isobutyl, M=Ni, Y=O, X=Br;
21) the complex represented by Formula V, wherein $R^1=R^3=R^4=R^6$=F, $R^2=R^5=R^7\text{-}R^{10}=R_{21}=R_{22}$=H, $R_5$=$CH_3$, $R_{11}$=isobutyl, M=Ni, Y=O, X=Br;
21) The complex represented by Formula V, wherein $R^1=R^3=R^4=R^6$=isopropyl, $R^2=R^5=R^7\text{-}R^{10}=R_{22}$=H, $R_{21}$=t-butyl, $R_5$=$CH_3$, $R_{11}$=ethyl, M=Ni, Y=O, X=Br;
23) the complex represented by Formula V, wherein $R^1=R^3=R^4=R^6$=ethyl, $R^2=R^5=R^7\text{-}R^{10}=R_{22}$=H, $R_{21}$=t-butyl, $R_5$=$CH_3$, $R_{11}$=ethyl, M=Ni, Y=O, X=Br;
24) The complex represented by Formula V, wherein $R^1=R^3=R^4=R^6$=methyl, $R^2=R^5=R^7\text{-}R^{10}=R_{22}$=H, $R_{21}$=t-butyl, $R_5$=$CH_3$, $R_{11}$=ethyl, M=Ni, Y=O, X=Br;
25) The complex represented by Formula V, wherein $R^1\text{-}R^6$=methyl, $R^7\text{-}R^{10}=R_{22}$=H, $R_{21}$=t-butyl, $R_5$=$CH_3$, $R_{11}$=ethyl, M=Ni, Y=O, X=Br;
26) the complex represented by Formula V, wherein $R^1=R^3=R^4=R^6$=Br, $R_2=R_5=R_7\text{-}R^{10}=R_{22}$=H, $R_{21}$=t-butyl, $R_5$=$CH_3$, $R_{11}$=ethyl, M=Ni, Y=O, X=Br;
27) The complex represented by Formula V, wherein $R^1=R^3=R^4=R^6$=Cl, $R^2=R^5=R^7\text{-}R^{10}=R_{22}$=H, $R_{21}$=t-butyl, $R_5$=$CH_3$, $R_{11}$=ethyl, M=Ni, Y=O, X=Br;
28) The complex represented by Formula V, wherein $R^1=R^3=R^4=R^6$=F, $R^2=R^5=R^7\text{-}R^{10}=R_{22}$=H, $R_{21}$=t-butyl, $R_5$=$CH_3$, $R_{11}$=ethyl, M=Ni, Y=O, X=Br;
29) The complex represented by Formula V, wherein $R^1=R^3=R^4=R^6$=isopropyl, $R^2=R^5=R^7\text{-}R^{10}=R_{22}$=H, $R_{21}$=t-butyl, $R_5$=$CH_3$, $R_{11}$=isobutyl, M=Ni, Y=O, X=Br;
30) The complex represented by Formula V, wherein $R^1=R^3=R^4=R^6$=ethyl, $R^2=R^5=R^7\text{-}R^{10}=R_{22}$=H, $R_{21}$=t-butyl, $R_5$=$CH_3$, $R_{11}$=isobutyl, M=Ni, Y=O, X=Br;
31) The complex represented by Formula V, wherein $R^1=R^3=R^4=R^6$=methyl, $R_2=R_5=R_7\text{-}R^{10}=R_{22}$=H, $R_{21}$=t-butyl, $R_5$=$CH_3$, $R_{11}$=isobutyl, M=Ni, Y=O, X=Br;
32) The complex represented by Formula V, wherein $R^1\text{-}R^6$=methyl, $R^7\text{-}R^{10}=R_{22}$=H, $R_{21}$=t-butyl, $R_5$=$CH_3$, $R_{11}$=isobutyl, M=Ni, Y=O, X=Br;
33) The complex represented by Formula V, wherein $R^1=R^3=R^4=R^6$=Br, $R^2=R^5=R^7\text{-}R^{10}=R_{22}$=H, $R_{21}$=t-butyl, $R_5$=$CH_3$, $R_{11}$=isobutyl, M=Ni, Y=O, X=Br;
34) The complex represented by Formula V, wherein $R^1=R^3=R^4=R^6$=Cl, $R^2=R^5=R^7\text{-}R^{10}=R_{22}$=H, $R_{21}$=t-butyl, $R_5$=$CH_3$, $R_{11}$=isobutyl, M=Ni, Y=O, X=Br;
35) the complex represented by Formula V, wherein $R^1=R^3=R^4=R^6$=F, $R^2=R^5=R^7\text{-}R^{10}=R_{22}$=H, $R_{21}$=t-butyl, $R_5$=$CH_3$, $R_{11}$=isobutyl, M=Ni, Y=O, X=Br;
29) The complex represented by Formula V', wherein $R^1=R^3=R^4=R^6$=isopropyl, $R^2=R^5=R^7\text{-}R^{10}=R_{31}=R_{32}$=H, $R_5$=$CH_3$, $R_{11}$=ethyl, M=Ni, Y=O, X=Br;
30) The complex represented by Formula V', wherein $R^1=R^3=R^4=R^6$=ethyl, $R^2=R^5=R^7\text{-}R^{10}=R_{31}=R_{32}$=H, $R_5$=$CH_3$, $R_{11}$=ethyl, M=Ni, Y=O, X=Br;
31) The complex represented by Formula V', wherein $R^1=R^3=R^4=R^6$=methyl, $R^2=R^5=R^7\text{-}R^{10}=R_{31}=R_{32}$=H, $R_5$=$CH_3$, $R_{11}$=ethyl, M=Ni, Y=O, X=Br;
32) The complex represented by Formula V', wherein $R^1\text{-}R^6$=methyl, $R^7\text{-}R^{10}=R_{31}=R_{32}$=H, $R_5$=$CH_3$, $R_{11}$=ethyl, M=Ni, Y=O, X=Br;
33) The complex represented by Formula V', wherein $R^1=R^3=R^4=R^6$=Br, $R^2=R^5=R_7\text{-}R^{10}=R_{31}=R_{32}$=H, $R_5$=$CH_3$, $R_{11}$=ethyl, M=Ni, Y=O, X=Br;
34) the complex represented by Formula V', wherein $R^1=R^3=R^4=R^6$=Cl, $R^2=R^5=R_7\text{-}R^{10}=R_{31}=R_{32}$=H, $R_5$=$CH_3$, $R_{11}$=ethyl, M=Ni, Y=O, X=Br;

35) the complex represented by Formula V', wherein $R^1=R^3=R^4=R^6=F$, $R^2=R^5=R^7-R^{10}=R_{31}=R_{32}=H$, $R_5=CH_3$, $R_{11}$=ethyl, M=Ni, Y=O, X=Br;
36) the complex represented by Formula V', wherein $R^1=R^3=R^4=R^6$=isopropyl, $R^2=R^5=R^7-R^{10}=R_{31}=R_{32}=H$, $R_5=CH_3$, $R_{11}$=isobutyl, M=Ni, Y=O, X=Br;
37) the complex represented by Formula V', wherein $R^1=R^3=R^4=R^6$=ethyl, $R^2=R^5=R^7-R^{10}=R_{31}=R_{32}=H$, $R_5=CH_3$, $R_{11}$=isobutyl, M=Ni, Y=O, X=Br;
38) the complex represented by Formula V', wherein $R^1=R^3=R^4=R^6$=methyl, $R^2=R^5=R^7-R^{10}=R_{31}=R_{32}=H$, $R_5=CH_3$, $R_{11}$=isobutyl, M=Ni, Y=O, X=Br;
39) the complex represented by Formula V', wherein $R^1-R^6$=methyl, $R^7-R^{10}=R_{31}=R_{32}=H$, $R_5=CH_3$, $R_{11}$=isobutyl, M=Ni, Y=O, X=Br;
40) the complex represented by Formula V', wherein $R^1=R^3=R^4=R^6$=Br, $R^2=R^5=R^7-R^{10}=R_{31}=R_{32}=H$, $R_5=CH_3$, $R_{11}$=isobutyl, M=Ni, Y=O, X=Br;
41) the complex represented by Formula V', wherein $R^1=R^3=R^4=R^6$=Cl, $R^2=R^5=R^7-R^{10}=R_{31}=R_{32}=H$, $R_5=CH_3$, $R_{11}$=isobutyl, M=Ni, Y=O, X=Br;
42) the complex represented by Formula V', wherein $R^1=R^3=R^4=R^6$=F, $R^2=R^5=R^7-R^{10}=R_{31}=R_{32}=H$, $R_5=CH_3$, $R_{11}$=isobutyl, M=Ni, Y=O, X=Br;
43) the complex represented by Formula V', wherein $R^1=R^3=R^4=R^6$=isopropyl, $R^2=R^5=R^7-R^{10}=H$ $R_{31}=R_{32}=R_{11}$=ethyl, $R_5=CH_3$, M=Ni, Y=O, X=Br;
44) the complex represented by Formula V', wherein $R^1=R^3=R^4=R^6$=ethyl, $R^2=R^5=R^7-R^{10}=H$, $R_{31}=R_{32}=R_{11}$=ethyl, $R_5=CH_3$, M=Ni, Y=O, X=Br;
45) the complex represented by Formula V', wherein $R^1=R^3=R^4=R^6$=methyl, $R^2=R^5=R^7-R^{10}=H$, $R_{31}=R_{32}=R_{11}$=ethyl, $R_5=CH_3$, M=Ni, Y=O, X=Br;
46) the complex represented by Formula V', wherein $R^1-R^6$=methyl, $R^7-R^{10}=H$, $R_{31}=R_{32}=R_{11}$=ethyl, $R_5=CH_3$, M=Ni, Y=O, X=Br;
47) the complex represented by Formula V', wherein $R^1=R^3=R^4=R^6$=Br, $R^2=R^5=R^7-R^{10}=H$, $R_{31}=R_{32}=R_{11}$=ethyl, $R_5=CH_3$, M=Ni, Y=O, X=Br;
48) the complex represented by Formula V', wherein $R^1=R^3=R^4=R^6$=Cl, $R^2=R^5=R^7-R^{10}=H$, $R_{31}=R_{32}=R_{11}$=ethyl, $R_5=CH_3$, M=Ni, Y=O, X=Br;
49) the complex represented by Formula V', wherein $R^1=R^3=R^4=R^6$=F, $R^2=R^5=R^7-R^{10}=H$, $R_{31}=R_{32}=R_{11}$=ethyl, $R_5=CH_3$, M=Ni, Y=O, X=Br;
50) the complex represented by Formula V', wherein $R^1=R^3=R^4=R^6$=isopropyl, $R^2=R^5=R^7-R^{10}=H$, $R_{31}=R_{32}=R_{11}$=ethyl, $R_5=CH_3$, M=Ni, Y=O, X=Br;
51) the complex represented by Formula V', wherein $R^1=R^3=R^4=R^6$=ethyl, $R^2-R^5=R^7-R^{10}=H$, $R_{31}=R_{32}$=ethyl, $R_5=CH_3$, $R_{11}$=isobutyl, M=Ni, Y=O, X=Br;
52) the complex represented by Formula V', wherein $R^1=R^3=R^4=R^6$=methyl, $R^2=R^5=R^7-R^{10}=H$, $R_{31}=R_{32}$=ethyl, $R_5=CH_3$, $R_{11}$=isobutyl, M=Ni, Y=O, X=Br;
53) the complex represented by Formula V', wherein $R^1-R^6$=methyl, $R^7-R^{10}=H$, $R_{31}=R_{32}$=ethyl, $R_5=CH_3$, $R_{11}$=isobutyl, M=Ni, Y=O, X=Br;
54) the complex represented by Formula V', wherein $R^1=R^3=R^4=R^6$=Br, $R^2=R^5=R^7-R^{10}=H$, $R_{31}=R_{32}$=ethyl, $R_5=CH_3$, $R_{11}$=isobutyl, M=Ni, Y=O, X=Br;
55) the complex represented by Formula V', wherein $R^1=R^3=R^4=R^6$=Cl, $R^2=R^5=R^7-R^{10}=H$, $R_{31}=R_{32}$=ethyl, $R_5=CH_3$, $R_{11}$=isobutyl, M=Ni, Y=O, X=Br; and
56) the complex represented by Formula V', wherein $R^1=R^3=R^4=R^6$=F, $R^2=R^5=R^7-R^{10}=H$, $R_{31}=R_{32}$=ethyl, $R_5=CH_3$, $R_{11}$=isobutyl, M=Ni, Y=O, X=Br.

29. The method as claimed in claim 1, having at least one feature selected from:
the olefin is an olefin having 2-16 carbon atoms,
in the copolymer, a content of structure units derived from the olefinic alcohol represented by Formula G is from 0.4 to 10.0 mol %; and
in the Formula G, $L_1$ and $L_2$ are H, $L_3$ is H or a $C_1$-$C_{30}$ alkyl, $L_4$ is a $C_1$-$C_{30}$ alkylene having a pendant group.

30. The method as claimed in claim 1, having at least one feature selected from:
the olefin is an olefin having 2-16 carbon atoms;
in the copolymer, a content of structure units derived from the unsaturated carboxylic acid represented by Formula G' is from 0.2 to 15.0 mol %; and
in the Formula G', $L_1$ and $L_2$ are H, $L_3$ is H or a $C_1$-$C_{30}$ alkyl, $L_4$ is a $C_1$-$C_{30}$ alkylene having a pendant group.

* * * * *